(12) United States Patent
Pinilla et al.

(10) Patent No.: US 11,582,534 B2
(45) Date of Patent: Feb. 14, 2023

(54) SYSTEMS AND METHODS FOR PROVIDING INTERACTIVE VISUALIZATIONS OF DIGITAL CONTENT TO A USER

(71) Applicant: Discovery Communications, LLC, New York, NY (US)

(72) Inventors: Fredy Alexander Montano Pinilla, Silver Spring, MD (US); Paolo Miscia, Silver Spring, MD (US); Lina Roncancio, Silver Spring, MD (US)

(73) Assignee: DISCOVERY COMMUNICATIONS, LLC, New York, NY (US)

( * ) Notice: Subject to any disclaimer, the term of this patent is extended or adjusted under 35 U.S.C. 154(b) by 0 days.

(21) Appl. No.: 17/747,686

(22) Filed: May 18, 2022

(65) Prior Publication Data

US 2022/0368998 A1  Nov. 17, 2022

Related U.S. Application Data

(63) Continuation of application No. 16/879,568, filed on May 20, 2020.

(51) Int. Cl.
*G06Q 30/02* (2012.01)
*H04N 21/81* (2011.01)
(Continued)

(52) U.S. Cl.
CPC ..... *H04N 21/812* (2013.01); *H04N 21/25891* (2013.01); *H04N 21/4725* (2013.01); *G06Q 30/0201* (2013.01); *G06Q 30/0276* (2013.01)

(58) Field of Classification Search
CPC .......... H04N 21/812; H04N 21/25891; G06Q 30/0276
See application file for complete search history.

(56) References Cited

U.S. PATENT DOCUMENTS

2010/0249975 A1  9/2010  Rezayat
2011/0276408 A1  11/2011  Toole
(Continued)

OTHER PUBLICATIONS

Aaker, Jennifer L., "Dimensions of Brand Personality," Journal of Marketing Research (JMR) 34 (3): pp. 347-356. DOI:10.2307/3151897.

(Continued)

*Primary Examiner* — Michael H Hong
(74) *Attorney, Agent, or Firm* — Bookoff McAndrews, PLLC

(57) ABSTRACT

A computer-implemented method may include: receiving, by a first computer server, content provider data and content item data; identifying a plurality of profile elements by applying machine learning techniques to the received content provider data and content item data; calculating a first plurality of profile element scores for the content provider in each of the plurality of profile elements and a second plurality of profile element scores for the plurality of content items in each of the plurality of profile elements; determining, by utilizing one or more distance algorithms, profile element vector distances between the first plurality of profile element scores for the content provider and the plurality of second profile element scores for the plurality of content items; ranking the plurality of content items based on the determined profile element vector distances; and generating an interactive graphical user interface (GUI) displaying a plurality of radar graphs.

20 Claims, 43 Drawing Sheets

(51) Int. Cl.
*H04N 21/4725* (2011.01)
*H04N 21/258* (2011.01)
*G06Q 30/0241* (2023.01)
*G06Q 30/0201* (2023.01)

(56) References Cited

U.S. PATENT DOCUMENTS

| | | |
|---|---|---|
| 2012/0042338 A1 | 2/2012 | Kitts |
| 2016/0042428 A1 | 2/2016 | Gou |
| 2016/0170969 A1 | 6/2016 | Allen |
| 2016/0239783 A1 | 8/2016 | Sahu |
| 2017/0061497 A1 | 3/2017 | Akkiraju |
| 2018/0005161 A1 | 1/2018 | Cong |
| 2018/0211265 A1 | 7/2018 | Natarajan |
| 2019/0066127 A1* | 2/2019 | Trahan ............... G06Q 30/0201 |
| 2020/0013092 A1 | 1/2020 | Liu |

* cited by examiner

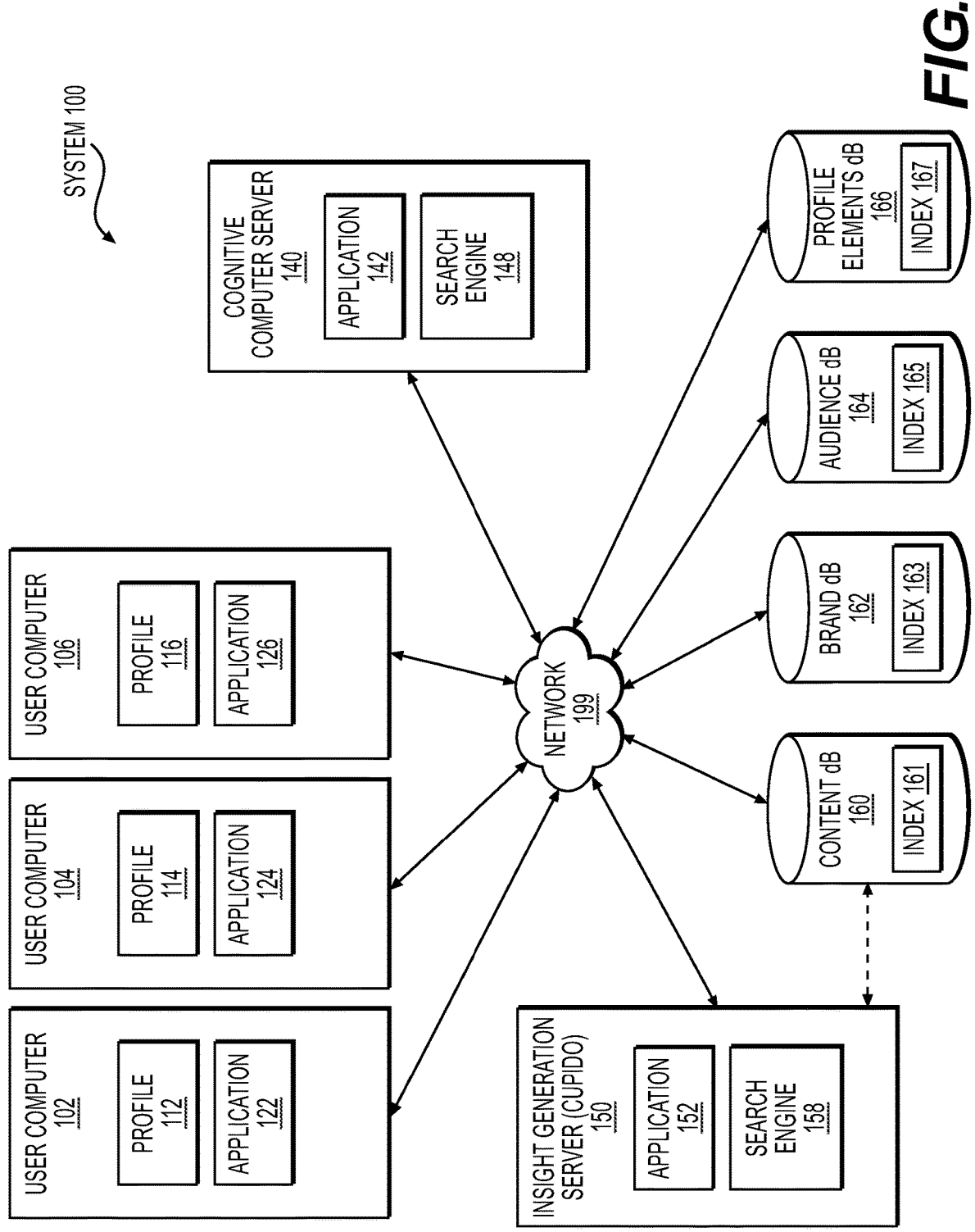

| | | | ACHIEVEMENT STRIVING | ACTIVITY LEVEL | ADVENTUROUSNESS | AGREEABLENESS | ALTRUISM | CLOSENESS | HEDONISM | SELF-EXPRESSION |
|---|---|---|---|---|---|---|---|---|---|---|
| 15 | CONTENT | PROGRAM | LA PEOR PESADILLA | 0.3917789 | 0.12846285 | 0.21353456 | 0.9276217 | 0.8017133 | 0.736940396 | 0.135566944 | 0.23798296 |
| 16 | CONTENT | PROGRAM | AUTOS UNOS WILL CASTRO | 0.9639836 | 0.24821398 | 0.84371394 | 0.9181418 | 0.8953549 | 0.20220522 | 0.20922876 | 0.22993357 |
| 17 | BRAND | BRAND | CLARO | 0.6151594 | 0.50397154 | 0.77870265 | 0.9171652 | 0.8457107 | 0.949503383 | 0.181542581 | 0.1421456 |
| 18 | BRAND | BRAND | SIMILAC 3 KID | 0.9767846 | 0.64112371 | 0.9930954 | 0.9121209 | 0.4810454 | 0.614515766 | 0.215493464 | 0.4325741 |
| 19 | CONTENT | PROGRAM | OVERHAULIN | 0.7275835 | 0.74657641 | 0.5407078 | 0.9055338 | 0.8885699 | 0.31766332 | 0.25950194 | 0.13765655 |
| 20 | BRAND | BRAND | FALABELLA MODA V2 | 0.9102981 | 0.14480153 | 0.65742957 | 0.9042088 | 0.7500975 | 0.924168136 | 0.226616853 | 0.3211223 |
| 21 | CONTENT | CHANNELS | DISCOVERY | 0.7966696 | 0.72602381 | 0.93958086 | 0.900835 | 0.656958 | 0.477667963 | 0.10311138 | 0.42760803 |
| 22 | CONTENT | PROGRAM | MI GATO ENDEMONIADO | 0.4743089 | 0.24183391 | 0.97421688 | 0.899328 | 0.5869375 | 0.484476329 | 0.454055559 | 0.33558582 |
| 23 | CONTENT | GENRE | MASCOTAS | 0.4743089 | 0.24153391 | 0.97421688 | 0.899328 | 0.5869375 | 0.484416329 | 0.454055559 | 0.33558582 |
| 24 | BRAND | BRAND | ENSURE | 0.9998307 | 0.66453932 | 0.908194 | 0.891349 | 0.5472976 | 0.702307319 | 0.22808054 | 0.447384 |
| 25 | CONTENT | PROGRAM | TODO EN 90 DIAS FELICES PARA ¿SEIMPRE? | 0.5339609 | 0.51127451 | 0.61862323 | 0.883987 | 0.6517636 | 0.889763854 | 0.68723674 | 0.68460237 |
| 26 | BRAND | BRAND | MITSUBISHI MOTORS | 0.9798864 | 0.82576774 | 0.82309147 | 0.8833353 | 0.4128625 | 0.492189997 | 0.35865312 | 0.38159983 |

FIG. 6

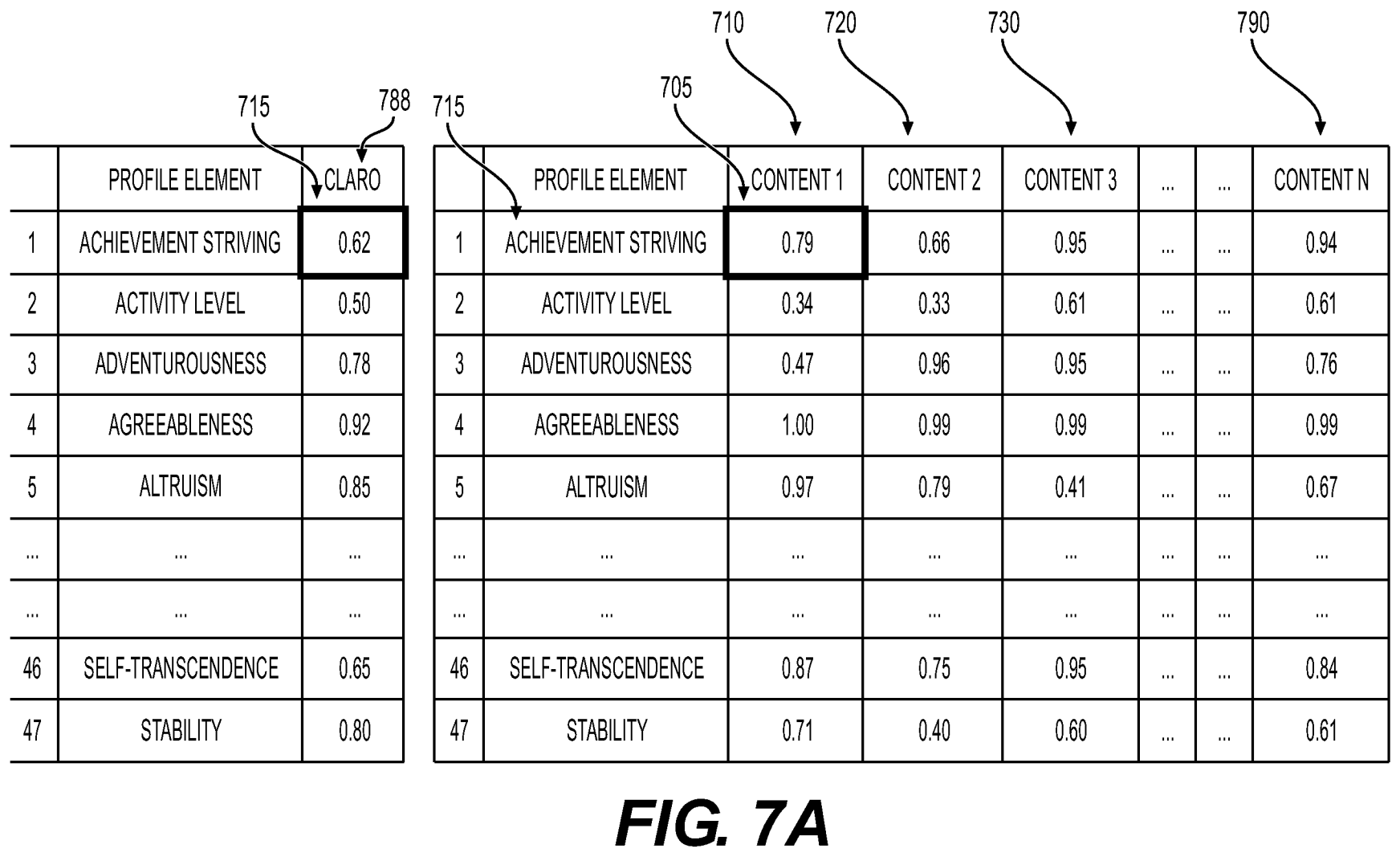

| | PROFILE ELEMENT | CONTENT 1 | CONTENT 2 | CONTENT 3 | ... | ... | CONTENT N |
|---|---|---|---|---|---|---|---|
| 1 | ACHIEVEMENT STRIVING | 0.79 | 0.66 | 0.95 | ... | ... | 0.94 |
| 2 | ACTIVITY LEVEL | 0.34 | 0.33 | 0.61 | ... | ... | 0.61 |
| 3 | ADVENTUROUSNESS | 0.47 | 0.96 | 0.95 | ... | ... | 0.76 |
| 4 | AGREEABLENESS | 1.00 | 0.99 | 0.99 | ... | ... | 0.99 |
| 5 | ALTRUISM | 0.97 | 0.79 | 0.41 | ... | ... | 0.67 |
| ... | ... | ... | ... | ... | ... | ... | ... |
| ... | ... | ... | ... | ... | ... | ... | ... |
| 46 | SELF-TRANSCENDENCE | 0.87 | 0.75 | 0.95 | ... | ... | 0.84 |
| 47 | STABILITY | 0.71 | 0.40 | 0.60 | ... | ... | 0.61 |

| | PROFILE ELEMENT | CLARO |
|---|---|---|
| 1 | ACHIEVEMENT STRIVING | 0.62 |
| 2 | ACTIVITY LEVEL | 0.50 |
| 3 | ADVENTUROUSNESS | 0.78 |
| 4 | AGREEABLENESS | 0.92 |
| 5 | ALTRUISM | 0.85 |
| ... | ... | ... |
| ... | ... | ... |
| 46 | SELF-TRANSCENDENCE | 0.65 |
| 47 | STABILITY | 0.80 |

FIG. 7A

| | BRAND | RAINBOW RUBY | KILOS MORTALES | MEDICAL | MI CUERPO MI DESAFIO | LA MEDIUM | ASESINATOS EN FAMILIA | LA MEDIUM | KILOS MORTALES: SUS VIDAS HOY | TRABAJOS EXTREMOS | SALA DE EMERGENCIAS: HISTORIAS INEDITAS | LA PEOR PESADILLA | AUTOS UNICOS WILL CASTRO | OVERHAULIN | DISCOVERY |
|---|---|---|---|---|---|---|---|---|---|---|---|---|---|---|---|
| | MALDAD EN LA SANGRE 788 | | | | | | | | | | | | | | |
| 1 | FAMILIA | 9.090846 | 14.02712 | 12.654485 | 11.878024 | 11.457062 | 18.74647 | 10.271177 | 15.67285 | 17.99483 | 8.95675 | 10.21585 | 17.34873 | 10.185485 | 7.621584 | 11.910791 |
| 2 | MARTHA DEBAYL | 10.174515 | 15.85548 | 10.186497 | 11.203084 | 8.828214 | 18.05487 | 10.666669 | 11.31727 | 16.01663 | 10.648386 | 12.488022 | 19.42176 | 11.143576 | 10.43333 | 6.839677 |
| 3 | GRINCH | 8.915064 | 14.22364 | 12.3669 | 10.405682 | 8.663057 | 17.52872 | 9.635027 | 14.92739 | 18.21444 | 9.135934 | 10.387839 | 17.25043 | 9.407088 | 8.42888 | 10.257737 |
| 4 | CLARO | 10.659264 | 12.85646 | 11.985374 | 11.807223 | 9.550263 | 14.40605 | 10.18475 | 11.19198 | 15.34329 | 11.117434 | 12.917252 | 15.70539 | 11.932266 | 9.502183 | 9.045854 |
| 5 | SIMILAC 3 KID | 9.805701 | 16.37748 | 10.331004 | 10.923434 | 8.276844 | 19.80587 | 10.748139 | 14.04026 | 17.13663 | 11.148892 | 11.463938 | 20.48713 | 9.938598 | 10.792123 | 6.443265 |
| 6 | FALABELLA | 11.523221 | 16.65067 | 12.758654 | 13.764565 | 10.935192 | 17.26299 | 11.263231 | 13.1866 | 13.44079 | 12.941134 | 14.557735 | 17.97345 | 9.357024 | 11.649765 | 8.400592 |
| 7 | ENSURE 775 | 12.091772 | 15.35298 | 10.119726 | 10.42439 | 10.537278 | 18.70204 | 10.447599 | 13.07142 | 18.65826 | 13.038783 | 11.224238 | 17.81825 | 10.433017 | 12.486376 | 9.482241 |
| 8 | MITSUBISHI MOTOR | 11.528001 | 17.11214 | 12.404456 | 13.362694 | 10.4916 | 20.33895 | 12.072883 | 15.99279 | 17.49647 | 9.308783 | 12.431192 | 20.25365 | 9.799699 | 10.544323 | 5.831543 |
| 9 | COLSUBSIDIO | 12.480452 | 12.480452 | 14.4193 | 14.09036 | 13.421905 | 17.7577 | 11.720495 | 15.17266 | 16.16805 | 11.617173 | 12.541261 | 17.48332 | 11.25614 | 11.631933 | 10.052291 |
| 10 | AVIANCA | 8.9417 | 8.9417 | 10.667447 | 10.529665 | 9.543305 | 18.17921 | 7.786072 | 12.64439 | 15.91125 | 8.856875 | 9.706334 | 16.64584 | 7.802122 | 8.780479 | 8.558639 |
| 11 | PROCOLOMBIA | 11.385425 | 11.385425 | 11.723779 | 11.677354 | 8.95302 | 17.93267 | 10.986921 | 13.06534 | 18.47809 | 12.654997 | 12.435816 | 19.85654 | 11.27043 | 11.036215 | 4.756988 |
| 12 | ELFOS | 7.85373 | 7.85373 | 12.084048 | 10.732241 | 9.929211 | 17.33255 | 8.916075 | 13.6675 | 15.85667 | 13.849752 | 8.813028 | 16.90063 | 9.368533 | 7.008516 | 12.687184 |

*FIG. 7B*

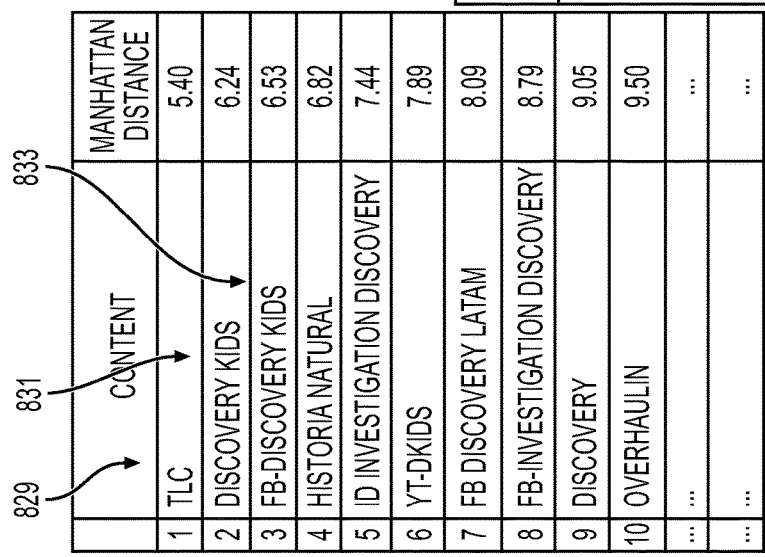
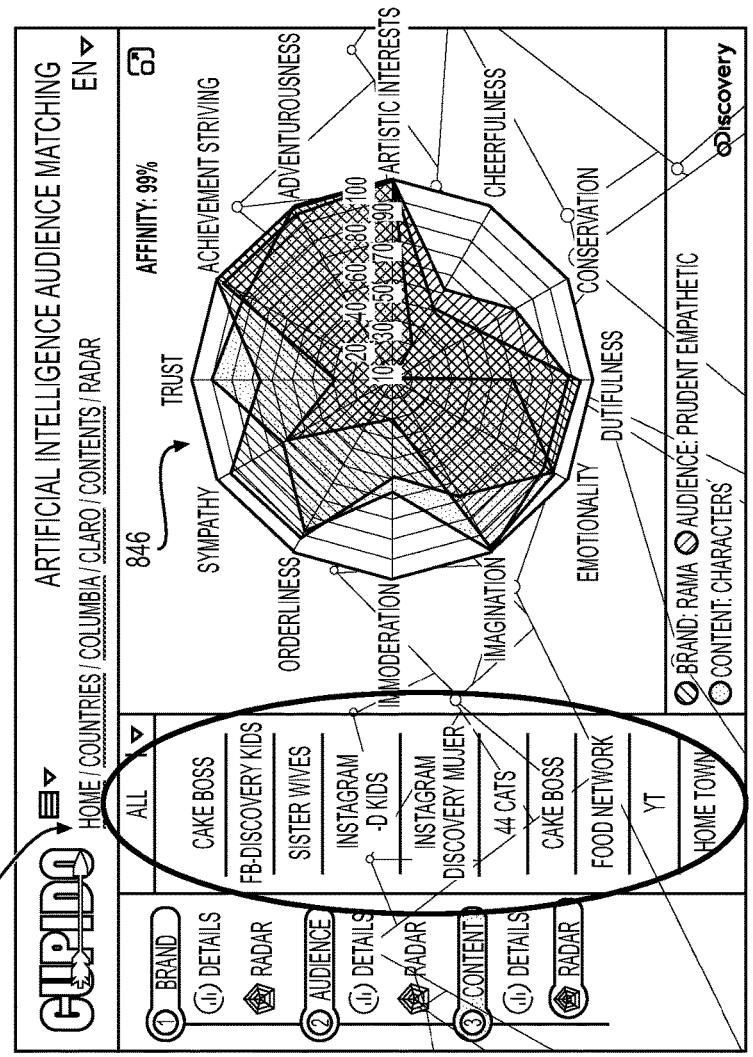
FIG. 8A

| | BRAND | STRENGTH 1 | STRENGTH 2 | STRENGTH 3 | STRENGTH 4 |
|---|---|---|---|---|---|
| 13 | BMW | ORDERLINESS | PRONE TO WORRY | SELF-CONSCIOUSNESS | STABILITY |
| 14 | BON YURT | HEDONISM | OUTGOING | EMOTIONALITY | IMAGINATION |
| 15 | CARULLA APP | DUTIFULNESS | ADVENTUROUSNESS | SELF-CONSCIOUSNESS | NA |
| 16 | CERVEZA INDINA | IDEAL | LIBERTY | ACTIVITY LEVEL | OPENNESS TO CHANGE |
| 17 | CERVEZA CORONA | IDEAL | ACTIVITY LEVEL | SELF-CONSCIOUSNESS | COOPERATION |
| 18 | CHEVROLET | PRONE TO WORRY | SELF-ENHANCEMENT | NA | NA |
| 19 | CHEVROLET ONIX | CURIOSITY | MELANCHOLY | PRONE TO WORRY | SELF-CONSCIOUSNESS |
| 20 | CLARO | MODESTY | CLOSENESS | SUSCEPTIBLE TO STRESS | ALTRUISM |
| 21 | CLUB COLOMBIA | CONSERVATION | SELF-ENHANCEMENT | MELANCHOLY | ORDERLINESS |
| 22 | COLCAFE | IMMODERATION | EXCITEMENT-SEEKING | HEDONISM | ADVENTUROUSNESS |
| 23 | COLSUBSIDIO | CHEERFULNESS | SELF-ENHANCEMENT | ORDERLINESS | PRONE TO WORRY |
| 24 | COORDINADORA | EXCITEMENT | STRUCTURE | IDEAL | OPENNESS TO CHANGE |
| 25 | COPA AIRLINES | CURIOSITY | PRONE TO WORRY | FIERY | SELF-CONSCIOUSNESS |

*FIG. 10B*

| | STRENGTH 5 | STRENGTH 6 | STRENGTH 7 | STRENGTH 8 | STRENGTH 9 | STRENGTH 10 |
|---|---|---|---|---|---|---|
| | NA | NA | NA | NA | NA | NA |
| | CHEERFULNESS | NA | NA | NA | NA | NA |
| | NA | NA | NA | NA | NA | NA |
| | OUTGOING | CONSERVATION | CAUTIOUSNESS | IMMODERATION | SELF-EXPRESSTION | GREGARIOUSNESS |
| | SELF-ENHANCEMENT | CHALLENGE | CONSERVATION | CAUTIOUSNESS | ORDERLINESS | NA |
| | NA | NA | NA | NA | NA | NA |
| | OPENNESS TO CHANGE | NA | NA | NA | NA | NA |
| FROM FIG. 10B | OUTGOING | CHEERFULNESS 1012 | SYMPATHY 1014 | NA 1016 | NA 1018 | NA 1020 |
| | SUSCEPTIBLE TO STRESS | STABILITY | NA | CAUTIOUSNESS | LOVE | NA |
| | ARTISTIC INTERESTS | NA  1056 | NA | NA | NA | NA |
| | NA | NA | NA | NA | NA | NA |
| | GREGARIOUSNESS | SELF-EXPRESSION | MODESTY | DUTIFULNESS | CONSERVATION | CLOSENESS |
| | NA | NA | NA | NA | NA | NA |

FIG. 10B (CONT.)

| BRAND | WEAKNESS 1 | WEAKNESS 2 | WEAKNESS 3 | WEAKNESS 4 | WEAKNESS 5 | WEAKNESS 6 | WEAKNESS 7 | WEAKNESS 8 | WEAKNESS 9 | WEAKNESS 10 |
|---|---|---|---|---|---|---|---|---|---|---|
| 13 BMW | ADVENTUROUSNESS | HARMONY | SYMPATHY | ACHIEVEMENT STRIVING | CURIOSITY | LOVE | OPENNESS TO CHANGE | HEDONISM | ASSERTIVENESS | STRUCTURE |
| 14 BON YURT | DUTIFULNESS | SELF-ENHANCEMENT | IDEAL | STABILITY | STRUCTURE | CONSERVATION | ORDERLINESS | UNCOMPROMISING | SELF-EFFICACY | SELF-EXPRESSION |
| 15 CARULLA APP | LOVE | OPENNESS TO CHANGE | EXCITEMENT | TRUST | MODESTY | NA | NA | NA | NA | NA |
| 16 CERVEZA ANDINA | PRONE TO WORRY | FIERY | NA | NA | NA | NA | NA | NA | NA | NA |
| 17 CERVEZA CORONA | ASSERTIVENESS | EMOTIONALITY | SELF-TRANSCENDENCE | CLOSENESS | MELANCHOLY | IMMODERATION | HEDONISM | FIERY | NA | NA |
| 18 CHEVROLET | HARMONY | ADVENTUROUSNESS | SYMPATHY | IMAGINATION | CHALLENGE | ARTISTIC INTERESTS | LOVE | CLOSENESS | ASSERTIVENESS | LIBERTY |
| 19 CHEVROLET ONIX | SYMPATHY | UNCOMPROMISING | ADVENTUROUSNESS | SUSCEPTIBLE TO STRESS | INTELLECT | LOVE | EMOTIONALITY | TRUST | MODESTY | NA |
| 20 CLARO | ACHIEVEMENT STRIVING | SELF-EFFICACY | SELF-EXPRESSION | CURIOSITY | ASSERTIVENESS | SELF-ENHANCEMENT | FIERY | IMMODERATION | NA | NA |
| 21 CLUB COLOMBIA | HEDONISM | CURIOSITY | NA | NA | NA | NA | NA | NA | NA | NA |
| 22 COLCAFE | CONSERVATION | SUSCEPTIBLE TO STRESS | SELF-TRANSCENDENCE | DUTIFULNESS | UNCOMPROMISING | STABILITY | OUTGOING | MODESTY | IDEAL | SELF-EFFICACY |
| 23 COLSUBSIDIO | IMAGINATION | CURIOSITY | SUSCEPTIBLE TO STRESS | LIBERTY | CLOSENESS | HEDONISM | EXCITEMENT | PRACTICALITY | IMMODERATION | NA |
| 24 COORDINADORA | HARMONY | NA | NA | GREGARIOUSNESS | CHALLENGE | NA | NA | NA | NA | NA |
| 25 COPA AIRLINES | ADVENTUROUSNESS | ASSERTIVENESS | CONSERVATION | NA | NA | CHEERFULNESS | CLOSENESS | SELF-EXPRESSION | EXCITEMENT-SEEKING | EMOTIONALITY |

FIG. 10C

|  | TLC | DISCOVERY KIDS | FB DISCOVERY KIDS | HISTORIA NATURAL | OVERHAULIN |
|---|---|---|---|---|---|
| STRENGTH 1 | SELF-ENHANCEMENT | STRUCTURE | ALTRUISM | TRUST | IDEAL |
| STRENGTH 2 | ALTRUISM | OPENNESS TO CHANGE | CONSERVATION | EXCITEMENT SEEKING | SUSCEPTIBLE TO STRESS |
| STRENGTH 3 | CLOSENESS | LOVE | OUTGOING | ALTRUISM | INTELLECT |
| STRENGTH 4 | CONSERVATION | CLOSENESS | SELF-ENHANCEMENT | CONSERVATION | ACTIVITY LEVEL |
| STRENGTH 5 | GREGARIOUSNESS | SELF-EXPRESSION | IDEAL | ASSERTIVENESS | LIBERTY |
| STRENGTH 6 | DUTIFULNESS | GREGARIOUSNESS | SYMPATHY | CHALLENGE | SELF-EXPRESSION |
| STRENGTH 7 | OUTGOING | SYMPATHY | FIERY | GREGARIOUSNESS | SELF-EFFICACY |
| STRENGTH 8 | IDEAL | OUTGOING | GREGARIOUSNESS | ACTIVITY LEVEL | STABILITY |
| STRENGTH 9 | PRONE TO WORRY | EXCITEMENT | ACHIEVEMENT STRIVING | CHEERFULNESS | DUTIFULNESS |
| STRENGTH 10 | NA | ORDERLINESS | ADVENTUROUSNESS | NA | ORDERLINESS |

*FIG. 11B*

| | TLC ←1129 | DISCOVERY KIDS ←1131 | FB DISCOVERY KIDS ←1133 | HISTORIA NATURAL ←1108 | OVERHAULIN ←1104 |
|---|---|---|---|---|---|
| WEAKNESS 1 | ACTIVITY LEVEL | IMMODERATION | CURIOSITY | HEDONISM | SELF-CONSCIOUSNESS |
| WEAKNESS 2 | NA | NA | IMMODERATION | CLOSENESS | LOVE |
| WEAKNESS 3 | NA | NA | NA | NA | PRONE TO WORRY |
| WEAKNESS 4 | NA | NA | NA | NA | MELANCHOLY |
| WEAKNESS 5 | NA | NA | NA | NA | NA |
| WEAKNESS 6 | NA | NA | NA | NA | NA |
| WEAKNESS 7 | NA | NA | NA | NA | NA |
| WEAKNESS 8 | NA | NA | NA | NA | NA |
| WEAKNESS 9 | NA | NA | NA | NA | NA |
| WEAKNESS 10 | NA | NA | NA | NA | NA |

*FIG. 11C*

| BRAND | V1 | V2 | V3 | V4 | V5 | V6 |
|---|---|---|---|---|---|---|
| 13 BMW | STABILITY | ORDERLINESS | OPENNESS TO CHANGE | HEDONISM | HARMONY | CURIOSITY |
| 14 BON YURT | IMAGINATION | HEDONISM | CHEERFULNESS | OUTGOING | STRUCTURE | UNCOMPROMISING |
| 15 CARULLA APP | MODESTY | ADVENTUROUSNESS | EXCITEMENT | OPENNESS TO CHANGE | DUTIFULNESS | ACHIEVEMENT STRIVING |
| 16 CERVEZA ANDINA | OPENNESS TO CHANGE | LIBERTY | ACTIVITY LEVEL | GREGARIOUSNESS | SELF-EXPRESSION | IDEAL |
| 17 CERVEZA CORONA | HEDONISM | ORDERLINESS | CHALLENGE | CONSERVATION | ACTIVITY LEVEL | CLOSENESS |
| 18 CHEVROLET | SELF-ENHANCEMENT | ARTISTIC INTERESTS | SYMPATHY | CLOSENESS | LOVE | ADVENTUROUSNESS |
| 19 CHEVROLET ONIX | MODESTY | SYMPATHY | UNCOMPROMISING | ADVENTUROUSNESS | OPENNESS TO CHANGE | LOVE |
| 20 CLARO | ALTRUISM | CLOSENESS | OUTGOING | IMMODERATION | CURIOSITY | SYMPATHY |
| 21 CLUB COLOMBIA | HEDONISM | STABILITY | ORDERLINESS | SELF-ENHANCEMENT | LOVE | CONSERVATION |
| 22 COLCAFE | ADVENTUROUSNESS | MODESTY | CONSERVATION | DUTIFULNESS | UNCOMPROMISING | SUSCEPTIBLE TO STRESS |
| 23 COLSUBSIDIO | CHEERFULNESS | ORDERLINESS | HEDONISM | CLOSENESS | SELF-ENHANCEMENT | IMAGINATION |
| 24 COORDINADORA | OPENNESS TO CHANGE | GREGARIOUSNESS | SELF-EXPRESSION | EXCITEMENT | STRUCTURE | CLOSENESS |
| 25 COPA AIRLINES | CLOSENESS | CHEERFULNESS | CURIOSITY | ARTISTIC INTERESTS | ORDERLINESS | HEDONISM |

| CLOSENESS 1322 | ALTRUISM 1336 | OUTGOING 1356 |

1393

| STRENGTHS CLARO | TLC | DISCOVERY KIDS | FB-DISCOVERY KIDS | HISTORIA NATURAL | OVERHAULIN |
|---|---|---|---|---|---|
| 1002 MODESTY | SELF-ENHANCEMENT | STRUCTURE | ALTRUISM ☆ | TRUST | IDEAL |
| 1022 CLOSENESS ☆ | ALTRUISM ☆ | OPENNESS TO CHANGE | CONSERVATION | EXCITEMENT SEEKING | ~~SUSCEPTIBLE TO STRESS~~ |
| 1006 ~~SUSCEPTIBLE TO STRESS~~ | CLOSENESS ☆ | LOVE | OUTGOING ☆ | ALTRUISM ☆ | INTELLECT |
| 1036 ALTRUISM ☆ | CONSERVATION | CLOSENESS ☆ | SELF-ENHANCEMENT | CONSERVATION | ACTIVITY LEVEL |
| 1056 OUTGOING ☆ | GREGARIOUSNESS | SELF-EXPRESSION | IDEAL | ASSERTIVENESS | LIBERTY |
| 1012 CHEERFULNESS | DUTIFULNESS | GREGARIOUSNESS | SYMPATHY | CHALLENGE | SELF-EXPRESSION |
| NA | OUTGOING ☆ | SYMPATHY | FIERY | GREGARIOUSNESS | SELF-EFFICACY |
| NA | IDEAL | OUTGOING ☆ | GREGARIOUSNESS | ACTIVITY LEVEL | STABILITY |
| NA | PRONE TO WORRY | EXCITEMENT | ACHIEVEMENT STRIVING | CHEERFULNESS | DUTIFULNESS |
| NA | NA | ORDERLINESS | ADVENTUROUSNESS | NA | ORDERLINESS |

NO MATCHES IN ANY CLOSEST CONTENT ITEMS
MATCHES TWO OF THE CLOSEST CONTENT ITEMS
MATCHES THREE OF THE CLOSEST CONTENT ITEMS
MATCHES THREE OF THE CLOSEST CONTENT ITEMS
NO MATCHES IN ANY CLOSEST CONTENT ITEMS

FIG. 13B

| | TLC | DISCOVERY KIDS | FB-DISCOVERY KIDS | HISTORIA NATURAL | OVERHAULIN |
|---|---|---|---|---|---|
| WEAKNESS CLARO | ACTIVITY LEVEL | IMMODERATION ☆ | CURIOSITY ☆ | HEDONISM | SELF-CONSCIOUSNESS |
| ACHIEVEMENT STRIVING | NA | NA | IMMODERATION | CLOSENESS | LOVE |
| SELF-EFFICACY | NA | NA | NA | NA | PRONE TO WORRY |
| SELF-EXPRESSION | NA | NA | NA | NA | MELANCHOLY |
| CURIOSITY ☆ | NA | NA | NA | NA | NA |
| ASSERTIVENESS | NA | NA | NA | NA | NA |
| SELF-ENHANCEMENT | NA | NA | NA | NA | NA |
| FIERY | NA | NA | NA | NA | NA |
| IMMODERATION ☆ | NA | NA | NA | NA | NA |
| NA | NA | | | | |
| NA | NA | | | | |

FIG. 13C

| | CLOSENESS 1304 | ALTRUISM 1308 | OUTGOING 1310 | IMMODERATION 1352 | CURIOSITY 1358 |
| --- | --- | --- | --- | --- | --- |
| SYMPATHY 1377 | PRACTICALITY 1334 | EMOTIONALITY 1338 | ORDERLINESS 1392 | | |

1397

| TOP 10 CLARO | | FB-DISCOVERY KIDS | DISCOVERY KIDS | TLC | HISTORIA NATURAL | OVERHAULIN |
| --- | --- | --- | --- | --- | --- | --- |
| 1322 CLOSENESS | NO MATCHES IN ANY CLOSEST CONTENT ITEMS → | ADVENTUROUSNESS | STRUCTURE | HARMONY | SUSCEPTIBLE TO STRESS | TRUST |
| 1306 SUSCEPTIBLE TO STRESS | NO MATCHES IN ANY CLOSEST CONTENT ITEMS → | SYMPATHY ☆ | ARTISTIC INTERESTS | ARTISTIC INTERESTS | ARTISTIC INTERESTS | EXCITEMENT SEEKING |
| 1326 ARTISTIC INTERESTS | NO MATCHES IN ANY CLOSEST CONTENT ITEMS → | ACHIEVEMENT STRIVING | ADVENTUROUSNESS | PRACTICALITY ☆ | INTELLECT | ASSERTIVENESS |
| 1330 CONSERVATION | NO MATCHES IN ANY CLOSEST CONTENT ITEMS → | UNCOMPROMISING | DUTIFULNESS | DUTIFULNESS | IMAGINATION | COOPERATION |
| 1377 SYMPATHY ☆ | MATCHES THREE OF THE CLOSEST CONTENT ITEMS → | ALTRUISM | SYMPATHY ☆ | ALTRUISM | STABILITY | CHALLENGE |
| 1334 PRACTICALITY ☆ | MATCHES THREE OF THE CLOSEST CONTENT ITEMS → | ARTISTIC INSTERESTS | CHALLENGE | UNCOMPROMISING | ORDERLINESS ☆ | IMAGINATION |
| 1336 ALTRUISM | NO MATCHES IN ANY CLOSEST CONTENT ITEMS → | IMAGINATION | CONSERVATION | COOPERATION | ACTIVITY LEVEL | PRACTICALITY ☆ |
| 1338 EMOTIONALITY | MATCHES FOUR OF THE CLOSEST CONTENT ITEMS → | DUTIFULNESS | PRACTICALITY ☆ | EMOTIONALITY ☆ | DUTIFULNESS | ALTRUISM |
| 1340 DUTIFULNESS ☆ | NO MATCHES IN ANY CLOSEST CONTENT ITEMS → | EMOTIONALITY ☆ | EMOTIONALITY ☆ | STABILITY | HARMONY | ARTISTIC INTERESTS |
| 1392 ORDERLINESS ☆ | MATCHES TWO OF THE CLOSEST CONTENT ITEMS → | ORDERLINESS ☆ | STABILITY | CHALLENGE | SYMPATHY ☆ | EMOTIONALITY ☆ |

SYSTEMS AND METHODS FOR PROVIDING INTERACTIVE VISUALIZATIONS OF DIGITAL CONTENT TO A USER

TECHNICAL FIELD

This technology relates to systems and methods for distributing advertisements for selected content based on brand, content, and audience personality. More particularly, the technology relates to systems and methods for determining a personality of a brand using public communications, determining a personality of media content, determining a personality of an audience, and identifying, selecting, and distributing advertising materials based on insights gleaned from the relationship between the brand personality, the media content personality, and the audience personality.

BACKGROUND

Media providers constantly search for new and better ways to create and deliver content to viewers. Advertising plays an important role in broadcast programming including all forms of television from over the air broadcasts to cable television networks to satellite television to streaming video services. In traditional over the air broadcast television, revenues generated from advertising pay entirely for programming received by viewers, while in subscription-based video distribution frameworks, advertising revenues subsidize programming or contribute to profits of the broadcasters.

Media providers extend traditional print advertisement models and attempt to provide targeted advertising to their audiences and attempt to reach and engage with viewers across platforms. Some advertisements are useful to subscribers and provide relevant information regarding specific products or services. Historically, advertisements have been provided with programmed content based on linked sponsorship. In linked sponsorship models, advertisements are included in the programming content based on the nature of the content. For example, an advertisement for motor oil might be included with car racing programming. Even with linked sponsorship advertising, the conversion of the advertising spend to product sales revenue is largely ineffective. Most advertisements do not have a high probability of affecting a sale. The shortcoming in conversion of advertising to sales is a result of the inability to effectively target the advertisements and products to the viewers' preferences, desires, values, and needs.

Previous attempts to better target advertisements to users have focused on knowing attributes of the target viewer to determine the appropriateness of a particular advertisement for a particular kind of viewer. To make advertising dollars more effective, advertisers target their advertising to individuals who are more likely to have an interest in the advertised product. To accurately target individuals, the advertiser must know something about the individual. Previous advertising models assigned specific areas of interest to identified classes of consumers based on demographic information. One problem with this approach is the lack of accuracy and commercial efficiency in the models. The lack of reliable profiling of demographic data on viewers and subscribers, individualized or personalized advertising targeting is not effective. An overly broad campaign (i.e., not sufficiently focused) is not likely to attract or convert a sufficient number of viewers into consumers. Too narrow a campaign is likely to be lacking appeal and is likely to miss viewers and fail to provide sufficient opportunity to convert viewers to consumers.

Previous attempts to improve targeted advertising have included identifying individual's behaviors by tracking a user's habits by monitoring websites that the user visits, and offering targeted advertising based on the content of the visited websites. However, behavioral profiling has had only limited success in improving advertising effectiveness. Further, while subscriber viewers' preferences can be surveyed or correlated to past purchases and responses, these attributes often provide only marginal improvements in sales conversions as well.

To maximize effectiveness of their ad campaigns, advertisers want to accurately target individual viewers based on accurate and improved understanding of viewers' propensity to purchase specific types of products and services. Viewers prefer to receive advertisements relating only to products of personal interest rather than solicitations that are not relevant.

SUMMARY

The invention includes systems and methods that improve the effectiveness of targeted advertising of media content providers. The systems and methods of the invention select and distribute advertising materials on selected media content based on personality profiles of brands, content items, and audiences. The invention determines the personality of a brand by feeding its external, public communication to an artificial intelligence system that perceives and interprets characteristics of the communications. Similarly, the invention determines the personality of content items by interpreting, understanding, and discerning features and qualities of the content items based upon communications characterizing the content items, including written copy, transcripts of the content items, and other public communications related to the content items. Further, the invention determines the personality of an audience by analyzing communications related to the audience, including notes, journal entries, and other writing samples of representative audience members. The systems and methods of the invention analyze and determine the personality of an advertising material (i.e., part of the brand) in a similar fashion. The systems and methods of the invention identify an audience (with its personality) consuming a content item (with its personality) and identify an advertising material (brand) for placement within the content item. Experience has shown that if an audience is consuming content, they likely enjoy the (personality of the) content, and if an advertising material with the same personality is positioned within that content, the audience will likely enjoy the advertising material as well.

Once the invention determines a brand's personality and an audience's personality, the systems and methods of the invention evaluate multiplatform content offerings and identify the content item that has the closest personality to the brand personality and to the audience personality. In addition to identifying content with the closest personality to the brand, the invention provides insights to other content that can be associated with the brand to move the brand in a different direction. For example, while a brand at this time may not convey extraversion, the insights afforded by the invention allow selection of content items and advertising materials to move the brand toward conveying extraversion. The invention analyzes a brand's personality, an audience's personality, and a content item's personality and provides insights based on similarities and differences in profile elements that make up the personalities. The systems and methods of the invention identify relevant profile elements and provide graphical user interfaces with which to further examine the identified profile elements. Advertising customers can then take advantage of these insights and associate their advertisements to identified content, thus providing audiences with a more effective, context-based communication.

Previous systems to improve targeted advertising, including early versions of commercial offerings related to the claimed invention, sought to address only program and advertisement relationships while failing to address brand comparisons and audience personalities. The new systems and methods of the invention expand capabilities of previous systems to identify relationships and metrics previously unknown. The computer methods of the invention expand the capabilities of the system to consider profile elements and their relationships in a (more than) fifty-dimensional space. The invention analyzes, converts, and reduces large databases with more than fifty variables into relevant profile element sets that are displayed as radar graphs and provide intuitive reading and insight extraction for any user. The invention instantiates institutional and individual marketing and brand expertise with processes that identify strengths and weaknesses of personality of a brand against the market in which it operates. Similarly, the invention identifies the most relevant content items and refines the global set of content items to the most relevant content items related to the personality of the brand. Likewise, the invention analyzes profile elements of audiences and incorporates the audience, content, and brand personalities to provide insights related to the different factors. The invention generates and displays radar graphs to provide intuitive visualizations of the relationships among the brand, content, and audience and to facilitate marketing, advertising, and branding actions.

The invention intelligently reduces profile element variables, and the databases instantiating the profile elements, from fifty dimensions to a more manageable number (e.g., twelve profile elements), facilitating the reading of a brand's personality and crossing it with audiences and different types of content. This allows the invention to be used by any user without the need for deep statistical or mathematical knowledge.

The computer methods of the invention include algorithms that reduce the processing power and computing time needed by identifying the most relevant profile elements and discarding less relevant variables, thereby reducing computer processing time needed to construct and visualize the profile element relationships. Constructing and generating graphical representations of fifty-variable datasets is computationally intensive. When performed in a client-server environment, the dataset transfers over the communication networks are enormous and contribute to data traffic problems and compromised performance. The invention processes the datasets and reduces the number and complexity of the computations and transfers, while preserving the most relevant profile elements. Incorporating audience personalities and profile elements provides additional insights into brand and content acceptance and enhances the ability to match content and brands and audiences. The invention provides quick and efficient comparisons between the personality of a brand and tens or hundreds or thousands of content items and different audiences.

Expanding brand comparisons across market segments and competitors provides insights for further development of a brand's personality and its movement toward or away from identified profile elements.

The systems and methods of the invention determine the personalities of a brand, a content item, and an audience by providing communication documents to an artificial intelligence system that perceives and interprets characteristics of the brand, content item, and audience. The invention determines a brand's personality, a content item's personality, and an audience's personality and provides additional insights based on similarities and differences in profile elements that make up those personalities (i.e., "personality profile"). The systems and methods of the invention identify relevant profile elements and provide graphical user interfaces with which to further examine the identified profile elements. In this fashion, users can then incorporate the personality insights in the context of the brand and content and audience to identify and select relevant advertising materials to further provide more effective, context-based communication.

The invention provides an insight generation tool that receives brand, audience, and content personalities and determines and provides client and agency insights. The invention helps determine individuals' personalities, which indicate the likelihood of the user's preference of different content, brands, products, services, and activities. The invention provides a deeper understanding of audiences and potential audiences and provides a holistic view of the manner in which brands, content, and audiences interact. The invention provides insights that are used to guide brand, content, and audience engagement and to produce and adapt brands, campaigns, communications, and content for a given audience. Brand personality is matched with audience personality, which is matched with content personality. Brand personality profiles are matched with audience personality profiles, which are matched with content personality profiles. Agency content and branded media content can be identified and distributed over video distribution networks.

The invention identifies personality based upon five basic traits, as well as values and needs. The five basic traits include openness to experience, conscientiousness, extraversion, agreeableness, and emotional range. These personality traits are often thought of as characteristic patterns of thinking, feeling, and behaving and may be composed of many different qualities or features or elements. Although personality can change over the course of time, core characteristics tend to remain steady over a lifetime. Countless characteristics that combine in an almost infinite number of ways make it difficult to classify personality into types.

The invention analyzes brands, content, and audiences and identifies personality traits. The invention identifies profile elements that relate to the five basic personality traits outlined above. "Openness" is the desire to seek out new and unfamiliar experiences. "Conscientiousness" represents the tendency toward self-discipline and planning over impulsivity. "Extroversion" refers to whether one draws energy from time spent with others or time spent alone. "Agreeableness" is how cooperative, polite, and kind one tends to be, while "emotional range" encompasses emotional stability and one's tendency toward anxiety and self-doubt. Each of the five basic personality traits include many unique aspects, characteristics, and profile elements of varying degrees that comprise personality. To bring increased levels of accuracy and to provide additional insights regarding personality profiles of the brand, content items, and audience, the invention also identifies profile elements beyond the five basic personality traits, including "values" and "needs" that characterize the brand, content items, and audience.

Brand Analysis

The invention identifies profile elements of a brand by feeding the brand's communications to an artificial intelligence system that perceives and interprets characteristics of the communications, and the invention modifies the formation or maintenance of an index of pages for search purposes and identifies brand profile elements that characterize personality traits, values, and needs of the brand. The profile elements include intellectual curiosity, emotional consciousness, sensitivity to beauty, and eagerness to try new things, among others. The invention also identifies brands as self-disciplined, aware of their duties, and wanting to achieve above external measures or expectations. To identify profile elements of a brand, text representations of commercials, print (and other) advertisements, on-air promotions, and other branding materials, such as social media posts, radio commercials, and other branding materials are submitted to a cognitive computer system. The invention can edit the text documents input to the cognitive computer system to remove trivial or other "machine-like" or generic text descriptions. For example, the invention eliminates generic (direct mail and other) text that is a part of a brand's marketing collaterals but is not specific to the brand. Examples of text that is likely to be eliminated include promotion text (e.g., "20% off"), informational text banners (e.g., "hot summer sales"), dates ("through Tuesday, March 24") and other non-brand-specific materials. The invention then delivers text indicative of the brand speaking rather than text and other information that is generic or otherwise not indicative of the brand.

The cognitive computer system receives (structured and) unstructured data and applies natural language processing, information retrieval, knowledge representation, automated reasoning, data mining, text analytics, and machine learning to identify and construct personality traits of the brand. The cognitive computers arrange often unstructured data in a systematic fashion to identify profile elements and personality traits of the brand. Unstructured data can include books, journals, documents, audio, video, images, and other unstructured text such as a body of an e-mail message, Web page, and word-processor document. Structured data outputs of the cognitive computers can include profile elements and personality traits.

After identifying profile elements, including values, needs, and personality traits of the brand), the invention dynamically creates a personality map of the brand showing profile elements as axes on the map (graph). In one example embodiment of the invention, twelve profile elements are dynamically selected, including self-discipline, openness to experiences, imagination, harmony, extroversion, search for emotions, emotionality, responsibility, artistic interests, amiability, audacity, and focus. In other example embodiments of the invention, the system dynamically chooses twelve other profile elements. In either case, the dynamic choice and number of profile elements is based on the analysis of a specific brand. To determine personality traits, the systems of the invention can utilize sentiment analysis, grammatical analysis, semantic analysis, and combinations of different analysis techniques. In one example embodiment of the invention, the system maps the profile elements and provides a graphical user interface to visualize the mapped elements to provide insights to the brand, content, and audience. For example, systems and methods in accordance with the invention identify a number of profile elements that contribute to the personality of the brand and display a radar graph of the profile elements. Additionally, in one example embodiment of the invention, the brand managers, marketing and promotions managers, and others coordinating brand-content-audience campaigns can "force" a particular profile element to be mapped in the graphical user interface to provide additional insights. For example, if a particular profile element is very desirable or otherwise under scrutiny, the choice may be made to display that particular profile element even if the algorithms may not select that profile element for display based upon the algorithm process and criteria. Similarly, a profile element can be omitted from display as well. For example, if a profile element is undesirable or has not provided valuable insights in the past, the choice may be made to omit that particular profile element from display, even if the algorithm(s) would select that profile element for display.

The invention also identifies the personality of other brands. In this fashion, direct comparisons can be made from one brand to another or from one brand to an aggregate of other brands. These comparisons inform customer choices regarding content (e.g., including digital content and other media assets). Similar analyses are conducted on other brands to determine their degrees of self-discipline, awareness of their duties, and their want to achieve above external measures or expectations, among others profile elements. To perform personality analysis of the other brands, text representations of commercials, print advertisements, other advertisements, on-air promotions, and other branding materials, such as social media posts, radio commercials, and other branding materials related to the other brands are submitted to the cognitive computer system. The cognitive computer system applies natural language processing, information retrieval, knowledge representation, automated reasoning, and machine learning to identify and construct personality traits of the other brands based on profile elements. Comparisons between brands can be made by running each brand analysis individually and then comparing the results. The elements of the profile and personality traits can be obtained from the invention to be identical to those of the original brand analyzed to provide a logical comparison.

After identifying profile elements, including values, needs, and personality traits of the other brands, the invention creates profile element maps of the other brands showing the same personality profile elements that were dynamically analyzed with respect to the initial brand. To have meaningful comparisons and to glean accurate insights, the same profile elements are identified and mapped. In the example embodiment of the invention described above, twelve profile elements were dynamically selected, including self-discipline, openness to experiences, imagination, harmony, extroversion, search for emotions, emotionality, responsibility, artistic interests, amiability, audacity, and focus. Customers can then use these profile element maps to inform their choice of content for their advertisements. In other example embodiments of the invention, the system dynamically chooses twelve other profile elements for a brand and uses the same profile elements to compare other brands or other aggregates of brands. In each case, the dynamic choice and number of profile elements is based on the analysis of the initial specific brand.

Audience Analysis

The invention then analyzes an audience and categorizes groups based on the same profile elements that were dynamically determined with regard to the brand. The same profile elements (values, needs, and personality traits of the brand) are used by the invention to create a personality map of the audience with the same profile elements as axes on the map (graph). In the example embodiment of the invention above, the profile elements were dynamically selected for the brand and included self-discipline, openness to experiences, imagination, harmony, extroversion, search for emotions, emotionality, responsibility, artistic interests, amiability, audacity, and focus. In performing the audience analysis, the system maps the audience profile elements to make associations and insights between the brand personality and the audience personality. To perform this audience analysis, the systems and methods of the invention identify profile elements of individual members of the target audience. For example, psychographic characteristics are surveyed and identified, such as needs, hopes, concerns, values, and aspirations. Audience member thoughts, beliefs, and knowledge are also identified. The identification can take the form of a cluster analysis where a number (e.g., 600) of audiences are interviewed and/or surveyed, and based upon those answers/responses, clusters are created and described using the profile elements. Additional inputs to the cognitive computer system to identify audience profile elements can include teams of sociologists, anthropologists, and cultural historians drafting and refining documents as if a particular personality type was speaking and the document was a transcription of that speaking.

Sociology, anthropology, and cultural historians research social life and culture to understand the causes and consequences of human action and attempt to link personality and behavior. That is, personality traits are related to profile elements. A personality trait of agreeableness may be a trait of a person that is empathetic. Agreeable people may be friendly, warm, and tactful, taking into account other people's feelings. Agreeable people may also tend to be trusting, modest, straightforward, and compliant. Agreeable people may be more likely to help others out—which may be partly due to greater empathy.

Additionally, people with the personality trait of openness may be passionately impulsive. Passionate people are willing to be uncomfortable, and they are willing to push themselves outside of the known, safe, and predictable to learn more about a task or item at hand. Impulsivity is a tendency to act with less forethought, reflection, or consideration of the consequences. Passionately impulsive people are strongly invested in a task at hand without deep consideration or planning related to the task. The invention identifies profile elements of the particular audience persona that characterize their collective personality traits.

Dedicated optimism is characterized by a cheerful perspective on the world and a willingness to strive to see it better. Dedicated optimists do not worry about the opinion of others and seek experiences. For them, family, gratitude, and dignity prevail. Dedicated optimists are motivated by having fun, entertaining, learning about the history of the world, and learning about health and nutrition. They value optimism, love, gratitude, and dignity and are likely to have personality traits of openness and extroversion.

People with a tendency toward persistent fight profile elements are likely to base their persistence on a personality trait of conscientiousness and are likely to have a negative correlation with emotional range and extroversion, having a tendency away from anxiety and self-doubt and to draw energy from time spent alone. Those with persistent fight can be described as tenacious and resolute in a positive sense of the trait.

Narcissistic explorers are characterized by high self-esteem and success in what they propose. They believe that the future is today, so they strive to live to the fullest. The have personality traits related to openness and away from emotional range and agreeableness. They are interested in sharing experiences with friends and with the world. Narcissistic explorers do not judge others for what they do and seek to undertake a life of adventures and changes. They care a lot about themselves. Narcissistic explorers are motivated by connecting with the world and sharing with friends. They value honesty, respect, and caring for themselves.

In analyzing the audience, the invention maps profile elements and the degree to which the audience shares these profile elements with the brand (and with the content items, as described further below). Audiences characterized by the invention are not necessarily television audiences. While audience members may also be viewers, the audience is not quantified in terms of television ratings or consumed of content items. Further, they are independent and are not associated with a particular content item or brand. The invention analyzes and characterizes the audience as a forecast rather than as an analysis of actual (consumption) results. The personality profile of an audience is created based on its (written or other) materials provided to the cognitive computer system and not based upon which content the audience is watching. An audience may have the same personality profile as a particular content item, but this does not mean that the audience will be consuming it. The two phenomena (profile and consumption) are not interchangeable. While there will likely be an increased propensity for an audience to watch those content items with a personality profile that matches the audience profile, profile and consumption are not identical.

For example, many different kinds of audiences can be used by the invention for insight generation. An interview of a loyal customer of the brand can be used to determine the personality of the audience of which the loyal customer is included. A social listening of a brand's followers can also be used, and a writing sample of an audience member can also be used to determine the personality of the audience. Higher volumes of input materials may likely lead to a more accurate portrayal of the personality of the audience.

Content Analysis

The invention takes the results of the brand analysis and the audience analysis and searches the content databases for content that matches the results of the brand analysis and the audience analysis. Content analysis can be thought of as the content itself speaking (through its articulated text representations of the content, including scripts, on-air promotions for the content, and other documents). The invention "hears" how the content speaks and tells it who it is (identifies its personality). Identified content (e.g., digital content, media assets, and other content) can include programs, channels, genres, web content, and social network content. The invention ranks the identified content by relevance or accuracy in the matching based on matching processes described below. As was the case with the audience analysis, the analyzed content items produce the same number and type of profile elements identified during the brand analysis to provide an intuitive visual comparison.

The profile elements can include values, needs, and personality traits. Personality traits can be further broken down into descriptors and tendencies that illustrate the personality trait. For example, the personality trait of openness can be based on tendencies such as adventurousness, artistic interests, emotionality, imagination, intellect, and authority-challenging. Similarly, conscientiousness can be based on personality, achievement striving, cautiousness, dutifulness, orderliness, self-discipline, and self-efficacy.

Additionally, extraversion may be based on gregariousness, outgoing, excitement-seeking, cheerfulness, assertiveness, and activity level while agreeableness can be based on altruism, cooperation, modesty, uncompromising, sympathy, and trust. Additionally, emotional range may be based on tendencies including fiery, prone to worry, melancholy, immoderation, self-consciousness, and susceptible to stress.

In addition to breaking personality traits down into more granular tendencies and descriptors, needs and values also avail themselves to this examination. For example, needs include tendencies such as excitement, harmony, curiosity, ideal, closeness, self-expression, liberty, love, practicality, stability, challenge, and structure. Values include descriptors such as self-transcendence/helping others, conservation/tradition, hedonism/taking pleasure in life, self-enhancement/achieving success, and open to change/excitement. Additionally, the content (e.g., program, channel, genre, etc.) analysis can be mapped and overlaid with the analyses of the brand and the audience for a finer examination of individual personality traits.

Example embodiments of the invention include computer systems and methods for visualization and matching of a brand with a media asset. In one embodiment, a system and method include analyzing the brand using a brand source. The brand source can include communications materials, collaterals and other descriptions and characterizations of a brand. In one example embodiment, the brand source includes printed material. The methods include generating a brand personality based on the brand analysis, where the brand personality includes profile elements of the brand. Profile elements can include personality traits, values, and needs that characterize the brand. The systems and methods analyze a description of the media asset and generate a media asset personality of the media asset. The media asset personality includes profile elements of the media asset. As above, the media asset profile elements include personality traits, values, and needs that characterize the asset. The methods and systems then reconcile the generated brand personality and the generated media asset personality. In one example embodiment, the reconciliation includes comparing and matching the brand profile elements with the media asset profile elements and generating and presenting a visualization of the reconciliation of the brand profile elements and the media asset profile elements on a display. The generated and display visualization of the brand profile elements and the media asset profile elements can include generating a radar graph plotting profile elements of the brand and the media asset. The generated display and visualization can include determining a distance between each of the plotted profile elements of the brand and the same profile elements of the media content, and the matching is based on a multivariate distance for the profile elements.

In one example embodiment of the invention, the computer-implemented methods include identifying the media asset in which to advertise the brand based on the generated visualization. Computer-implemented systems and methods in accordance with the invention can also include creating a branded content media asset in which to advertise the brand based on the generated visualization. The generated visualization can include a personality weakness of the brand, and the methods can further include positioning the brand from an initial field to a new field based on the personality weakness. Similarly, computer-implemented systems and methods of the invention can base the generated visualization on a personality strength of the brand, and the methods can further include positioning the brand from an initial field to a new field based on the personality strength.

The systems and methods in accordance with the invention can also incorporate the audience personality. For example, one computer-implemented method can further include analyzing a description of an audience using one or more communications and generating an audience personality based on the audience analysis, where the audience personality includes profile elements of the audience. As with the brand and the content, the profile elements of the audience can include personality traits, values, and needs that characterize the audience. The invention then reconciles the generated audience personality and the generated brand personality and the generated media asset personality. The reconciliation can include comparing and matching the audience profile elements with the brand profile elements and with the media asset profile elements. The invention can then generate and present a visualization of the reconciliation of the brand profile elements and the media asset profile elements, and the audience profile elements. As above, the generated and display visualization of the brand profile elements and the media asset profile elements and the audience profile elements can include generating a radar graph plotting profile elements of the brand and the media asset and the audience. The generated display and visualization can include determining a distance between each of the plotted profile elements of the brand and the same profile elements of the media content and the audience, and the matching is based on a multivariate distance for the profile elements.

The systems and methods in accordance with the invention can include additional analysis, display, and visualization features. For example, one example system and computer-implemented method of the invention can analyze an alternative description of a second audience using one or more communications related to the second audience and then generate a second audience personality based on the alternative audience analysis. The second audience personality can include profile elements of the second audience. The invention can then reconcile the generated second audience personality and the generated brand personality and the generated media asset personality, where the reconciliation includes comparing and matching the second audience profile elements with the brand profile elements and with the media asset profile elements and generating and presenting a visualization of the reconciliation of the brand profile elements and the media asset profile elements, and the second audience profile elements.

The generated and displayed visualization of the brand profile elements and the media asset profile elements and the second audience profile elements can include generating a radar graph plotting profile elements of the brand and the media asset and the second audience. The generated display and visualization can include determining a distance between each of the plotted profile elements of the brand and the same profile elements of the media content and the second audience, and the matching is based on a multivariate distance for the profile elements.

In addition, systems and methods of the invention can also add analysis of multiple brands and their personalities. For example, one example embodiment of the invention can include a computer-implemented method that incorporates analyzing a description of an additional brand using a communication for the additional brand and generating an additional brand personality based on the additional brand analysis, where the additional brand personality includes profile elements of the additional brand. The reconciliation of the additional brand personality and the generated brand personality and the generated media asset personality can include comparing and matching the additional brand profile elements with the brand profile elements and with the media asset profile elements. The system can then generate, present, and display a visualization of the reconciliation of the brand profile elements and the media asset profile elements and the additional brand profile elements.

Comparisons can be made using the systems and methods of the invention. For example, a comparison and matching of the brand personality and the media asset personality can use at least ten personality traits, and the visualization can include at least twelve profile elements of the brand personality, the media asset personality, and the additional brand personality. Similarly, a comparison and matching of the brand personality and the media asset personality can use at least ten profile elements of the brand personality and at least ten profile elements of the media asset personality. Other profile elements can also be used as well. In one example embodiment, the invention compares and matches the brand personality and the media asset personality based on the profile elements and the generated and presented visualization of the reconciliation of the brand profile elements and the media asset profile elements that includes comparing at least ten most predominant profile elements of each of the media asset and of the brand and at least ten least predominant profile elements of each of the media asset and of the brand. In one example embodiment of the invention, a personality of a particular brand can be compared to the personalities of the "other brands" considered and how the choice of a particular media asset can move a brand toward or away from the "other brands." This can also include comparing at least ten most predominant brand personality traits to at least ten most predominant additional brand personality traits and to at least ten most predominant media asset personality traits, comparing at least ten least predominant brand personality traits to at least ten least predominant additional brand personality traits and to at least ten least predominant media asset personality traits, identifying an alternative media asset with alternative media asset personality traits that are more similar than the media asset personality traits of the media asset, and substituting the alternative media asset for the media asset in an advertising campaign.

In one example embodiment, the comparison can also include comparing at least ten most predominant brand personality traits to at least ten most predominant additional brand personality traits and to at least ten most predominant media asset personality traits, comparing at least ten least predominant brand personality traits to at least ten least predominant additional brand personality traits and to at least ten least predominant media asset personality traits, identifying an alternative media asset with alternative media asset personality traits that are more dissimilar than the media asset personality traits of the media asset, and substituting the alternative media asset for the media asset in an advertising campaign.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows an insight generation system architecture in accordance with the invention.

FIG. 6 shows a section of an example two-dimensional representation of profile elements database in accordance with the invention.

FIG. 7A shows an example of a highlighted view of profile element scores of a brand and content items in accordance with the invention.

FIG. 7B shows an example of a highlighted view of aggregate distances from a brand to content items in accordance with the invention.

FIG. 8A shows an example of ranking profile elements for closest content items for an example brand in accordance with the invention.

FIGS. 10B-10C show selected profile element listings based on strengths and weaknesses of a brand.

FIGS. 11B-11C show selected profile element listings based on strengths and weaknesses of a content items in accordance with the invention.

DETAILED DESCRIPTION

Figure 2A:
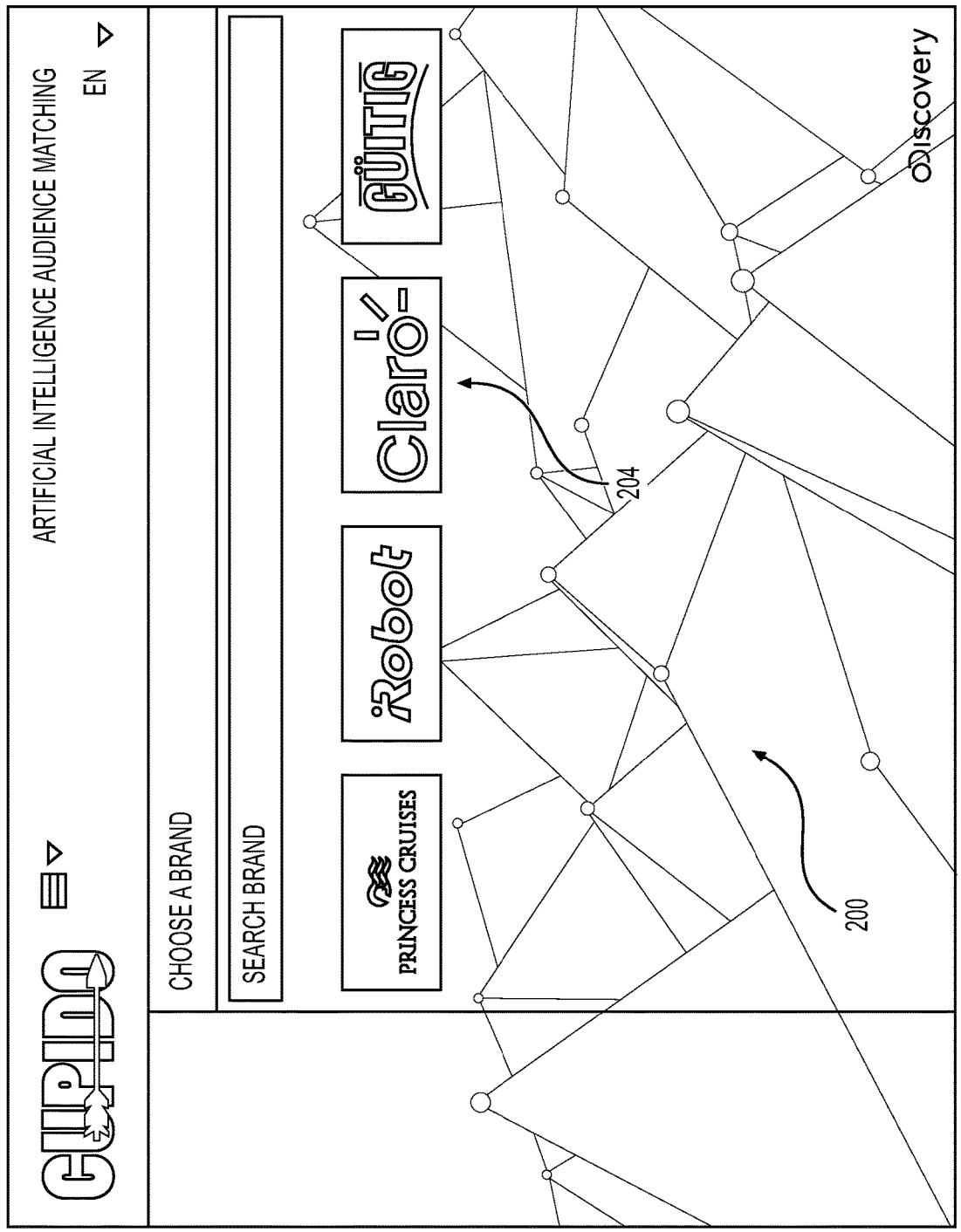
FIGS. 2A-2F show user interface screens illustrating a method of generating brand, audience, and content insights using an insight generation system in accordance with the invention.

The invention provides an insight generation tool that receives brand, audience, and content personalities and profile elements from an artificial intelligence system, such as a cognitive computer system, and determines and provides client and agency insights. Brand personality is matched with audience personality is matched with content personality. Profile elements of the brand, the audience, and the content are matched. Agency content and branded media content is identified, selected, and distributed over video distribution networks based on the relationship between the brand personality, the media content personality, and the audience personality. The invention improves the effectiveness of targeted advertising of media content providers by evaluating multiplatform content offerings and identifies content that has the closest personality. Advertising customers can then take advantage of these matches and associate their advertisements to that content, thus providing audiences with a more effective, context-based communication.

The invention receives profile elements, including personality traits, values, and needs from a cognitive computer server and generates insights based on the profile elements of the brand, the content, and the audience, and the relationship between the profile elements of the brand, the content, and the audience. The invention provides insight visualization to instantiate the relationship between the many profile elements. The invention determines the relationships between the profile elements using distance algorithms and selection criteria to limit the visual profile elements to a manageable representation. The invention provides an intuitive user interface to generate and visualize the profile elements' relationships and to create bases for advertisement campaign actions related to the brand, the content, and the audience.

FIG. 1 shows a block diagram of a network of data processing systems in which illustrative embodiments of the invention can be implemented. Insight generation system 100 includes network 199. Network 199 is the medium used to provide communications links between various devices and computers connected together within insight generation system 100. Network 199 can include connections, such as wire, wireless communication links, or fiber optic cables. Network 199 can represent a collection of networks and gateways that use the Transmission Control Protocol/Internet Protocol (TCP/IP) and other communication protocols to communicate with one another and with devices connected to the network 199. One example communication network 199 is the Internet, which can include data communication links between major nodes and/or host computers, including thousands of commercial, governmental, educational, and other computer systems that route data and messages. Insight generation system 100 can also be implemented over a number of different types of networks, such as for example, an intranet, a local area network (LAN), or a wide area network (WAN). FIG. 1 is one example of an environment of the invention and is not an architectural limitation for different illustrative embodiments of the invention.

Clients and servers are only example roles of certain data processing systems and computer systems connected to network 199 do not exclude other configurations or roles for these data processing systems. Insight generation server 150 and cognitive computer server 140 couple to network 199 along with storage units (databases) 160, 162, 164, 166. Software applications can execute on any computer in the system 100. User computers (clients) 102, 104, 106 are also coupled to network 199. A data processing (computer) system, such as servers 140, 150 and clients 102, 104, 106 can include data and can have software applications and/or software tools executing on them.

FIG. 1 shows an example system architecture and shows certain components that are usable in an example implementation of the invention. For example, servers 140, 150 and clients 102, 104, 106 are depicted as servers and clients only as example and not to imply a limitation to a client-server architecture. In another example embodiment of the invention, the system 100 can be distributed across several data processing (computer) systems and a data network as shown. Similarly, in another example embodiment of the invention, the system 100 can be implemented on a single data processing system within the scope of the illustrative embodiments. Data processing (computer) systems 102, 104, 106, 140, and 150 also represent example nodes in a cluster, partitions, and other configurations suitable for implementing an embodiment.

User computers 102, 104, 106 can take the form of a smartphone, a tablet computer, a laptop computer, a desktop computer, a wearable computing device, or any other suitable computing device. Software application programs described as executing in the insight generation system 100 in FIG. 1 can be configured to execute in user computers in a similar manner. Data and information stored or produced in another data processing system can be configured to be stored or produced in a similar manner.

Applications 122, 124, 126 implement an embodiment or function of the invention as described further herein. For example, application 122 receives an entry from insight generation server 150 that includes profile elements from cognitive computer server 140. Application 122 implements an embodiment or a function as described to operate in conjunction with application 152 on the insight generation server 150. For example, application 152 produces actionable profile elements based on personality data inputs created by application 142 of the cognitive computer server.

Servers 140 and 150, storage units (databases 160, 162, 164, 166, and user computers (clients) 102, 104, and 106 may couple to network 199 using wired connections, wireless communication protocols, or other suitable data connectivity. User computers (clients) 102, 104, and 106 may be, for example, personal computers or network computers.

In the depicted example, insight generation server 150 may provide data, such as boot files, operating system images, and applications to user computers (clients) 102, 104, 106. Clients 102, 104, 106 may be clients to server 150 in this example. Clients 102, 104, 106, or some combination, may include their own data, boot files, operating system images, and applications. Insight generation system 100 may include additional servers, clients, and other devices that are not shown.

Among other uses, insight generation system 100 may be used for implementing a client-server environment in accordance with the invention. A client-server environment enables software applications and data to be distributed across a network such that an application functions by using the interactivity between a user computer and a server. Insight generation system 100 may also employ a service-oriented architecture, where interoperable software components distributed across a network can be packaged together as coherent applications.

Cognitive Computer System

In one example embodiment of the invention, a cognitive computer system includes a personality insights service that receives questions such as, "What personality does this brand have?" In one example embodiment of the invention, a cognitive computer system receives written materials and performs text recognition of the written materials. The insights service builds an answer to the question by linguistically analyzing the written materials and predicting personality characteristics, profile elements, needs, and values based on the written text (materials). The cognitive computer system identifies the brands' uses and preferences on an individual or aggregate level. The service uses linguistic analytics to infer personality characteristics from digital communications, such as written copy, transcripts of advertisements, scripts, emails, text messages, tweets, and forum posts. The linguistic analytics also infer needs and values, such as a particular portion or feature with which a person agrees, and principles or standards that shape the manner in which a person behaves. The service infers portraits of brands that reflect the user's personality characteristics, profile elements, needs, and values. Other example cognitive computer systems perform image recognition or a combination of image and text recognition to characterize a document and provide a personality analysis, including profile elements. Examples of cognitive computer systems that can be used include IBM Watson, Facebook Rosetta, Microsoft Azure, Amazon Rekognition, Google Vision systems, and other text, linguistic, and image recognition systems. As a media provider, knowing about the individual viewers to whom you are marketing and selling becomes very important. The system tracks the words and sentence structures used in the written text and uses machine learning to determine the personality of brands, content, and audiences.

In one example embodiment of the invention, a cognitive computer system includes a database of files, including deconstructed document text based on written communications. The cognitive computer system receives and stores written communications and documents that include unstructured and semi-structured data. The cognitive computer system indexes the files and creates a search index from which the files are read. The documents and files are incorporated into a database of the cognitive computer system in a similar fashion to how a search engine builds its index.

The cognitive computer system is presented with a (written) question, such as, "What personality does brand X have?" The cognitive computer system uses the (written) question in its text form as a search query to search the cognitive computer database. The cognitive computer system matches the search query to information in the search index, identifies results of the search query, and ranks the results as relevant based on the indexing and other factors. Different cognitive computer systems can rank the results differently based on on-page factors (e.g., keywords, keyword density, document content, alt tags, title tags, URL structure, heading tags, meta tags, and other on-page factors) and off-page factors (e.g., quality links, comment links, article directories, link exchange schemes, forum postings, social networking promotion, and other off-page factors). The highest ranked search results are identified and used with the question to retrieve support evidence (e.g., written materials) from the database.

The accuracy of each of the search results is evaluated based on the retrieved written materials and scored. The scoring can include a list of profile elements, needs, and values, and a confidence score can be included with the results.

Insight Generation

The insight generation systems and methods of the invention extend the usefulness of raw profile elements and provide tools to see further into the dynamics and relationships of brands to content to audiences and to understand the nature, significance, and meaning of those relationships.

Insight Visualization

The insight generation systems and methods of the invention provide visualization of the brand(s), content, and audience personality traits and profile elements. The profile elements are then displayed as a multivariate data set in a radar graph. The invention determines the distance between points of the brand, content, and audience profile elements of the radar graph to determine similarities and differences between those profile elements of the brand, content, and audience. The invention maps the similarities and differences between the profile elements to provide a visual representation of the profile elements and to provide insight into how the brand, content, and audience can be modified to enhance or diminish selected profile elements. An example using systems and methods of the invention showing sample calculations, visualizations, and insight determinations is shown below.

Distance Determinations

As outlined above, the invention receives profile element descriptions from a cognitive computer system and processes the profile elements to identify and select a number of elements for visualization. Previous systems to improve targeted advertising, including early versions of commercial offerings of the claimed invention, sought to address only program and advertisement relationships and did not consider or address brand comparisons and audience personalities. The systems and methods of the invention expand capabilities of previous systems to identify relationships and metrics previously unknown. The computer methods of the invention expand the capabilities of previous computer systems to consider profile elements and their relationships in a (more than) fifty-dimensional space. The computer methods of the invention include distance determination algorithms that reduce the computer processing power and time needed by identifying the most relevant profile elements and discarding less relevant variables to reduce computer processing time needed to construct and visualize the profile element relationships. Incorporating audience personalities and profile elements provides additional insights into brand and content acceptance and enhances the ability to match content and brands and audiences. Expanding brand comparisons across market segments and competitors provides insights for further development of a brand's personality and its movement toward or away from identified profile elements.

The invention receives profile element descriptions from a cognitive computer system and processes the profile elements to identify and select a number of elements for visualization. The invention identifies and plots brand profile elements on a radar graph showing a series of values over multiple quantitative variables (i.e., the profile elements). The distance determinations below receive the approximately fifty profile elements and cull the profile elements to those most relevant. The invention then creates a radar graph of the relevant profile elements while eliminating outliers and accounting for commonality coefficients and explained variance.

Example distance calculations and the manner in which they are used to visualize the relationships between brands, audiences, and content are outlined below.

Assuming there is a set V (set of Brands and Contents), and a function D $$D: V \times V \to [0, \infty)$$

where D is such a function that given three elements in V, (that is, $x, y, z \in V$), D meets the following properties:
i. $D(x, y) \geq 0$.
ii. $D(x, y) = 0$, if and only if $x = y$.
iii. $D(x, y) = D(y, x)$.
iv. $D(x, y) \leq D(x, z) + D(z, y)$.

Two distances that can be used in the case where V:={Brands and Contents} are the Manhattan Distance and the Euclidian Distance. A Manhattan Distance is the distance traveled to get from one data point to another if a grid-like path is followed. The Manhattan Distance between two points is the sum of the differences of their corresponding distance components. In one example embodiment of the invention, there is a brand $M_j$ and an item of content $C_k$. In an example embodiment of the invention where 47 profile elements are used, the brand $M_j$ and the item of content $C_k$ are represented respectively as:

$$M_j = (x_1^j, x_2^j, \ldots, x_{47}^j)$$

and $$C_k = (y_1^k, y_2^k, \ldots, y_{47}^k)$$

From the above, the Manhattan Distance is given by:

$$D_M(M_j, C_k) = \sum_{m=1}^{47} |x_m^j - y_m^k| \quad (1)$$

Euclidian Distance can also be used in an example embodiment of the invention, assuming $M_j$ y $C_k$ are defined above. Euclidian distance measures "as-the-crow-flies" distance. The Euclidian Distance between two points is the square root of the sum of the squares of the differences between corresponding values. In the example embodiment of the invention outlined above with 47 profile elements, the Euclidian distance $D_E$ between points is given by:

$$D_E(M_j, C_k) = \sum_{m=1}^{47} (x_m^j - y_m^k)^2 \quad (2)$$

In the example embodiment of the invention further described below: "Multivariate distance" is referred to $D_M \circ D_E$, and "Univariate distance" refers to each of the components that is $|x_m^j - y_m^k| \circ (x_m^j - y_m^k)^2$.

Initial Scan

In one example implementation of the invention, a system performs a univariate exploratory analysis of 47 profile elements, discriminating by brand and content, for each of 68 brands and for 115 content items. The profile elements make up the personality traits. This initial scan determines and measures a central value for the distribution (i.e., a central tendency, or a typical score for that variable) and an extent to which the distribution is stretched or squeezed (i.e., dispersion, or how much variety there is in the scores) for each of the profile elements. The initial scan provides a manner in which to observe a central tendency and dispersion for each of the profile elements and to observe if they are all discriminating brands and content items, respectively.

The range of some profile elements between brands (and between content items) often is very wide, and the range of others (i.e., the ordinal measure of dispersion) is very narrow. In one example embodiment of the invention, there are no profile elements for either content items or for brands whose range is below 0.2 and therefore, it is not possible to eliminate any profile element based on this criterion.

Once the initial scan analysis has been carried out, the results show that there are groups of profile elements with very high values for the majority of the population (e.g., brands or content items as the case may be). Similarly, there are groups of profile elements with very low values. Calculating and plotting all 47 profile elements for each brand, item of content, and audience is computationally onerous and presents a crammed radar graph. As shown below, the invention uses a number of techniques to limit the data sets to visualize the relevant profile elements effectively and efficiently. For example, in one example embodiment of the invention, 12 profile elements are selected for visualization. The 12 (or other subset of) profile elements can be plotted on a radar graph and analyzed, as outlined below.

Display Options

In one example embodiment of the invention, a system and method use the 4 closest content items, by subtype of content, to construct a selection algorithm to select the profile elements to be identified and plotted on a radar graph. For example, one example selection algorithm uses Nearest Channel, Nearest Social Network, Nearest Genre, and Nearest Program to construct a selection algorithm. One example embodiment of the invention shown in FIGS. 3A-3E shows content 302 with "subtypes" of content that includes channels 306, social networks 312, genres 308, and programs 304. The three closest content items can include Nearest Channel, Nearest Social Network, Nearest Gender and Nearest Program. In another example embodiment of the invention, a system and method use the 3 closest contents in general to construct a selection algorithm. Further, in another example embodiment of the invention, a system and method modify the closest content items. That is, the system and method use the 4 closest contents by content subtype (e.g., Nearest Channel, Nearest Social Network, Nearest Genre, and Nearest Program) and eliminates the strengths and weaknesses criteria to construct a selection algorithm. The display can be constructed when there is only one brand. Examples of pseudo-algorithms (pseudo-codes) used to arrive at the displayed visualizations for each one of the example options are shown below. The algorithms identify example steps taken in accordance with the invention to prepare, analyze, characterize, sort, and display the profile elements information.

Example Distance Algorithm 1

First, the profile elements database 166 is standardized and divided into three different databases (tables), one for content, one for brands and one for audiences. FIG. 6 shows a section 600 of an example two-dimensional representation of profile elements database 166 before it is standardized and divided into the content, brands, and audience databases. While countless brands can be evaluated and displayed using the systems and methods of the invention, for clarity and brevity, only twenty-five brands are shown in FIG. 6. Likewise, for simplicity, FIG. 6 shows an abbreviated number of profile elements (e.g., columns 604, 606, 608, 610, 612, 614, 634, and 636) from the over fifty profile elements typically used by the invention to evaluate the brands, content, and audience. The section of a database file shown in FIG. 6 helps illustrate the many (50+)-dimensioned analysis performed by the systems and methods of the invention that cannot be performed or visualized on a two-dimensional page.

The insight generation server 150 indexes the database files and creates a search index 167 from which the database files are read. The documents and database files are incorporated into the profile elements database 166 of the system 100 in a similar fashion to how a search engine builds its index. The profile elements database 166 can be indexed by each profile element or by other key attributes of each database file. Each of the content, brand, and audience tables can be stored in a database as well, such as in content database 160, brand database 162, and audience database 164. These database files can also be indexed by insight generation server 150, and search indices 161, 163, and 165 can be created from which the database files are read. The insight generation server 150 verifies that there are no duplicate files in the database(s) 160, 162, 164, 166, and the names and fields of the database files are standardized (e.g., scaled, transformed to a common format, and other standardizations) for internal consistency and to enable relevant comparisons outlined below. In the example section 600, brand 688 is highlighted to show some of the calculations for profile elements 604, 606, 608, 610, 612, 614, 634, and 636.

Calculating Manhattan Distances

The systems of the invention calculate multivariate Manhattan distances, where the distances of each brand versus all the content items are calculated. That is, for each brand, the insight generation server 150 calculates a Manhattan distance based on the distance from each of the profile elements of the brand to each of the profile elements of each of the content items. FIG. 7A shows a highlighted view of the profile element score 715 for brand 788. FIG. 7A also shows a highlighted view of the profile element scores for each content item. For example, reference numeral 705 is the profile score for profile element 715 ("achievement striving"). The Manhattan distances are calculated from the profile element scores of each brand 788 to the profile element scores of each of the content items 710, 720, 730, 790. The system then aggregates the Manhattan distances from each brand to each content item as shown in FIG. 7B. One example aggregate Manhattan distance from the brand 788 to the content item 765 is shown as reference numeral 775. The systems and methods of the invention can graphically display the results of these calculations, but it is impossible to glean insights from these relationships by viewing over 4,300 vectors in a fifty-dimensional space. Instead, the systems and methods of the invention apply analysis algorithms to cull the dataset and graphically display brand, content, and audience relationships that provide useful and actionable insights.

Ranking Content Items by Manhattan Distances

Figure 8B:
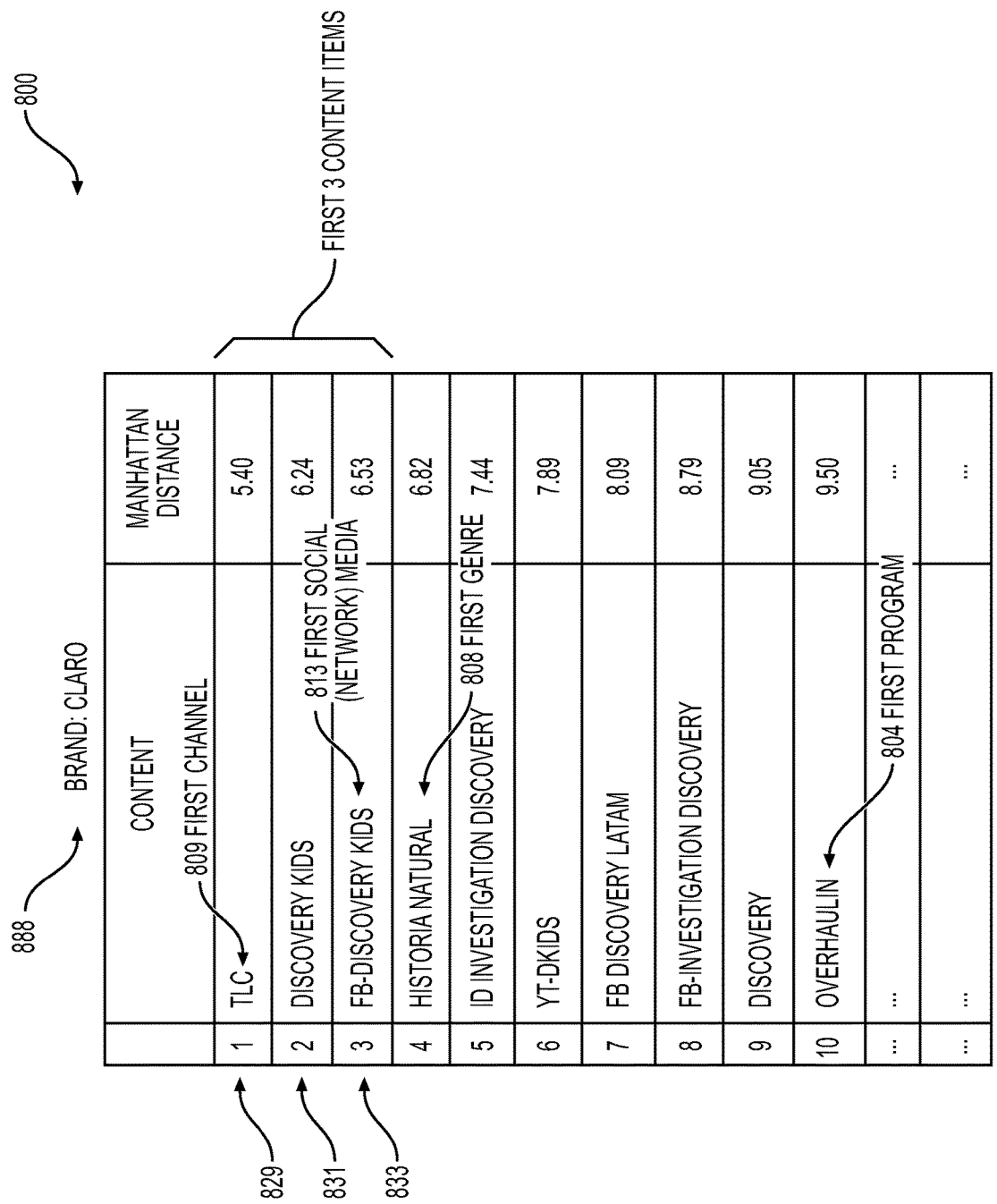
FIG. 8B shows an example of ranking profile elements for closest content items and content subgroups for an example brand in accordance with the invention.

For example, once the (Manhattan) distance is determined for each brand to each of the content items, the insight generation server 150 compiles the univariate distances and calculates and sorts the aggregate distances. In one example embodiment of the invention, the insight generation server 150 sorts the content items for each brand according to the distance from the brand to the content item, from shortest distance to farthest distance. FIG. 8A shows the aggregate (Manhattan) distances by content item. The content items 829, 831, 833 etc. are ranked by shortest aggregate Manhattan distance to the brand (788 from FIG. 7). In one example embodiment of the invention shown in FIG. 8A, the top ten ranked content items (based on shortest Manhattan distance) are then displayed in the platform 840 of a radar graph 846 as shown in FIG. 8A (and in FIGS. 4B and 4C). As shown in an example two-dimensional classification 800 in FIG. 8B, in one example embodiment of the invention, the insight generation server 150 determines aggregate Manhattan distances between all brands and all content items, including brand 888 and its respective 3 closest content items 829, 831, 833 and identifies the three closest content items (first three) 829, 831, 833 and the nearest channel (content item) 809, nearest social network (content item) 813, nearest genre (content item) 808, and nearest program (content item) 804, as outlined above and shown in FIG. 8B. Based on these content rankings by shortest Manhattan distance to brand 888, a list of content items between 4 and 6 items is generated. That is, just as in FIG. 8B, some of the three closest content items may also be a first channel, a first social network, a first genre, and/or a first program. So for the example shown in FIG. 8B, the comprehensive list of content items includes content item 829 (first content item and first channel), content item 831 (second content item), content item 833 (third content item and first social network), content item 808 (first genre), and content item 804 (first program).

The insight generation server 150 creates a fifty-plus dimension table and a corresponding database file characterizing the distances. That is, in the table, all brands and their respective three closest content items are saved along with the closest content items by subtype. One example embodiment of the invention shown in FIGS. 3A-3E shows content 302 with "subtypes" of content that includes programs 304, channels 306, genres 308, web 310, and social networks 312. The closest content subtypes can include Nearest Channel, Nearest Social Network, Nearest Genre, and Nearest Program, as described above with regard to FIG. 8B. It is not possible to compute and visualize manually the relationships of brands, content, and audiences in the more than fifty-dimension space that the invention performs. To determine the key relationships (e.g., between brands and content and audiences) and to glean insights from those relationships, the systems and methods of the invention apply profile analysis techniques as outlined below. From these relationships, the systems and methods of the invention identify and reduce the number of relevant profile elements and provide graphical user interfaces with which to further examine the identified profile elements. Advertising customers can then take advantage of these insights and associate their advertisements to identified content, thus providing audiences with a more effective, context-based communication.

Determining Top and Bottom Brand Profile Elements

Figure 9A:
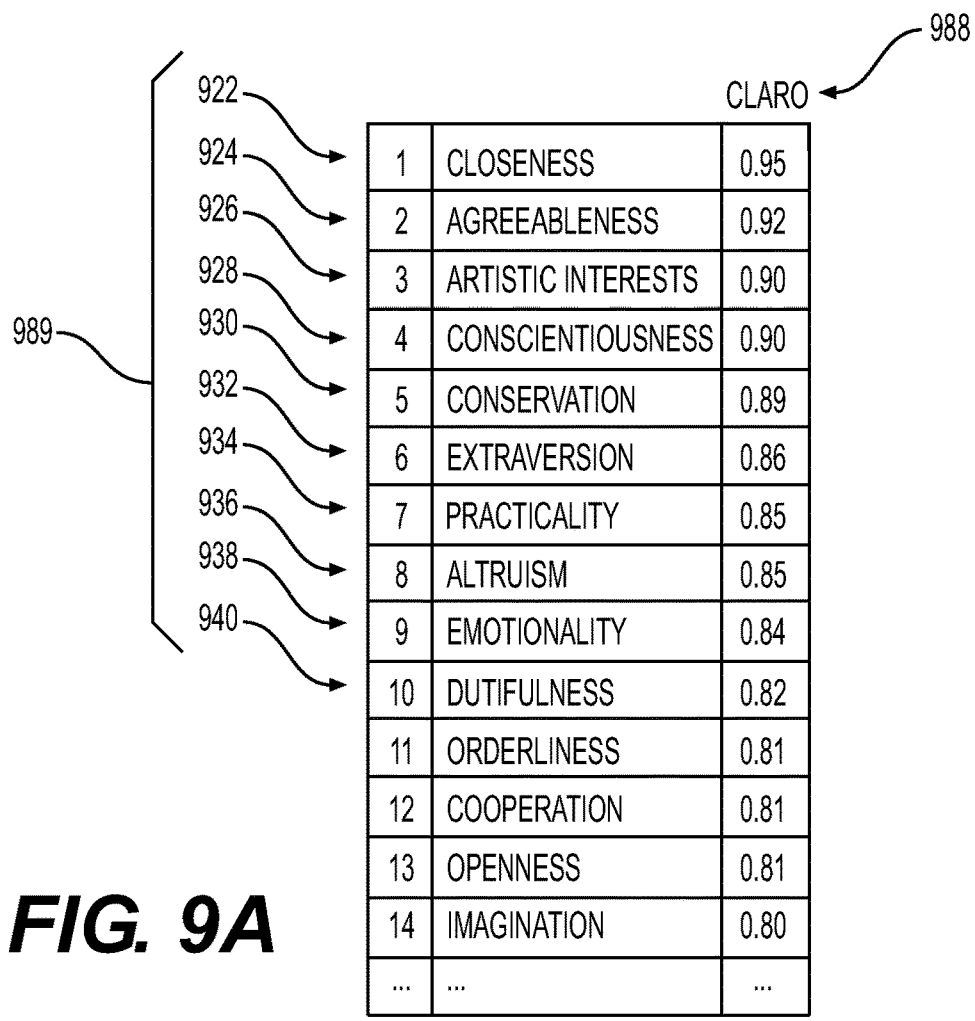
FIGS. 9A-9B show an example brand listing of top 10 and bottom 10 profile elements by brand.
Figure 9B:
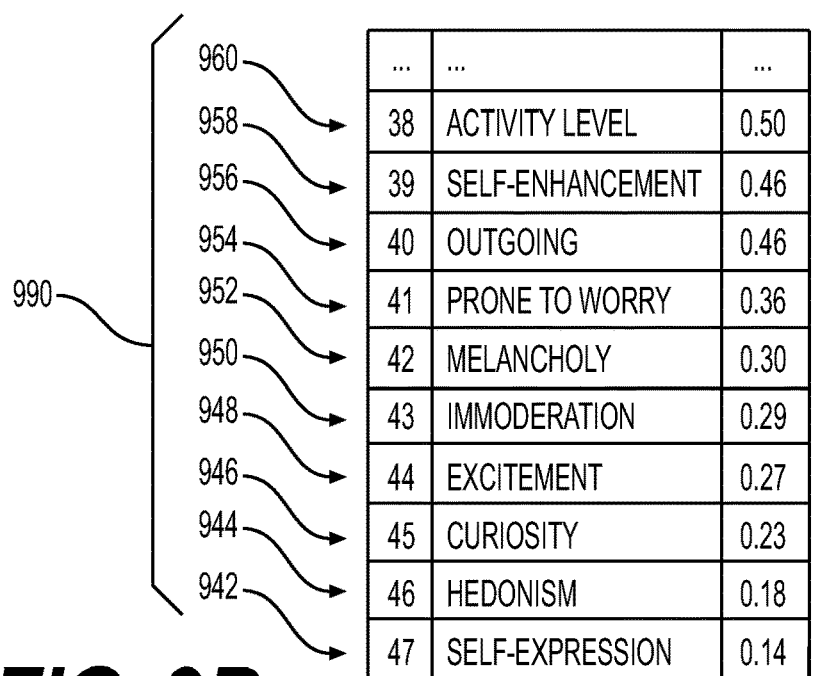

In one example embodiment of the invention, the insight generation server 150 culls the number of profile elements for further consideration and display (visualization) based on the respective distances from each brand to each item of content. To reduce the list of profile elements considered, the top and bottom profile elements for each brand are identified. For example, as shown in FIGS. 9A and 9B, for each brand, 10 variables (profile elements) with the highest profile element values (scores) and 10 variables (profile elements) with the lowest profile element values are identified by the insight generation server 150 and saved as a table (file) and stored in profile elements database 166. FIG. 9A shows highlighted brand 988 with the 10 profile elements with the highest profile element values 989, and FIG. 9B shows highlighted brand 988 with the 10 profile elements with the lowest profile element values 990. The insight generation server 150 equates the raw database vectors from FIG. 6 into a ranking. For example, in FIG. 6, for brand 688, the highest profile element score was 0.949503388 (see "closeness" reference element 622), followed by 0.9171652 (see "agreeableness" reference element 624). Similarly, the insight generation server 150 identifies the next eight highest profile element scores to create the 10 variables (profile elements) with the highest profile element scores 989 (in FIG. 9A). Likewise, as further shown in FIG. 6, for brand 688, the lowest profile element score was 0.1421456 (see "self-expression" reference element 642 in FIG. 6 and reference element 942 in FIG. 9B), which is designated in the Bottom 10 (reference element 990 in FIG. 9B). The next-lowest profile element score is 0.18154258 (see "hedonism" reference element 646 in FIG. 6). Similarly, the insight generation server 150 identifies the next eight lowest profile element scores to create the 10 variables (profile elements) with the lowest profile element scores 990. In other example embodiments of the invention, the insight generation server 150 selects more or fewer than 10 profile elements.

Determining Top and Bottom Content Item Profile Elements

Figure 9C:
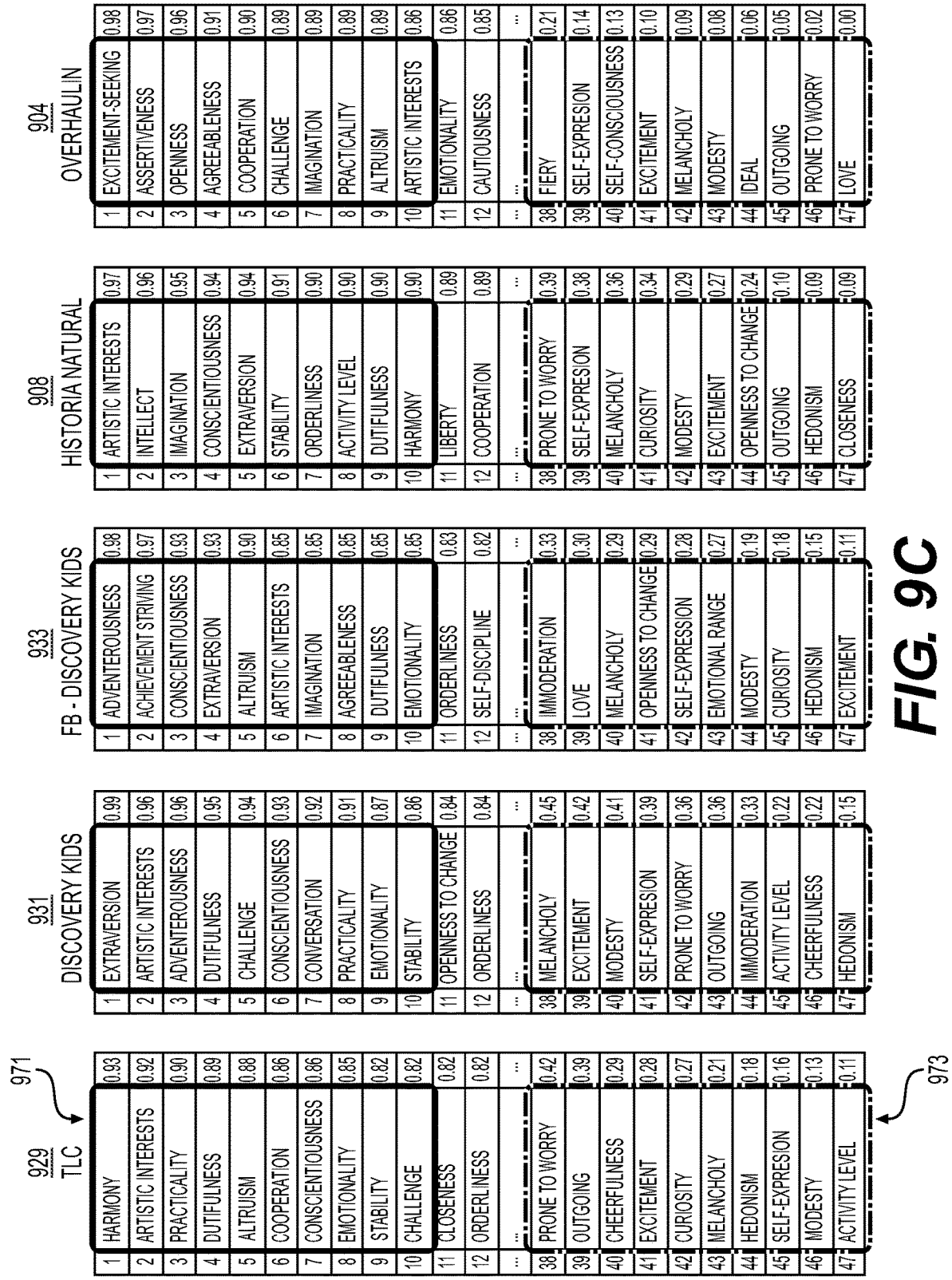
FIG. 9C shows an example of top 10 and bottom 10 profile elements by closest content items.

Similarly, as was done with the brand, the insight generation server 150 culls the number of profile elements for further consideration and display (visualization) based on the respective distances from each brand to each item of content. To reduce the list of profile elements considered, the top and bottom profile elements for each content item are identified. For example, as shown in FIG. 9C, for each closes content item 829, 831, 833, 808, and 804 determined in FIGS. 8A-8B, insight generation server 150 identifies the 10 profile elements with the highest profile element scores and 10 profile elements with the lowest profile element scores and saves these elements as tables (files) in profile elements database 166. FIG. 9C shows highlighted content items 929, 931, 933, 908, and 904 with the 10 profile elements with the highest profile element scores 971, and the 10 profile elements with the lowest profile element scores 973. The insight generation server 150 equates the raw database vectors from FIG. 6 into a ranking of the ten highest profile element scores 971. Likewise, insight generation server 150 equates the raw database vectors from FIG. 6 into a ranking of the ten lowest profile element scores 973. The highest and lowest profile element score determination is repeated for the other content items 931, 933, 908, and 904. As before, in other example embodiments of the invention, the insight generation server 150 selects more or fewer than 10 profile elements.

Determining Strengths and Weaknesses of Brands

Figure 10A:
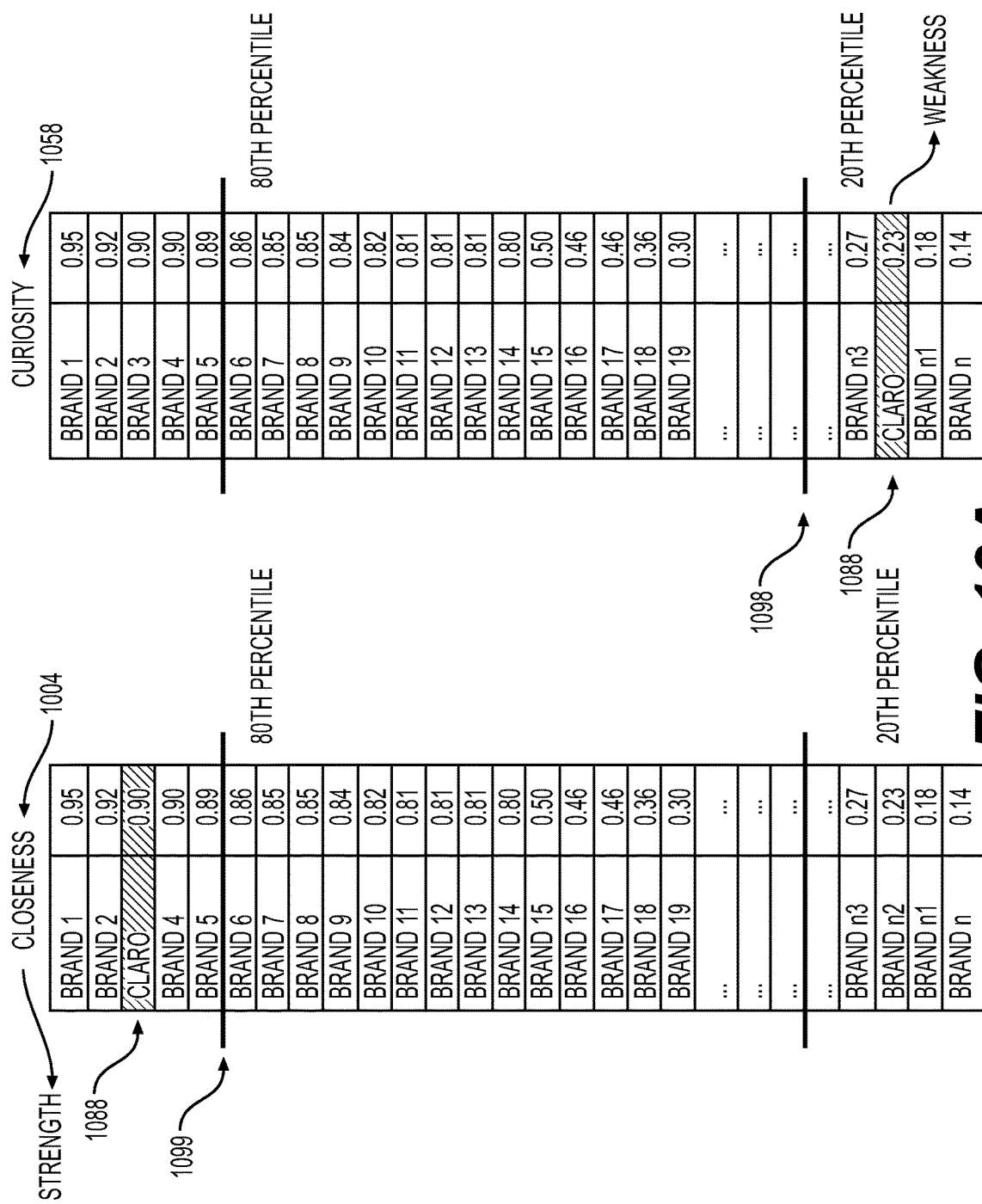
FIG. 10A shows an example determination of a brand's strengths and weaknesses in accordance with the invention.

For each brand, the strengths and weaknesses of the brands are determined. That is, those variables (profile elements) that are a strength of the brand with respect to other brands are sought, and the maximum strengths that are furthest from the bulk of the data are chosen. "Maximum strengths" are those profile elements that are furthest removed (higher) from the average-value profile elements. The maximum strengths can be thought of as outliers or other measurement points that differ most significantly (higher) from the other observed points. Each profile element for each of the brands and for each content item is processed by the insight generation server 150, and all brands and content are ranked based on their profile element scores. If the evaluated brand, such as brand 1088 in FIG. 10A, is above a predetermined threshold, that profile element is determined to be a "strength" of the brand. In the simplified example shown in FIG. 10A, for the profile element "closeness" 1004, the brand 1088 is above the predetermined threshold 1099, and closeness 1004 is deemed a strength of the brand. Similarly, if the evaluated brand, such as brand 1088 in FIG. 10A, is below a predetermined threshold 1098 for a particular profile element, that profile element is determined to be a "weakness" of the brand. In the simplified example shown in FIG. 10A, for the profile element "curiosity" 1058, the brand 1088 is below the predetermined threshold 1098, and curiosity 1058 is deemed a weakness of the brand. In this example case, a profile element is defined as a strength if the brand is above the $80^{th}$ percentile of the set of brands for that specific profile element, and a profile element is deemed to be a weakness if the brand is below the $20^{th}$ percentile of the set of brands for that specific profile element. In other example embodiments of the invention, different thresholds can be selected.

As shown in FIG. 10B, the strengths of the brand 1088 identified by the insight generation server 150 include modesty 1002 and closeness 1004. While the profile element closeness 1004 had the highest profile element score (as described above with regard to reference numeral 622 in FIGS. 6 and 922 in FIG. 9A), closeness 1004 was "not as different" for brand 1088 than it was for the other brands. As such, modesty 1002 was the highest strength for brand 1088. For those brands that were not above the $80^{th}$ percentile of the set of brands for that specific profile element, an "N/A" designation is shown in FIG. 10B.

Similarly, as shown in FIG. 10C, for each brand, those variables (profile elements) that are a weakness of the brand with respect to other brands are sought and the 10 weaknesses that are furthest from the bulk of the data are chosen. That is, "greatest weaknesses" are those profile elements that are furthest removed (lower) from the average-value profile elements. The greatest weaknesses can be thought of as outliers or other measurement points that differ most significantly (lower) from the other observed points. In this case, a profile element is defined as a weakness if the brand is below the 20th percentile of the set of brands for that specific profile element. In other example embodiments of the invention, different thresholds can be selected. For those brands that were not below the $20^{th}$ percentile of the set of brands for that specific profile element, an "N/A" designation is shown.

As shown in FIG. 10C, the greatest weaknesses of brand 1088 identified by the insight generation server 150 include profile elements immoderation 1052 and fiery 1054. While the profile element self-expression 1042 had the lowest profile element score (as described above with regard to FIG. 6 and FIG. 9B), self-expression 1042 was "not as different" for brand 1088 than it was for the other brands. As such, immoderation 1052 was the biggest weakness for brand 1088.

Determining Strengths and Weaknesses of Content Items

Figure 11A:
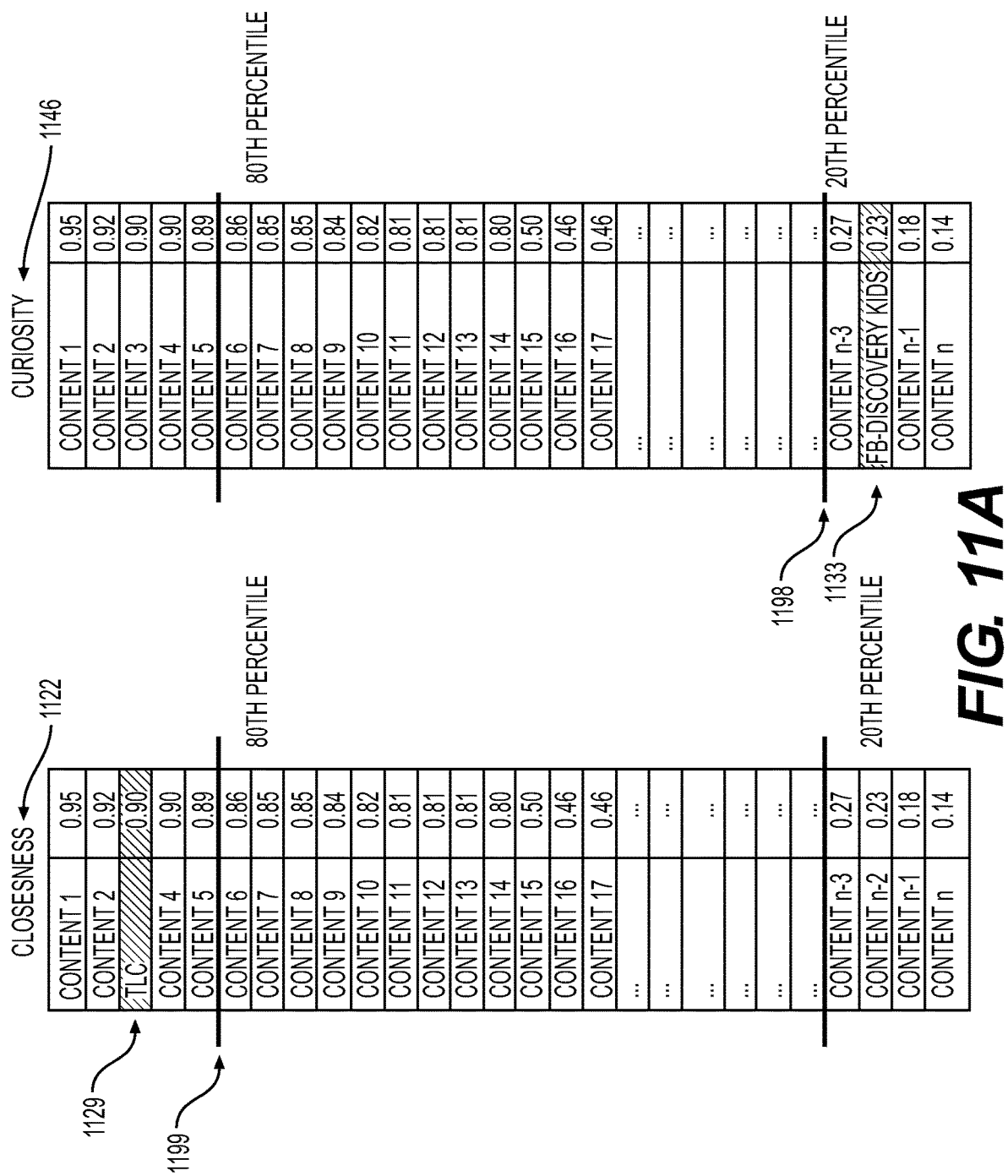
FIG. 11A shows determination of strength and weakness profile elements of content items in accordance with the invention.

In a similar fashion, the ten greatest strengths and ten greatest weaknesses are calculated for the individual content items as shown in FIGS. 11A-11C. That is, for each content item, those variables (profile elements) that are a strength of the content item with respect to the other content items are identified and the 10 strengths that are furthest from the bulk of the other content items are chosen. As before, each profile element for each of the brands and for each content item is processed by the insight generation server 150, and all brands and content are ranked based on their profile element scores. If the evaluated content item, such as content item 1129 in FIG. 11A, is above a predetermined threshold, that profile element is determined to be a "strength" of the content item. In the simplified example shown in FIG. 11A, for the profile element "closeness" 1104, the content item TLC 1129 is above the predetermined threshold 1199, and closeness 1104 is deemed a strength of the content item. Similarly, if the evaluated content item, such as content item 1133 in FIG. 11A, is below a predetermined threshold 1198 for a particular profile element, that profile element is determined to be a "weakness" of the content item. In the simplified example shown in FIG. 11A, for the profile element "curiosity" 1158, the content item 1133 is below the predetermined threshold 1198, and curiosity 1158 is deemed a weakness of the content item.

In this example case, a profile element is defined as a strength if the content item is above the $80^{th}$ percentile of the set of content items for that specific profile element, and a profile element is deemed to be a weakness if the content item is below the 20$^{th}$ percentile of the set of content items for that specific profile element. In other example embodiments of the invention, different thresholds can be selected. For those profile elements where the content item was not above the 80$^{th}$ percentile of the set of content items for that specific profile element, an "N/A" designation is shown. For those profile elements where the content item was not below the 20$^{th}$ percentile of the set of content items for that specific profile element, an "N/A" designation is shown.

As shown in FIGS. 11B-11C, for each content item, the systems determine those variables (profile elements) that are a strength of the content item and those profile elements that are a weakness of the content item with respect to other content items, and top 10 strengths and the top 10 weaknesses are identified and selected. That is, "greatest weaknesses" are those profile elements that are furthest removed (lower) from the average-value profile elements. The greatest weaknesses can be thought of as outliers or other measurement points that differ most significantly (lower) from the other observed points.

Reducing Profile Elements Based on Strengths-Weaknesses/Top-Bottom of Brands and Content Items To further refine the profile elements, in one example embodiment of the invention, the insight generation server 150 compares the strengths and weaknesses of the brand 1088 (such as the strengths and weaknesses of the brand shown in FIGS. 10B and 10C, respectively) to the strengths and weaknesses of the content items (such as the strengths and weaknesses of the content items shown in FIGS. 11B and 11C, respectively) and the univariate (aggregate) distances of the profile elements of the brand to the profile elements of the content items.

Specifically, the insight generation server further limits the number and type of vector candidates (brand-to-content-item distance comparisons) for display as profile elements on a radar graph. The manner in which the insight generation server calculates and determines the profile elements exponentially reduces the computing power needed to compute and map the vectors and to transfer the datasets over the communication network. Rather than calculate more than 4300 vectors, the insight generation server culls the profile elements of the content items and audiences to produce radar graphs that provide actionable advertising insights. The profile elements and insights are not buried under a mountain of computations or vectors that no user can interpret.

In one example embodiment of the invention, the insight generation server 150 identifies strengths and weaknesses of the brands that are strengths and weaknesses of the closest content items by subtype. In the truncated example above and shown in FIG. 10B, the insight generation server 150 analyzes brand 1088 and the top strengths 1002, 1004, 1006, 1008, 1010, 1012, 1014, 1016, 1018, and 1020 of brand 1088. Likewise, the insight generation server analyzes brand 1088 and the top weaknesses 1064, 1062, 1042, 1058, 1056, 1053, 1054, 1052, 1077, and 1079 as shown in FIG. 10C. In the example above shown in FIG. 108, for brand 1088, the top strengths are modesty 1002, closeness 1004, susceptible to stress 1006, altruism 1008, outgoing 1010, cheerfulness 1012, and reference elements 1014, 1016, 1018, and 1020, which represent that the profile elements did not reach the threshold percentile. Similarly, as shown in FIG. 10C, the top 10 weaknesses are immoderation 1052, fiery 1054, self-enhancement 1053, assertiveness 1056, curiosity 1058, self-expression 1042, self-efficacy 1062, and achievement striving 1064.

Figure 13:
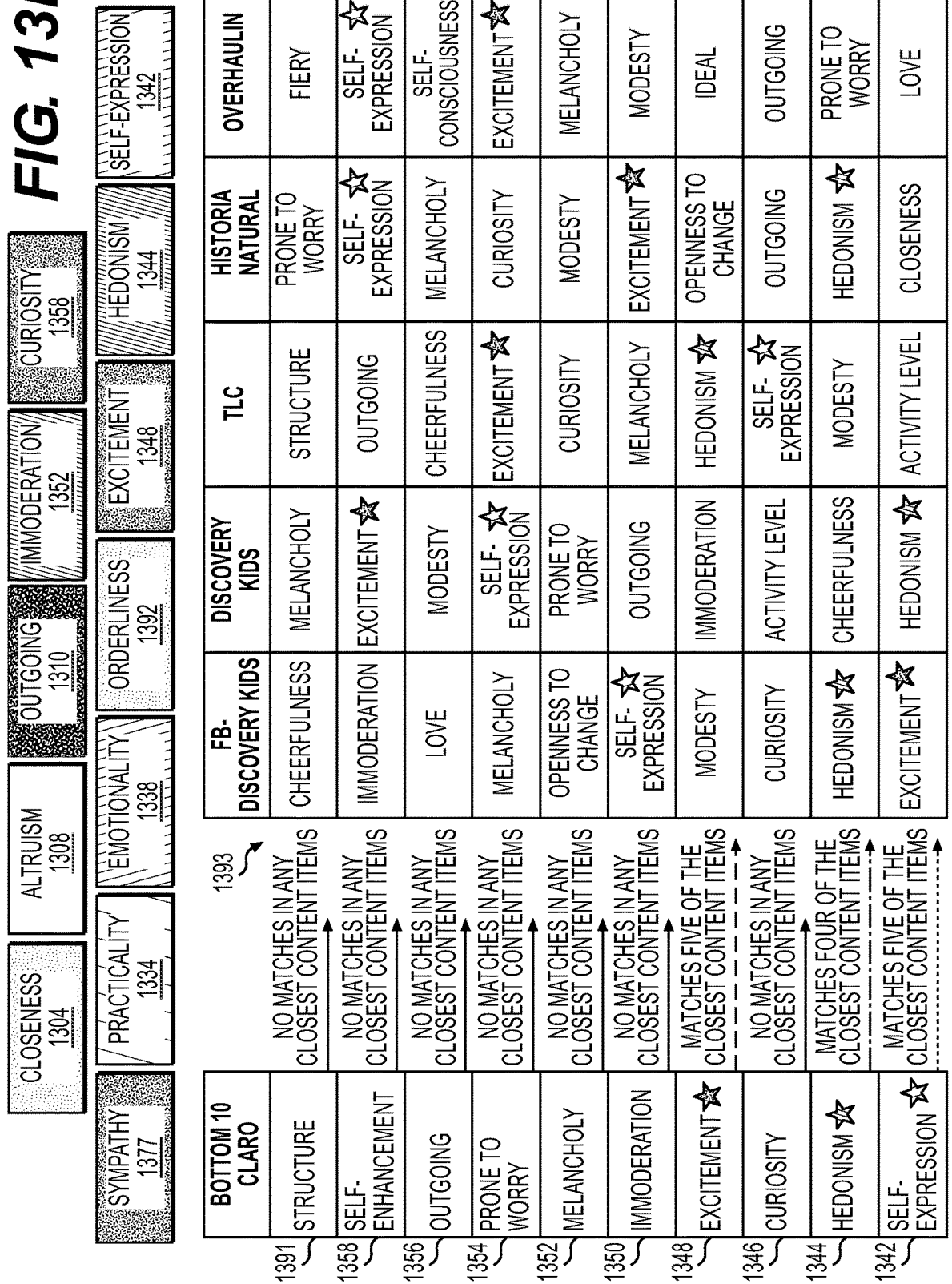
FIGS. 13A-13D show a simplified profile element selection process to introduce the complex selection process performed in accordance with the invention.

The insight generation server 150 performed similar operations on the closest content items, including the three closest content items 1129, 1131, and 1133 from FIGS. 11B-11C and the closest content items by channel, social network, genre, and program. The top strengths of the brand and the top strengths of the closest content items are shown in example comparison tables in FIG. 13A, and the weaknesses of the brand and the weaknesses of the closest content items by subtype are shown in FIG. 13B.

Figure 12:
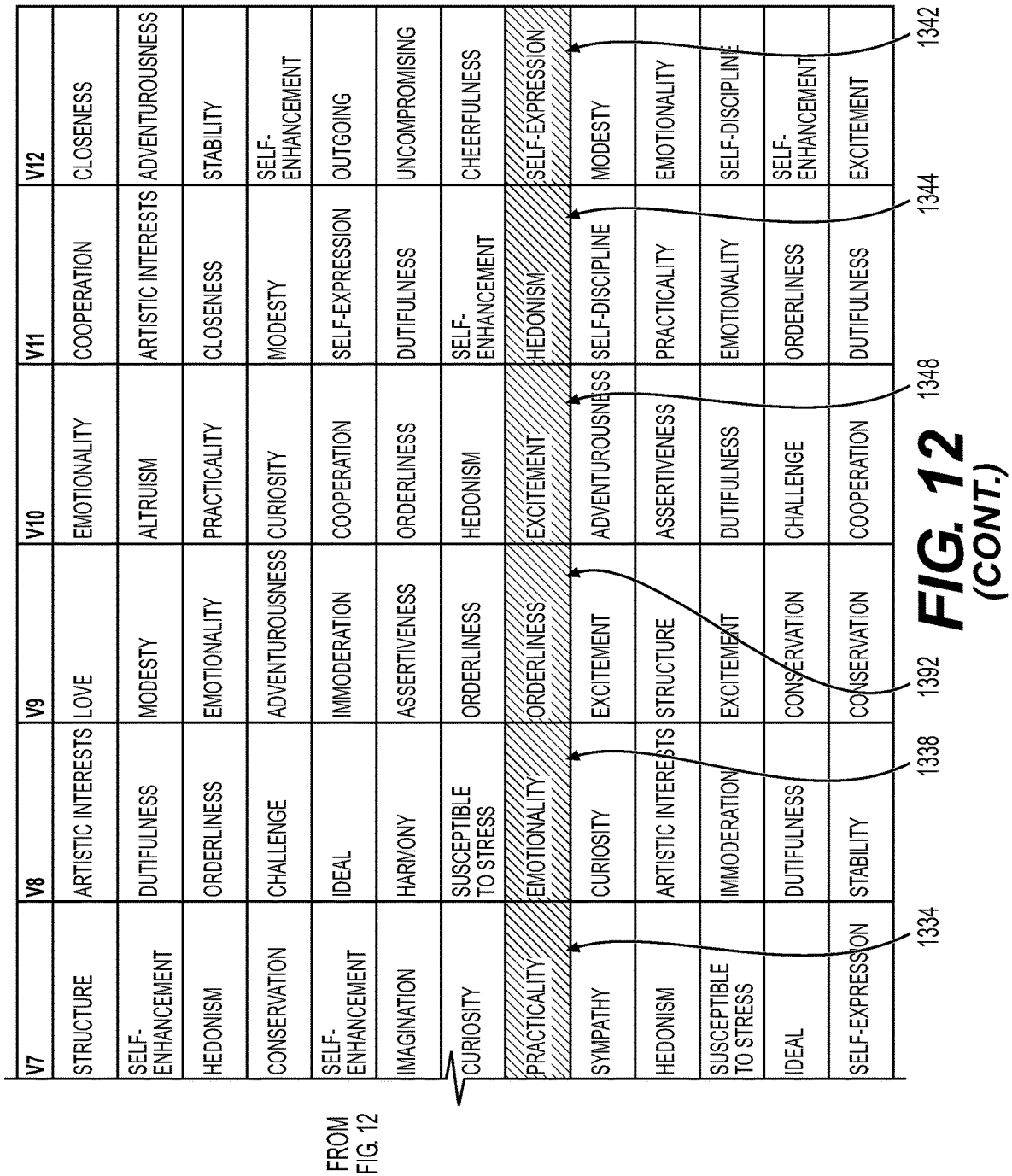
FIG. 12 shows a simplified table of selected profile elements for display, selected by brand in accordance with the invention.

To further reduce the number of profile element vectors to select and display, the invention compares the top strengths of the brand with the top strengths of the closest content items (and by subtype). The profile elements found in both top strength sets are selected for display for the radar graph. In the simplified example of FIG. 13A, profile elements 1022, 1036, and 1056 have corresponding profile elements in the top strengths of closest content items by subtype 1393. For example, profile element modesty 1002 does not correspond to any of the top strengths in the closest content items 1393. Profile element closeness 1022 has two corresponding content items that also have closeness as a strength. Similarly, profile element altruism 1036 has three corresponding content items that also have altruism as a strength. Likewise, profile element outgoing 1056 has three corresponding content items that also have outgoing as a strength while profile element cheerfulness 1012 does not correspond to any of the top strengths in the closest content items. As outlined above, some profile elements are deemed to be undesirable, including profile element "susceptible to stress" 1006. In this example, profile element "susceptible to stress" 1006 is not chosen as a profile element to be displayed. Of note is that the systems and methods of the invention perform the analysis and the steps of the algorithms for all profile elements, but do not display profile elements deemed to be undesirable. As a result, the profile elements selected for display on the radar graph include closeness 1322, altruism 1336, and outgoing 1356, which are also shown in the selected profile elements table of FIG. 12.

The invention also compares the top weaknesses of the brand with the top weaknesses of the closest content items (including by subtype). The profile elements found in both top weakness sets are selected for display for the radar graph. In the simplified example of FIG. 13B, profile elements curiosity 1046 and immoderation 1050 have corresponding profile elements in the top weaknesses of closest content items 1395. These profile elements are selected for display and are shown in FIG. 13B as profile elements immoderation 1350 and curiosity 1346, which are also added to the selected profile elements table in FIG. 12.

To continue the reduction of profile elements to be displayed on a radar graph to 12 profile elements in this example, the insight generation server 150 then examines and compares the Top 10 profile elements of the brand to the Top 10 profile elements of at least one of the nearest content items 1397 (that is, the closest three content items and the closest content items by subtype) and which are also part of the list of profile elements with shortest univariate distances. Some of the top 10 profile element could also be duplicated in the strengths list. When this happens, the next profile element in the list of profile elements is added to the top elements. The top profile elements that are common to both the brand and the content items are selected for display as well, and in the simplified example of FIG. 13C, these include sympathy 1377, practicality 1334, emotionality 1338, and orderliness 1392, which are also added to the selected profile elements table in FIG. 12.

The next reduction step in one example embodiment of the invention includes the insight generation server 150 examining and comparing the Bottom 10 profile elements of the brand to the bottom 10 profile elements of at least one of the nearest content items 1393 (including the closest content items by subtype) and which are also part of the list of profile elements with shortest univariate distances. Some of the bottom 10 profile element could also be duplicated in the weaknesses list. When this happens, the next profile element in the list of profile elements is added to the bottom elements. In the example of FIG. 13D, this includes excitement 1348, hedonism 1344, and self-expression 1342, which are also added to the selected profile elements table in FIG. 12. As was the case above, the invention does not select only the strongest profile elements of the brand for comparison. The invention examines the profile elements at both the top and bottom (strengths and weaknesses) of the brand that separate the brand from other brands. These are the profile elements that comprise the "personality" of the brand, for all its good points and all its "less-good" points, much as a person's personality includes their top profile elements and their bottom profile elements. These profile elements are selected for display on the radar graph.

In the event that there are still missing profile elements needed to complete the 12 radar graph profile elements, the insight generation server 150 selects those profile elements from those that remain with the shortest distance between the brand and the first closest content item and uses these profile elements to complete the 12 axes of the radar graph. With these profile elements, the 12 axes of the radar graph are identified and selected.

Figure 14:
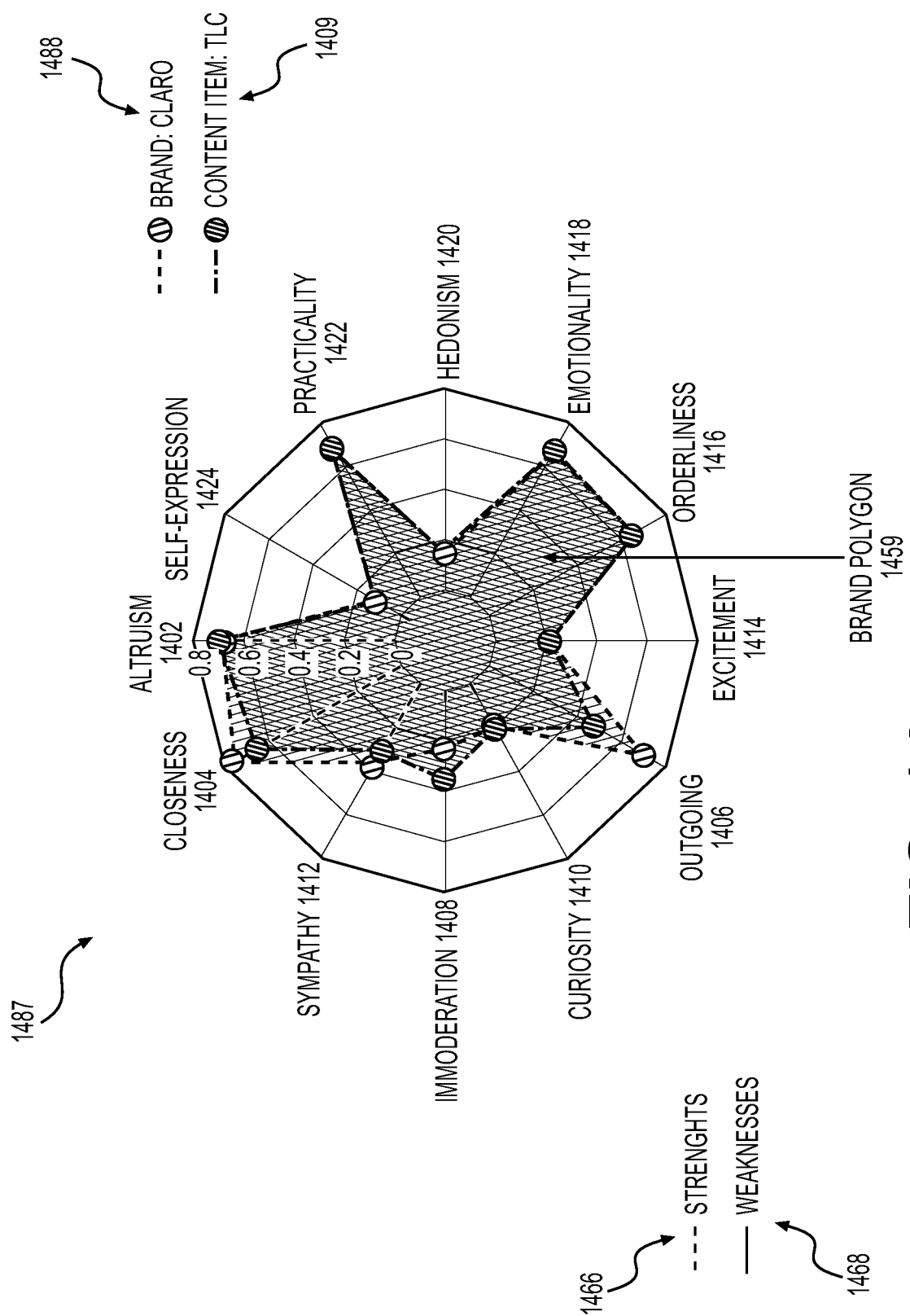
FIG. 14 shows an example displayed radar graph in accordance with the invention with 12 profile elements selected for the axes.

Once the profile elements have been selected, the insight generation server 150 generates radar graphs for the brand and content item. As shown in FIG. 14, the radar graph 1487 includes the 12 profile elements 1402, 1404, 1412, 1408, 1410, 1406, 1414, 1416, 1418, 1420, 1422, and 1424 as the axes of the radar graph 1487. The insight generation server 150 generates the brand polygon 1459 specifying the content item 1409 and superimposing red 1466 and yellow 1468 lines on the radar graph 1487 to represent the strengths and weaknesses, respectively, of the brand 1488 that appear on the radar graph 1487.

At this point, the invention has determined the radar graphs for the brand and the content item and maps the brand and content item profile elements as shown in FIG. 14. To map different audience profile elements, the systems and methods of the invention also analyze, convert, and reduce large audience databases into relevant profile element sets that are displayed as radar graphs with the brand and content item (as in FIG. 14). To map different audience profile elements, the systems and methods of the invention determine the Manhattan Distance for the different audiences based on the profile element sets used for the brand and content items. The systems can then rank the different audiences based on their respective Manhattan distance. The systems select, map, and display a radar graph for that particular audience. The systems of the invention can select those "closest" audiences with the shortest Manhattan distance or can select an audience with a greater Manhattan distance to glean additional insights into the brand and content. For example, the "closest" audiences may be those ripe to identify, purchase, and use the brand, while "farther" audiences can be identified and displayed as radar graphs to glean information regarding brand movement needed to have greater appeal to that audience. If a "farther" audience has a profile element to which an advertiser or brand manager would like their brand to appeal, they may "move" the brand toward that profile element on the radar graph.

The invention analyzes profile elements of audiences and incorporates the audience, content, and brand personalities to provide insights related to the different factors. The invention generates and displays radar graphs to provide intuitive visualizations of the relationships among the brand, content, and audience and to facilitate marketing, advertising, and branding actions.

Example Distance Algorithm 2

In another example embodiment of the invention, the insight generation server 150 creates the profile elements database 166 as outlined above with regard to example distance algorithm 1. The profile elements database is standardized and divided into three different databases (tables), as above and shown in FIG. 6. The insight generation server 150 indexes the database files and creates a search index from which the database files are read. The insight generation server 150 verifies that there are no duplicate files in the database(s) and the names and fields of the database files are standardized. The insight generation server 150 calculates multivariate Manhattan distances of each brand versus all the content items. The insight generation server 150 determines distances for all brands and their respective closest content items. The insight generation server 150 creates a fifty-plus dimension table and corresponding database files characterizing the distances.

In this example embodiment of the invention as well, the insight generation server 150 culls the number of profile elements for further consideration and display (visualization) based on the respective distances from each brand to each item of content. For each brand, 10 variables (profile elements) with the highest values and 10 variables (profile elements) with the lowest values are identified by the insight generation server 150 and saved as a table (file) and stored in profile elements database 166.

As was the case with the previous example distance algorithm, for each brand, those variables (profile elements) that are a strength of the brand with respect to other brands are sought, and the maximum strengths that are furthest (removed) from the bulk of the data are chosen using a percentile threshold (e.g., above the 80th percentile of the set of brands for that specific profile element). Similarly, for each brand, those variables (profile elements) that are a weakness of the brand with respect to other brands are sought and the 10 weaknesses that are furthest from the bulk of the data are chosen using a percentile threshold (e.g., below the 20th percentile of the set of brands for that specific profile element).

As above, the system determines a univariate distance (Manhattan) between each of the content items and each of the brands. That is, a univariate distance (Manhattan) is calculated profile element-by-profile element between brand and each content item.

Once the (Manhattan) distance is determined for each brand to each of the content items, the insight generation server 150 compiles the univariate distances and calculates and sorts the aggregate distances. In one example embodiment of the invention, the insight generation server 150 sorts the content items for each brand according to the distance from the brand to the content item, from shortest distance to farthest distance. The content items are ranked by shortest aggregate Manhattan distance to the brand and the 3 closest content items are identified.

The insight generation server 150 creates a fifty-plus dimension table and a corresponding database file characterizing the distances and stores the database files in the profile element database 166. That is, in the tables, all brands and their respective three closest content items are saved.

To further refine the profile elements, the insight generation server 150 compares the strengths and weaknesses of the brand to the strengths and weaknesses of the content items (e.g., 3 closest content items).

As above, in this example algorithm, the insight generation server 150 compares the strengths and weaknesses of the brand that are strengths and weaknesses of the 3 closest content items and selects those profile elements.

In this example algorithm, the insight generation server 150 then identifies the profile elements that are in the top 10 of the brands and are in the top 10 of the 3 closest content. The insight generation server 150 selects those profile elements that meet these criteria.

In this example algorithm, the insight generation server 150 then identifies the profile elements that are in the bottom 10 of the brand and are in the bottom 10 of the 3 closest content items. The insight generation server 150 selects those profile elements that meet these criteria.

In the event that there are fewer than 12 profile elements selected for the radar graph axes at this point, the insight generation server selects the profile elements from those that remain with the shortest distance between the brand and the first closest content item and uses these profile elements to complete the 12 axes of the radar graph. With these profile elements, the 12 axes of the radar graph are identified and selected.

Once the profile elements for each brand have been selected, the insight generation server 150 generates radar graphs for each brand and for each of the content items. As displayed with regard to the algorithm above, the radar graph includes the 12 profile elements as the axes of the radar graph. The insight generation server 150 generates the brand polygon specifying the content item and superimposing red and yellow lines on the radar graph to represent the strengths and weaknesses of the brand that appear on the radar graph.

As can be seen from the list of profile elements selected using this second example algorithm in accordance with the invention, the radar graph axes may be slightly different than the radar graph axes generated by the invention using algorithm 1 above.

Example Distance Algorithm 3

In another example embodiment of the invention, the insight generation server 150 creates the profile elements database 166 as outlined above with regard to the other example distance algorithms. The profile elements database is standardized and divided into three different databases (tables), as above and shown in FIG. 6. The insight generation server 150 indexes the database files and creates a search index from which the database files are read. The insight generation server 150 verifies that there are no duplicate files in the database(s) and the names and fields of the database files are standardized. The insight generation server 150 calculates multivariate Manhattan distances of each brand versus all the content items. The insight generation server 150 determines distances for all brands and their respective closest content items and groups each of the brands, content items, nearest channel, nearest social network, nearest genre, and nearest program, as outlined above.

The insight generation server 150 creates a fifty-plus dimension table and corresponding database files characterizing the distances.

In this example embodiment of the invention as well, the insight generation server 150 culls the number of profile elements for further consideration and display (visualization) based on the respective univariate distances from each brand to each item of content. For each brand, 10 variables (profile elements) with the highest percentile values and 10 variables (profile elements) with the lowest percentile values are identified by the insight generation server 150 and saved as a table (file) and stored in profile elements database 166.

As above, the system determines a univariate distance between each of the content items and each of the brands. That is, a univariate distance is calculated profile element-by-profile element between brand and content item.

In this example embodiment of the invention, after making these determinations and storing the distances (not shown separately) in the profile elements database 166, the insight generation server 150 selects the 12 profile elements with the shortest univariate distances for the brand. Accordingly, 12 profiles elements are obtained for each content item closest to the $i^{th}$ brand (from the distance calculations above) as was the case with the example algorithm above.

To further refine the profile elements, in this example algorithm, the insight generation server 150 identifies the profile elements that are in the top 10 of the brand and are in the top 10 of the 3 closest content items or 4 closest content items by subgenre and are also in the list of the 12 closest univariate distances for the brand. The insight generation server 150 selects those profile elements that meet all three of these criteria.

In this example algorithm, the insight generation server 150 then identifies the profile elements that are in the bottom 10 of the brand and are in the bottom 10 of the 3 closest content items or 4 closest content items by subgenre and are also in the list of the 12 closest univariate distances for the brand. The insight generation server 150 selects those profile elements that meet all three of these criteria.

In the event that there are fewer than 12 profile elements selected for the radar graph axes at this point, the insight generation server selects the profile elements from those that remain with the shortest distance between the brand and the first closest content item and uses these profile elements to complete the 12 axes of the radar graph. With these profile elements, the 12 axes of the radar graph are identified and selected.

Once the profile elements for each brand have been selected, the insight generation server 150 generates radar graphs for each brand and for each of the content items. As displayed with regard to the algorithms above, the radar graph includes the 12 profile elements as the axes of the radar graph. The insight generation server 150 generates the brand polygon specifying the content item and superimposing red and yellow lines on the radar graph to represent the strengths and weaknesses of the brand that appear on the radar graph.

As can be seen from the list of profile elements selected using this third example algorithm in accordance with the invention, the radar graph axes may be slightly different than the radar graph axes generated by the invention using the algorithms above.

Other central algorithms can also be used to reduce the volume and complexity of the brands, content items, audiences, and profile elements and to produce and display radar graphs that provide the desired advertising insights. The algorithms can be modified after comparing the relative success or failure of the produced radar graphs and the insights used in subsequent campaigns. Thresholds may be increased or decreased, numbers of profile elements selected during each of the steps of the algorithms can be changes, and different weights can be attributed to any of the interim results from the strengths-and-weaknesses comparisons, top-and-bottom comparisons, numbers of closest content items to select, and univariate distances. An example of an example embodiment of the invention based on algorithm 1 is shown below.

A user can run the analysis process using any one or more of the algorithms described above. Depending upon the maturity stage of the brand (e.g., where in the product life cycle the brand is), the different algorithms can provide and map different insights. In an introduction state of the brand, advertisers are trying to establish a market and grow sales of the brand to achieve as large a share of that market as possible. In a growth stage of the brand, sales are increasing. As the markets become saturated with fewer new customers, the brand reaches a maturity stage in the brand life cycle. The majority of consumers who are ever going to purchase the brand have already done so. The maturity stage can also be characterized by high levels of competition, and these factors combine to make it increasingly challenging for brand owners to maintain their market share. As a maturity stage continues, brand owners may start to see their profits decrease as profits will have to be shared among all competitors in the market. With sales likely to peak during the maturity stage, any brand owner that loses market share, and experiences a fall in sales, is likely to see a subsequent fall in profits. This decrease in profits can be compounded by falling prices that are often seen when the sheer number of competitors forces some of them to try attracting more customers by competing on price.

With the systems and methods of the invention, the system can run comparative analyses using more than one algorithm, or a user can select an algorithm for the systems to run. For example, in new markets or in the early stages of the brand life cycle, Algorithm 3 may be preferred because this it does not incorporate comparisons between brands (strengths and weakness) because there may be an insufficient number of brands in the market to provide reliable and actionable radar graph information. Likewise, when the market is more mature and/or more competing brands exist in a particular market, Algorithm 1 may be the most applicable algorithm because it incorporates brand comparisons to a much greater extent. In any case, one or more algorithms can be selected at any point in the brand lifecycle, and the results may be identified and catalogued to identify trends in the results.

Example Process

As further shown in the process flow diagrams and user interface screens of FIGS. 2A-5, a user logs in to the insight generation system 100 over communications network 199 using one of user computers 102, 104, 106. The insight generation server 150 generates and displays a user interface screen 200 on the user computer 102 (for example).

Brand Insight Analysis

Figure 2B:
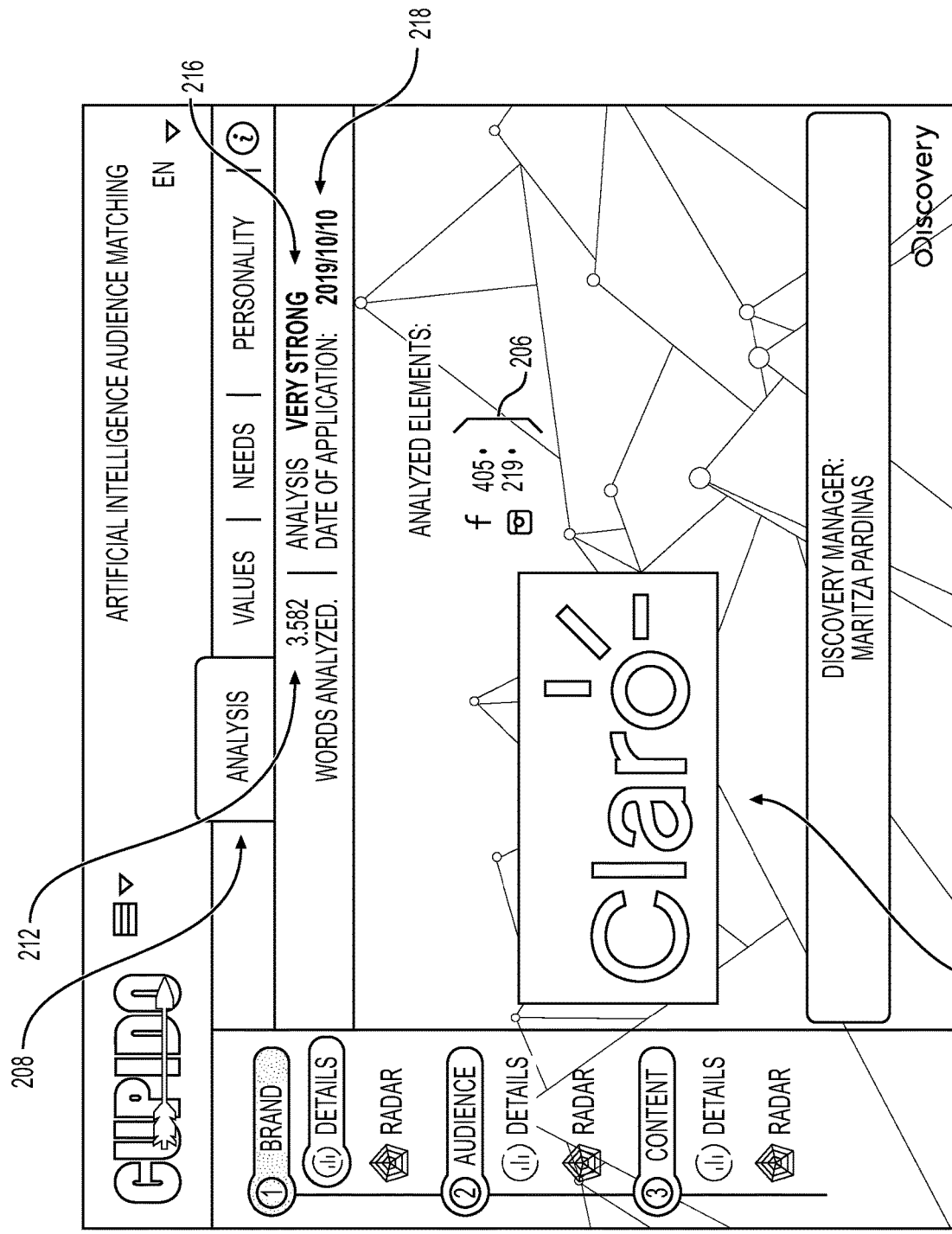

A user chooses a brand 204 to investigate to gain insights in an ad/sales context. After selecting a brand 204, the insight generation server 150 accesses the analyzed elements 206 of the brand as shown in FIG. 2B. The analyzed elements 206 include written and transcribed communications analyzed by cognitive computer server 140. Cognitive computer server 140 perceives and interprets characteristics of the brand communications. The analyzed elements 206 may include written advertising copy, transcripts of advertisements and marketing items, and other advertising campaign materials related to the brand that have been reduced to written form.

One consideration is the point in the timeline for which the brand is being analyzed. Advertising campaigns can change over time and can reflect different personalities, values, and needs of the brand (product). Selecting the brand over different periods of time and during different campaigns can provide additional insights into the brand as it evolves and changes. When looking back in time and evaluating past campaigns, the actual collaterals and other documents (e.g., outdoor advertisement text, radio script text, print documents, and other collaterals and documents) are available. When looking at current or planned campaigns, the brand owner may provide those materials, or materials can be created and used as analogous materials for future actual collaterals.

As further shown in FIG. 2B, once a user selects a brand 204, the insight generation server 150 accesses the outputs of the cognitive computer system (e.g., JSON files with profile elements of the brand) and calculates distances of the brand profile elements to represent their relative strength or weakness compared to an average set of brand profile elements. In one example embodiment of the invention, the output of the cognitive computer system includes a JSON file that includes the number of words that the cognitive computer system evaluated from the collaterals and other documents used as inputs. The JSON file can also include values for all the profile elements (traits, needs and values) and the significance of each profile element (significance=true or false). In other example embodiments of the invention, the output of the cognitive computer system can include other data structures and objects using a compatible data interchange format. The data structures can be human-readable or otherwise store and transmit data objects that can be accepted by the systems and methods of the invention as inputs to the brand/content/audience analysis.

The user interface returns an icon 214 of the brand and details of the brand analysis under a highlighted "analysis" tab 208. Details of the analysis are shown, including analyzed elements 206, number of words analyzed 212, date of the analysis 218, and a relative strength of the analysis 216.

Figure 2C:
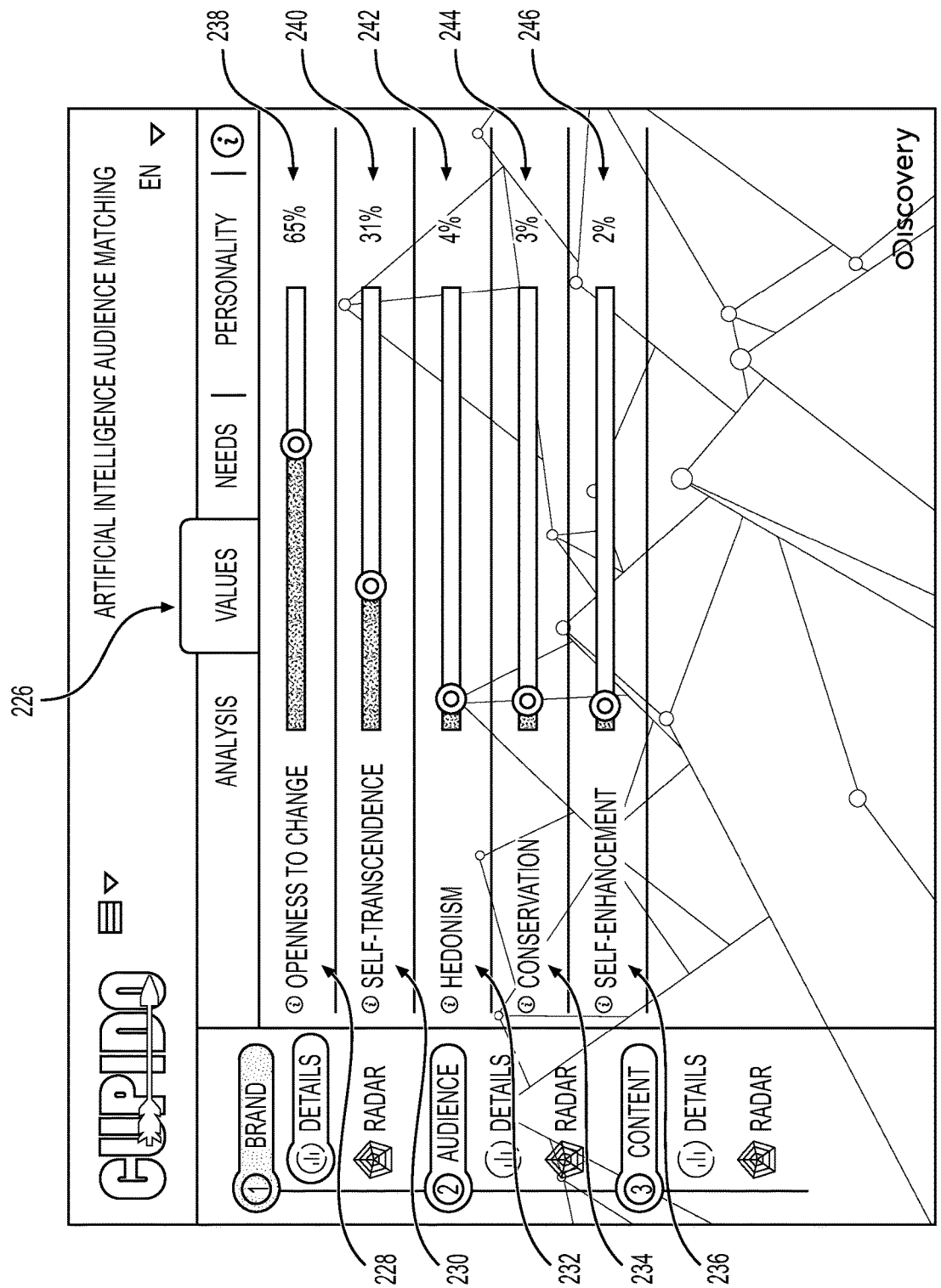

As shown in FIG. 2C, a user can dive deeper into the details of the analysis by selecting the values tab 226, which generates and displays line graphs showing five values, including openness to change 228, self-transcendence 30, hedonism 232, conservation 234, and self-enhancement 236. In addition to the five values 228, 230, 232, 234, 236, a percentile score for each value is shown. For example, percentile score 238 is 65%, indicating that for the value of openness to change 228, the selected brand 204 scored better than 65% of the brands. Similarly, the selected brand 204 had a percentile score 240 of 31% for the self-transcendence value 230, a percentile score 242 of 4% for the hedonism value 232, a percentile score 244 of 3% for the conservation value 234, and a percentile score 246 of 2% for the self-enhancement value 236. The five values can be ordered from highest to lowest as shown in FIG. 2C or can be ordered based upon other criteria.

Figure 2D:
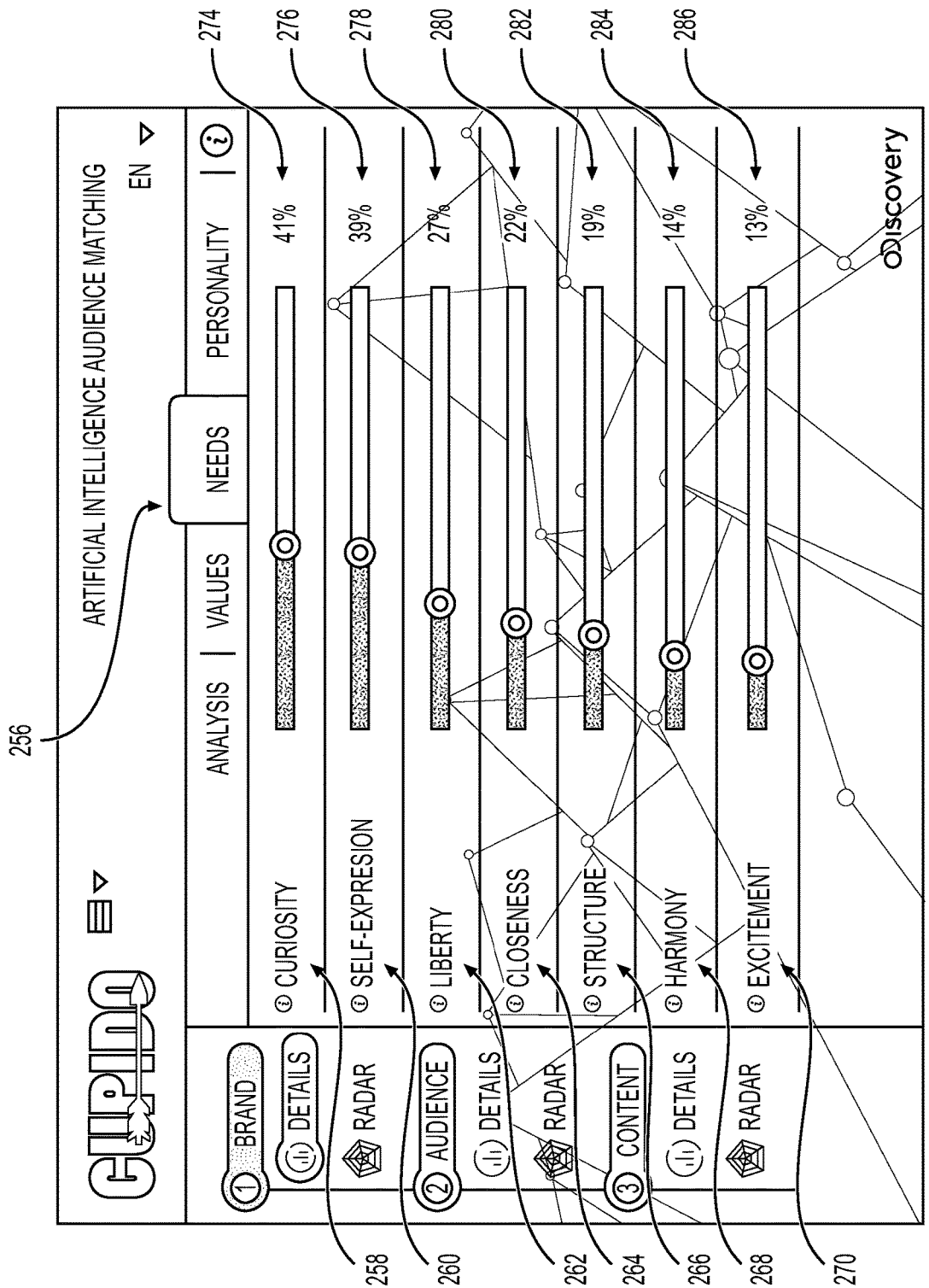

Similarly, as shown in FIG. 2D, a user can examine methodically and in detail the constitution of the analysis by selecting the needs tab 256, which generates and displays line graphs showing 12 needs, including curiosity 258, self-expression 260, liberty 262, closeness 264, structure 266, harmony 268, excitement 270, as well as practicality, stability, ideal, challenge, and love, which the user can scroll the displayed page down to see. In addition to the seven needs 258, 260, 262, 264, 266, 268, 270, a percentile score for each need is shown. For example, percentile score 274 is 41%, indicating that for the need of curiosity 258, the selected brand 204 scored better than 41% of the brands. Similarly, the selected brand 204 had a percentile score 276 of 39% for the self-expression need 260, a percentile score 278 of 27% for the liberty need 262, a percentile score 280 of 22% for the closeness need 264, a percentile score 282 of 19% for the structure need 266, a percentile score 284 of 14% for the harmony need 268, and a percentile score 286 of 13% for the excitement need 270. The seven needs can be ordered from highest to lowest as shown in FIG. 2D or can be ordered based upon other criteria.

Figure 2E:
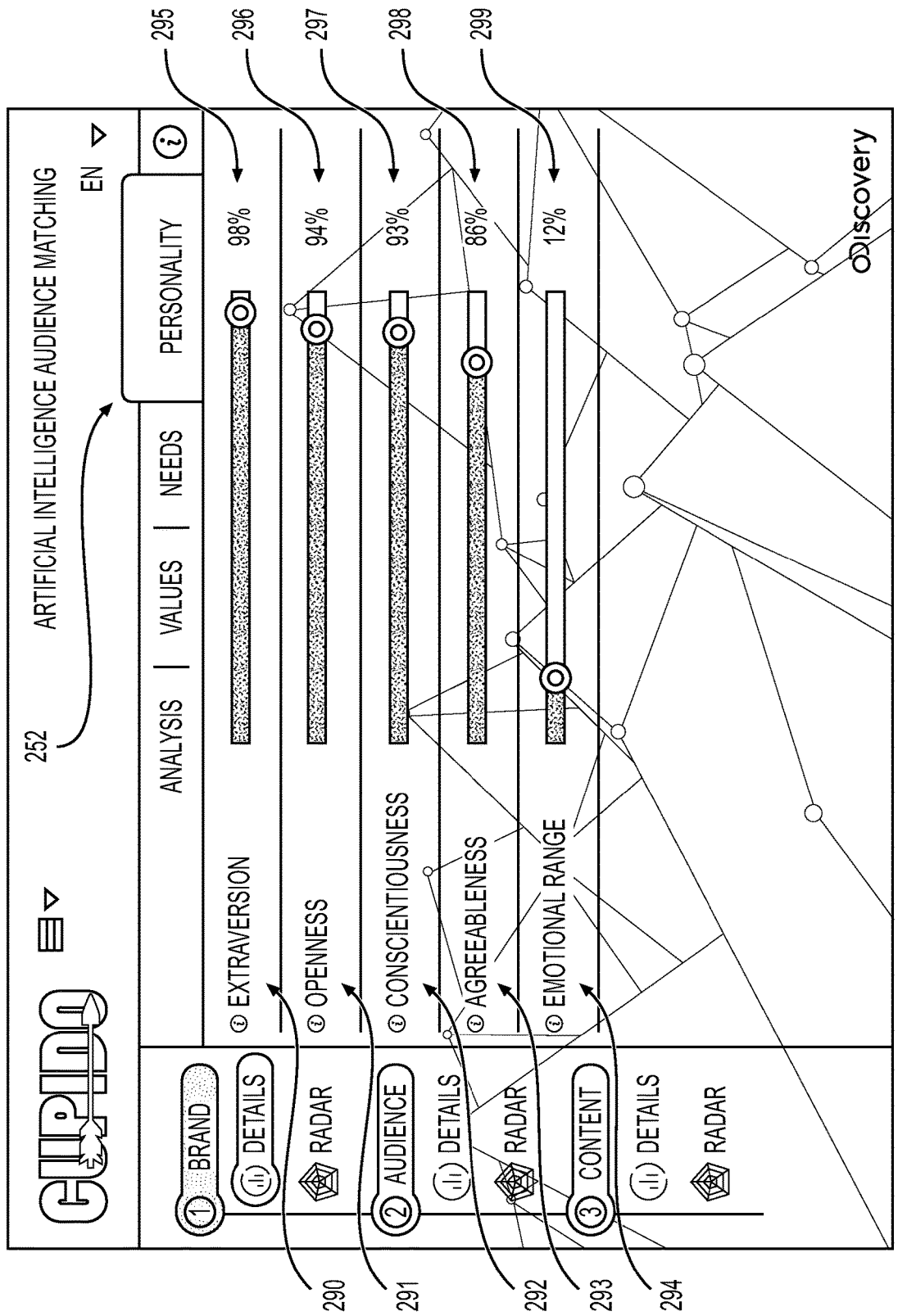

Further, the user can view the details of the analysis by selecting the personality tab 252 as shown in FIG. 2E, which brings up line graphs showing the five personality traits, including extraversion 290, openness 291, conscientiousness 292, agreeableness 293, and emotional range 294. AS with each of the values and needs tabs, in addition to the five personality traits 290, 291, 292, 293, 294, a percentile score for each personality trait is shown showing the percentage in which the brand falls. For example, percentile score 295 is 98%, indicating that for the personality trait of extraversion 290, the selected brand 204 scored better than 98% of the brands. Similarly, the selected brand 204 had a percentile score 296 of 94% for the openness personality trait 291, a percentile score 297 of 93% for the conscientiousness personality trait 292, a percentile score 298 of 86% for the agreeableness personality trait 293, and a percentile score 299 of 12% for the emotional range personality trait 294. The five personality traits can be ordered from highest to lowest as shown in FIG. 2E or can be ordered based upon other criteria.

Figure 2F:
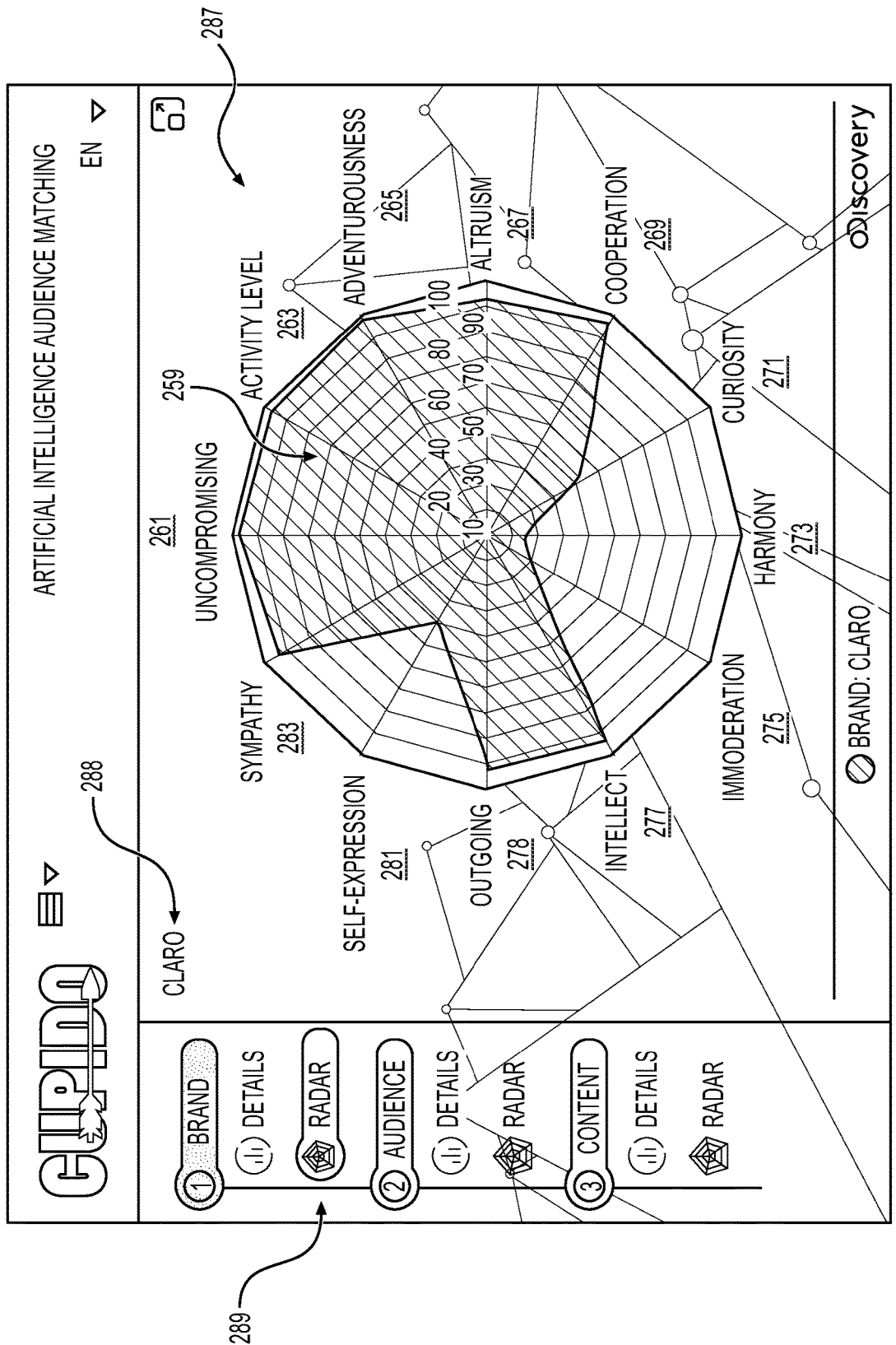

When the brand analysis is complete, the user can select the radar button 289 under the brand tab as shown in FIG. 2F. In one example embodiment of the invention, the insight generation server 150 processes the values, needs, and personality traits for the brand 288 using one or more of the algorithms above to identify the profile elements to evaluate further. In other example embodiments of the invention, other distance measuring algorithms can be used. Based on the algorithm(s), the insight generation server 150 selects profile elements 283, 281, 279, 277, 275, 273, 271, 269, 267, 265, 263, and 261 to graph. The insight generation server 150 generates radar graph 287 of the brand to visualize the multivariate brand data as a polygon 259.

Figure 3A:
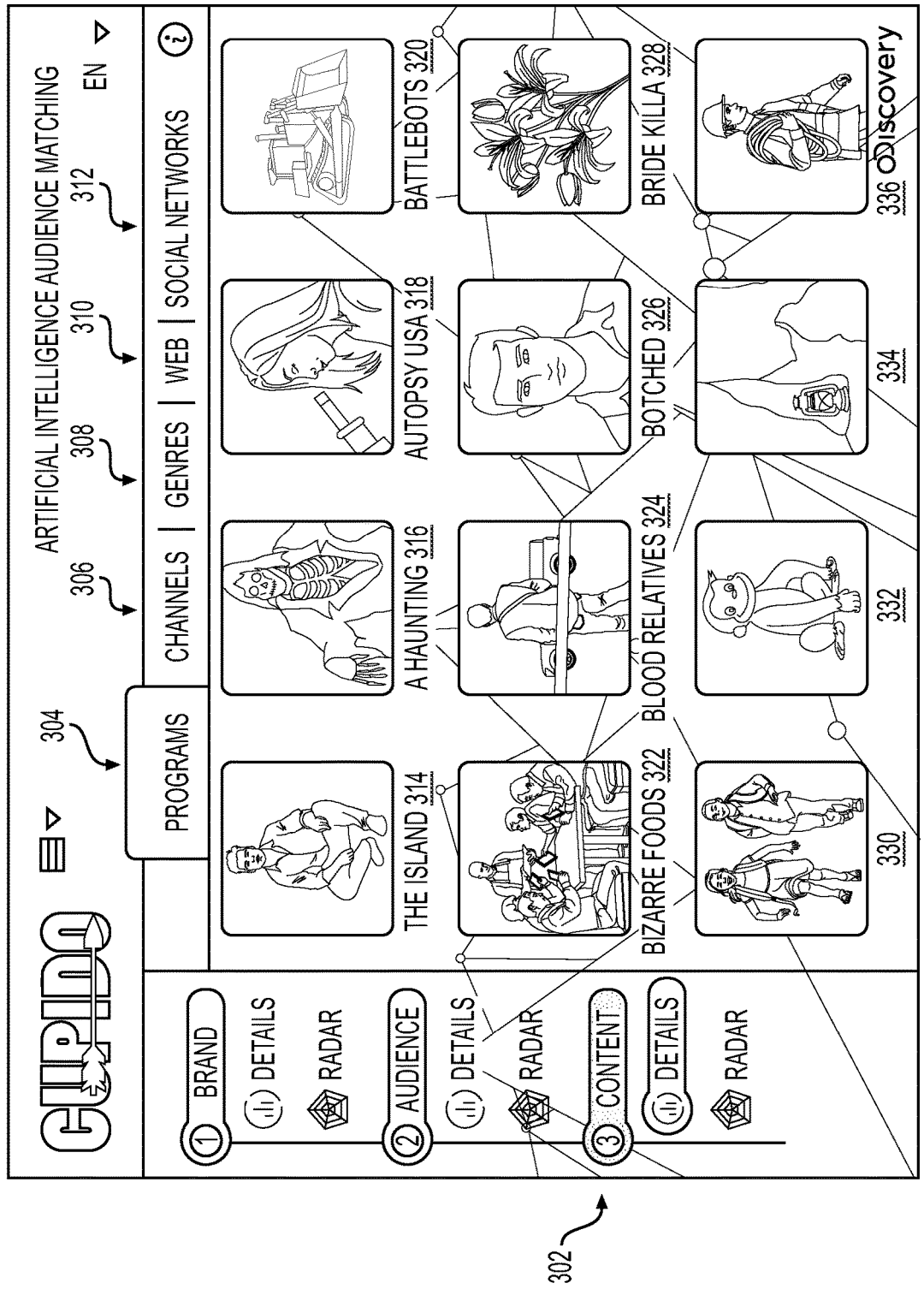
FIGS. 3A-3E show user interface screens illustrating a method of generating additional content insights for programs, channels, genres, web, and social networks using an insight generation system in accordance with the invention.

When the brand visualization is displayed, the user can then evaluate content to gain insights into those content items with personalities that may be best suited for the brand. For example, in FIG. 3A, a user selects the content button 302, and the insight generation server 150 provides the user interface screen in FIG. 3A. FIG. 3A shows a programs tab 304, a channels tab 306, a genres tab 308, a web tab 310, and a social networks tab 312. The user can select any of the tabs 304, 306, 308, 310, 312 to review content at a more granular level. For example, in FIG. 3A, the selected programs tab 304 is shown in a different color than the unselected tabs. FIG. 3A shows an example user interface screen showing example programs 314, 316, 318, 320, 322, 324, 326,328, 330, 332, 334, and 336 that are available to evaluate in concert with the brand.

Content Insight Analysis

Figure 3B:
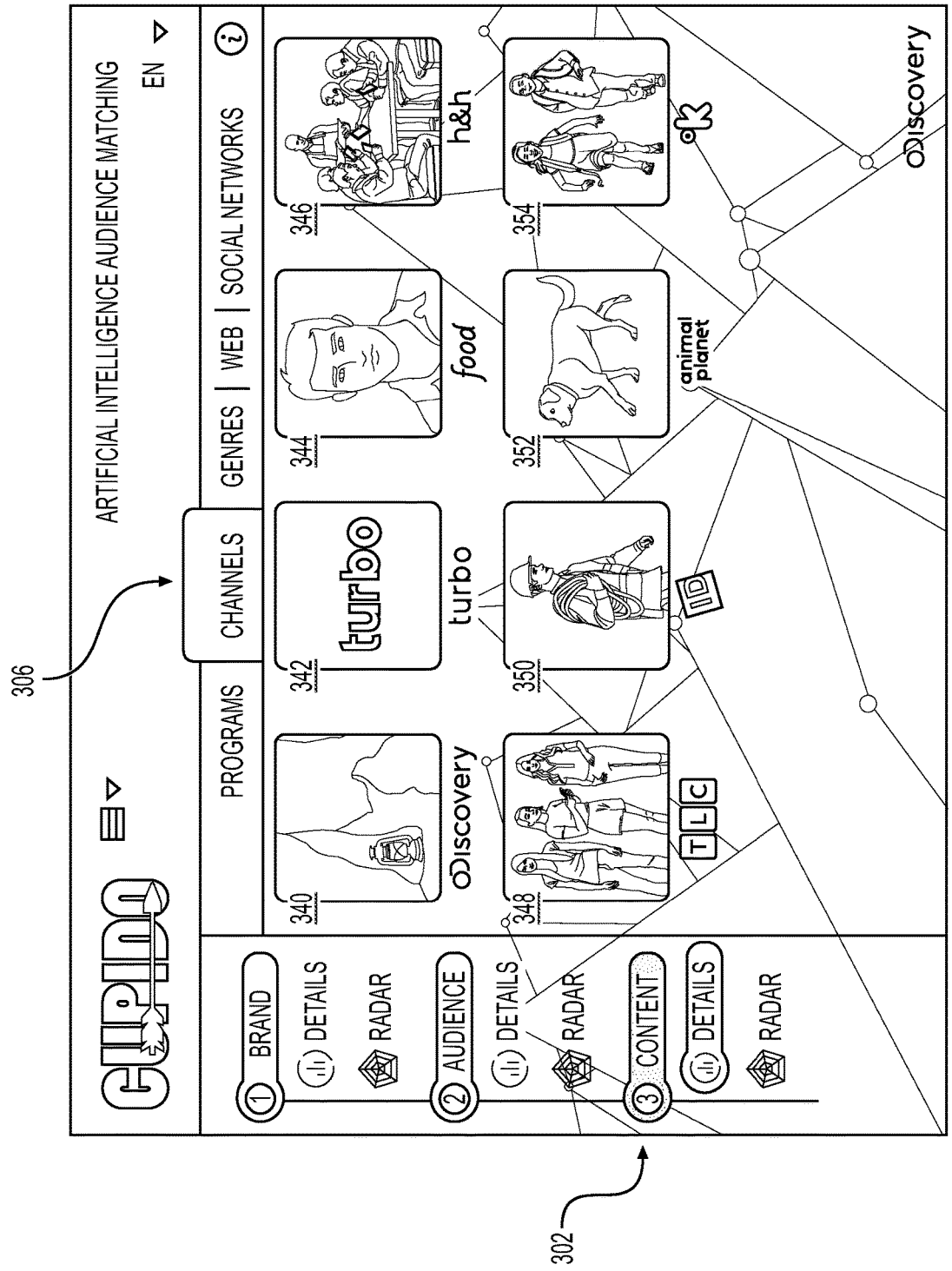

Similarly, as shown in FIG. 3B, when a user selects the content tab 302, that user can then select a channels tab 306 rather than the programs tab 304 shown in FIG. 3A. Selecting the channels tab 306 has the insight generation server 150 access and display channels 340, 342, 344, 346, 348, 350, 352, 354. As shown in FIG. 3B, the selected channels tab 306 is shown in a different color than the unselected tabs. FIG. 3B shows an example user interface screen showing example channels 340, 342, 344, 346, 348, 350, 352, and 354 that are available to evaluate in concert with the brand.

Figure 3C:
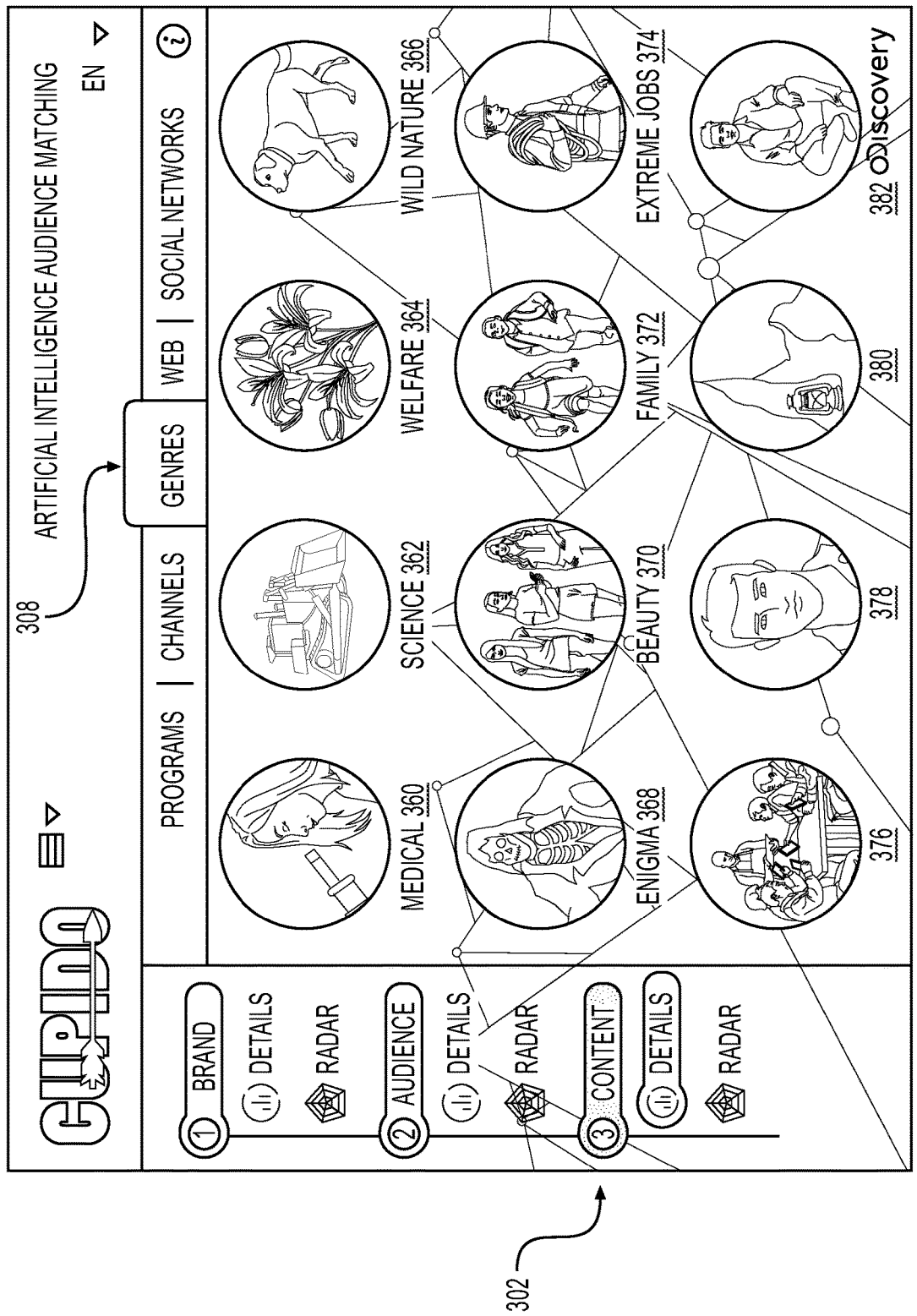

Likewise, as shown in FIG. 3C, when a user selects the content tab 302, that user can then select a genre tab 308 rather than the programs tab 304 shown in FIG. 3A. Selecting the genres tab 308 has the insight generation server 150 access and display genres 360, 362, 364, 366, 368, 370, 372, 374, 376, 378, 380, and 382. The user can select any of the genres 360, 362, 364, 366, 368, 370, 372, 374, 376, 378, 380, and 382 to review genre content at a more granular level. As shown in FIG. 3C, the selected genres tab 308 is shown in a different color than the unselected tabs. FIG. 3C shows an example user interface screen showing example genres 360, 362, 364, 366, 368, 370, 372, 374, 376, 378, 380, and 382 that are available to evaluate in concert with the brand.

Figure 3D:
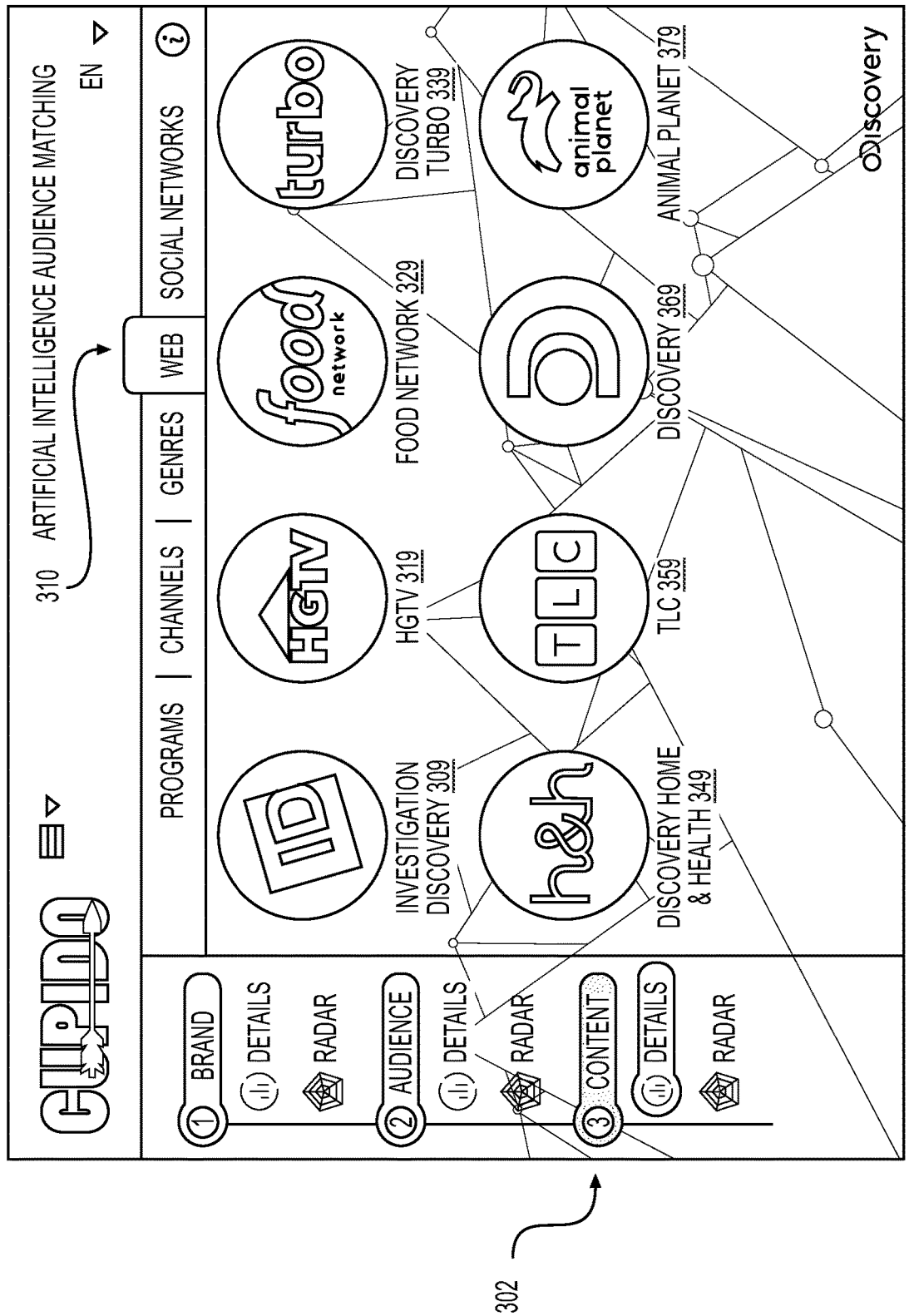

Another manner in which a user can review content at a more specific level is shown in FIG. 3D when a user selects the content tab 302 and then selects a web tab 310 rather than the programs tab 304 shown in FIG. 3A. Selecting the web tab 310 has the insight generation server 150 access and display content by web pages. The user can select any of the web tab pages Investigation Discovery 309, HGTV 319, Food Network 329, Discovery Turbo 339, Discovery Home and Health 349, TLC 359, Discovery 369, and Animal Planet 379 to review web page content at a more granular level. As shown in FIG. 3D, the selected web tab 310 is shown in a different color than the unselected tabs. FIG. 3D shows an example user interface screen showing example web tab pages Investigation Discovery 309, HGTV 319, Food Network 329, Discovery Turbo 339, Discovery Home and Health 349, TLC 359, Discovery 369, and Animal Planet 379 that are available to evaluate in concert with the brand.

Figure 3E:
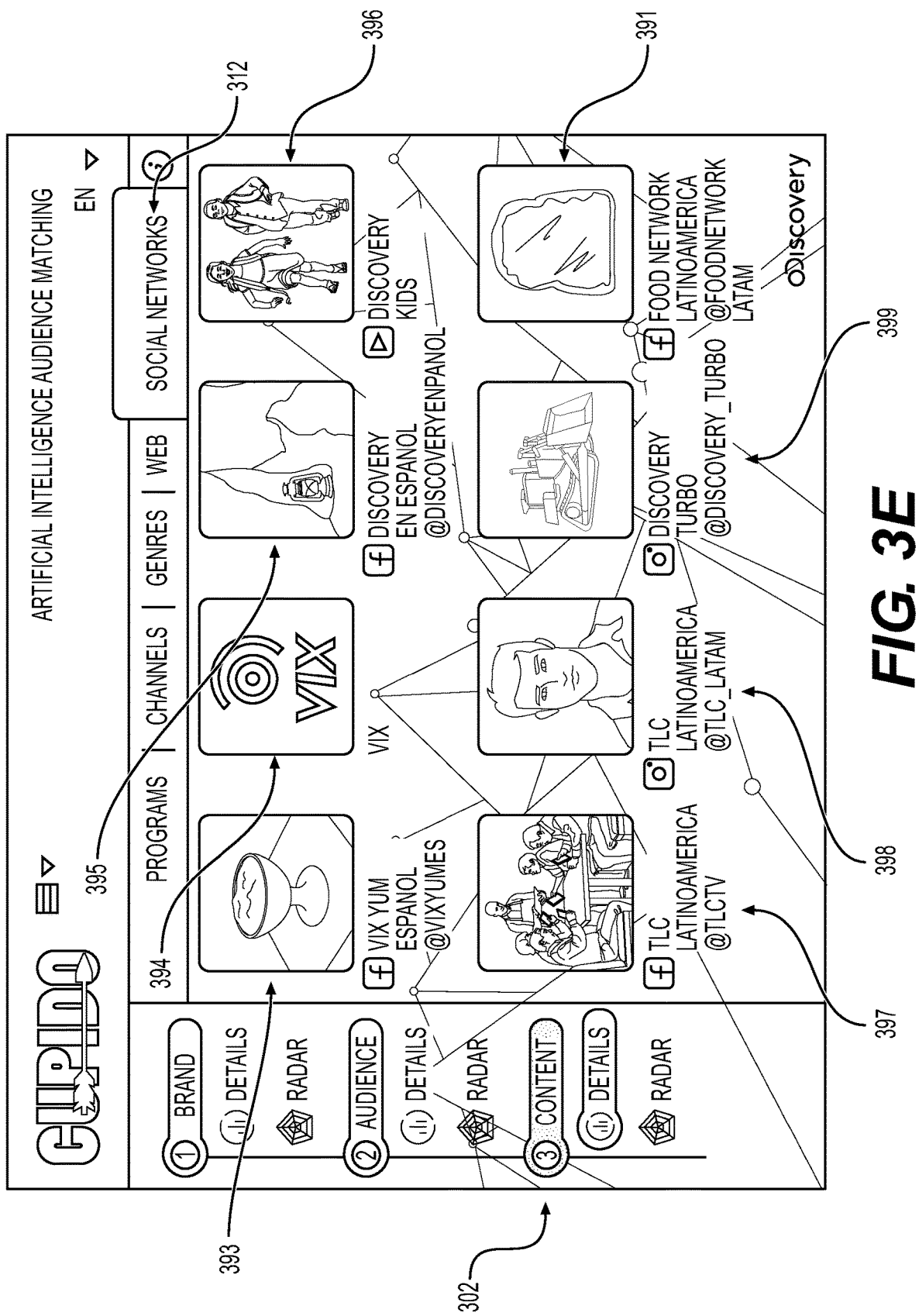

Further, as shown in FIG. 3E, when a user selects the content tab 302, that user can then select a social networks tab 312 rather than the programs tab 304 shown in FIG. 3A. Selecting the social networks tab 312 has the insight generation server 150 access and display social media feeds 393, 394, 395, 396, 397, 398, 399, and 391. Additional social networks can be accessed by scrolling down the displayed page. The user can select any of the social network feeds, including Vix Yum Facebook feed 393, Vix Yum home page feed 394, Discovery Facebook feed 395, Discovery Kids YouTube channel 396, TLC Facebook feed 397, TLC Instagram feed 398, Discovery Turbo Instagram feed 399, and FoodNetwork Facebook feed 391 to review social network content at a finer level. As shown in FIG. 3E, the selected social networks tab 312 is shown in a different color than the unselected tabs. FIG. 3E shows an example user interface screen showing example social network feeds 393, 394, 395, 396, 397, 398, and 399 that are available to evaluate in concert with the brand.

Figure 4A:
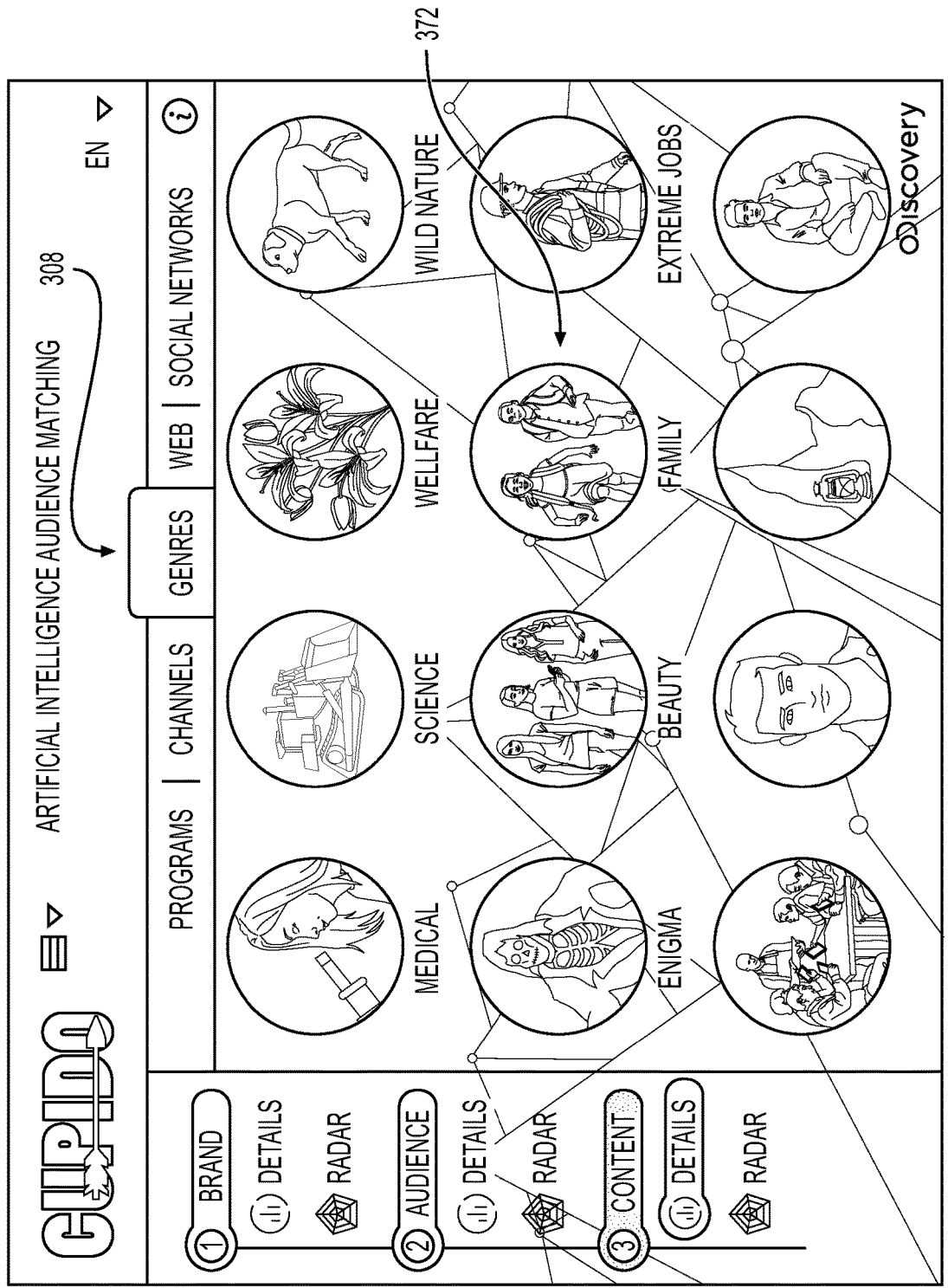
FIG. 4A shows a user interface screen illustrating a method of generating additional insights for a content genre in accordance with the invention.
Figure 4B:
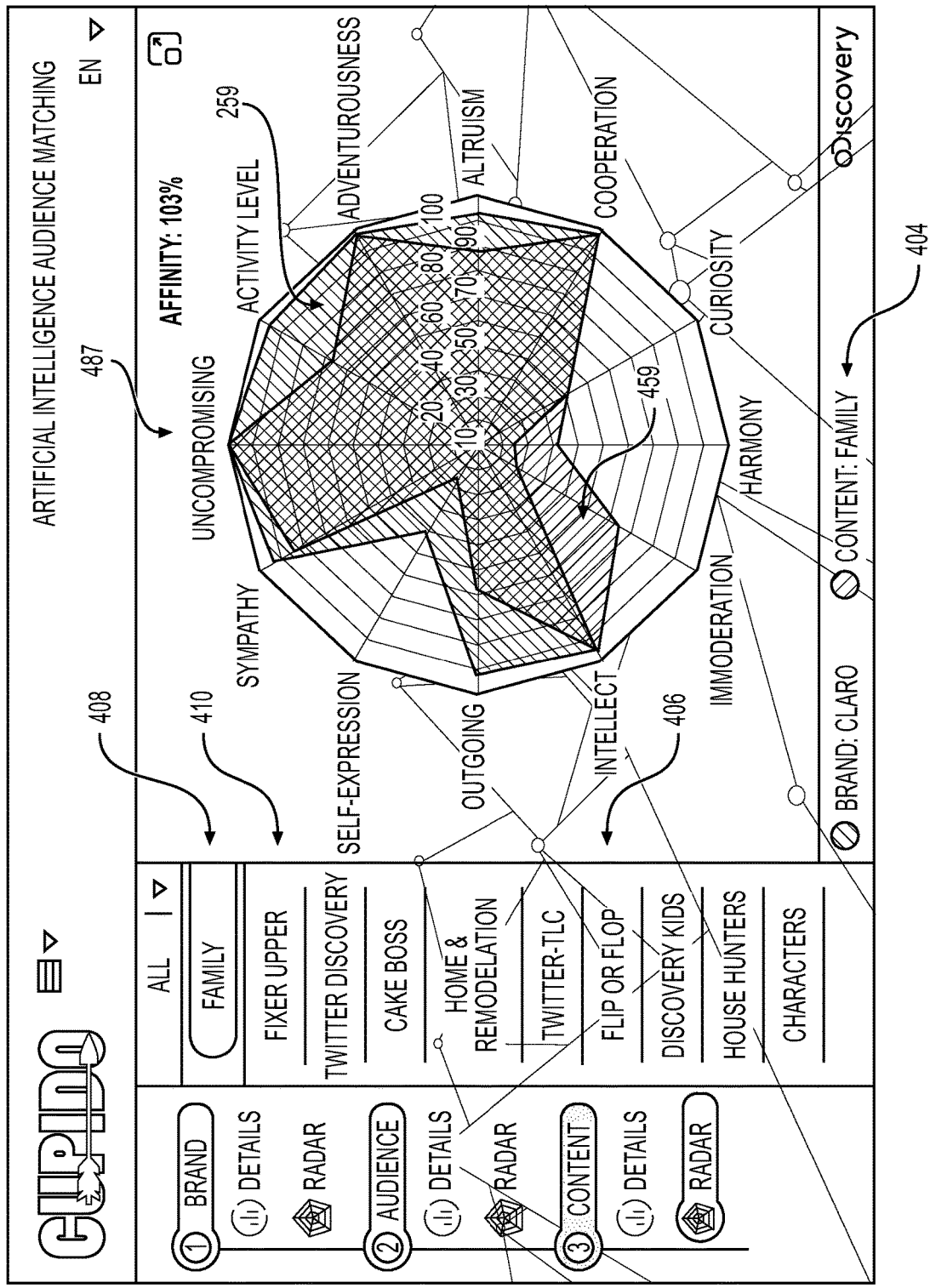
FIG. 4B shows a user interface screen illustrating a radar graph of a brand and example content genre in accordance with the invention.
Figure 4C:
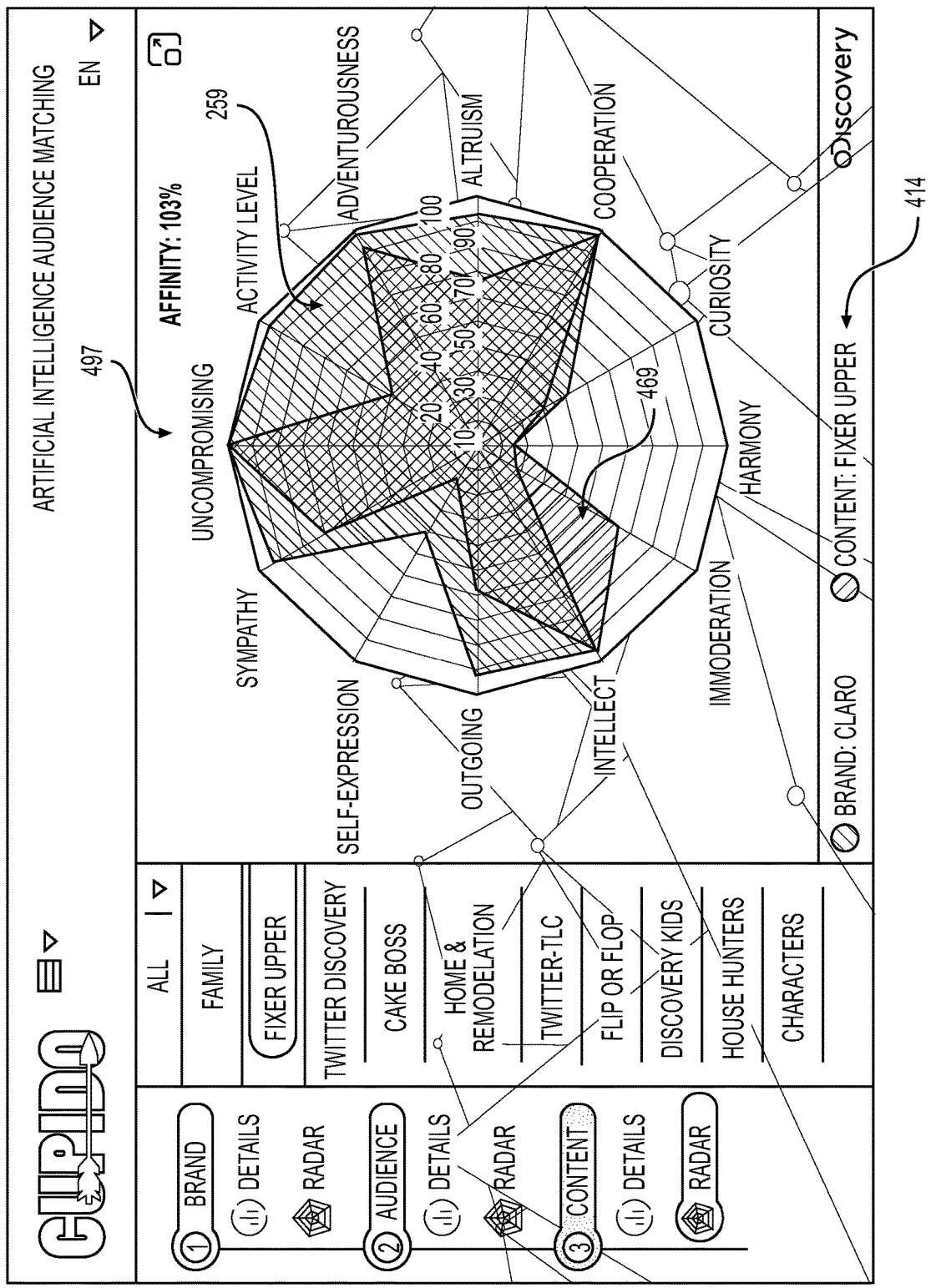
FIG. 4C shows a user interface screen illustrating a radar graph of a brand and another example content genre in accordance with the invention.

In one example embodiment of the invention, a user selects the genres tab 308 as shown in FIG. 4A, which displays content genres available for further analysis. A user selects the "Family" content genre icon 372 to be analyzed, graphed, and evaluated in concert with the brand examined in FIG. 2F. Upon selecting the family content genre icon 372, the insight generation server 150 accesses values, needs, and profile elements of the content genre "family" and creates the (pink) family content genre polygon 459 on the radar graph 487 shown in FIG. 4B. The family content genre polygon 459 is overlaid on the brand polygon 259 as shown in the radar graph 487. The brand polygon 259 and the family content genre polygon 459 are noted in legend 404. As shown in FIG. 4B, the selected profile elements used to create the brand radar graph 287 (in FIG. 2F) are also used when creating and displaying a content radar graph 487.

Further insight analysis can be performed by selecting a different content genre from the list 406. For example, by switching from the family content genre selection 408 to the "fixer upper" content program 410, the insight generation server 150 accesses values, needs, and profile elements of the content program "fixer upper" and creates a (pink) fixer upper content program polygon 469 on the radar graph 497 shown in FIG. 4C. The fixer upper content program polygon 469 is overlaid on the brand polygon 259 as shown in the radar graph 497. The brand polygon 259 and the fixer upper content program polygon 469 are noted in legend 414.

Audience Insight Analysis

Figure 5A:
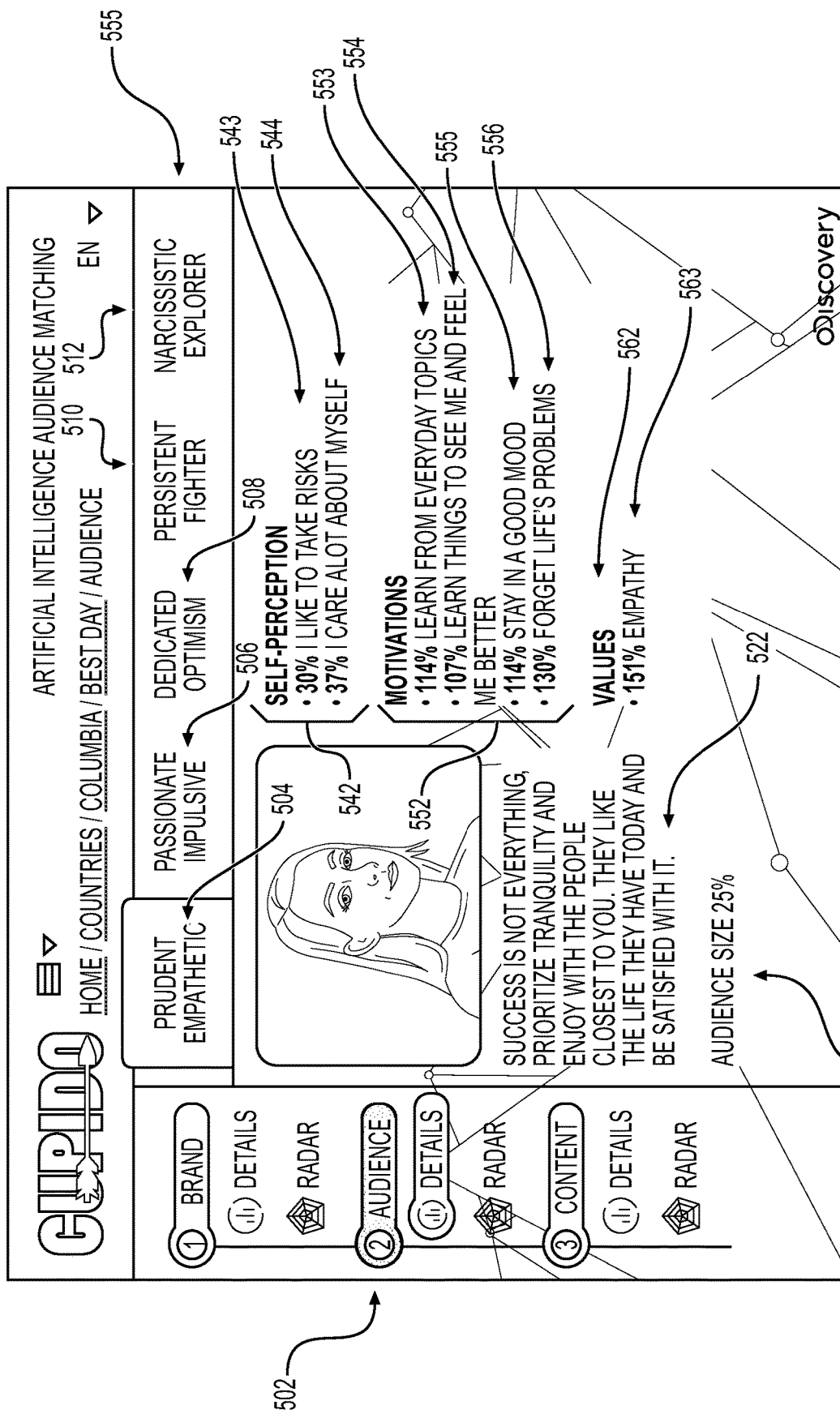
FIGS. 5A-5G show user interface screens illustrating a method of generating audience insights for audience personalities using an insight generation system in accordance with the invention.

When the content analysis is complete and the invention produces a brand and content visualization, the user can then evaluate the audience to gain insights into the types of audiences for which those brands and content items with their respective personalities may be best suited. For example, in FIG. 5A, a user selects the audience button 502, and the insight generation server 150 provides the user interface screen in FIG. 5A. FIG. 5A shows a personality trait bar 555 that includes the five personality traits, including prudent empathetic (tab) 504, passionate impulsive (tab) 506, dedicated optimism (tab) 508, persistent fighter (tab) 510, and narcissistic explorer (tab) 512. The user can select any of the tabs 504, 506, 508, 510, 512 to review the audience at a more granular level. For example, in FIG. 5A, the user selected prudent empathetic tab 504, which is shown in a different color than the unselected tabs 506, 508, 510, 512. FIG. 5A shows an example user interface screen showing example personality traits for evaluation in concert with the brand and content.

In addition to the five personality traits (tabs 504, 506, 508, 510, 512), a description of an audience or a representative member of the audience is shown as reference numeral 522. An audience size measure 532 is shown as well. In addition, a self-perception listing 542 is shown, along with motivations 552 and values 562. Self-perception 542 is an audience's account of itself and its enduring dispositions that cause characteristic patterns of interaction with its environment. The most prevalent descriptors 543, 544 of the audience's self-perception are displayed as well.

The percentages shown next to the self-perception descriptors 543, 544, the motivations descriptors 553, 554, 555, 556, and the values descriptor 563 provide an index (e.g., base 100%) as they reflect a comparison between the percentage of people in that profile element cluster (in FIG. 5A, the prudent empathetic cluster) who agreed with the self-perception sentence (or motivation or value) versus the percentage of all respondents in the study who agreed with the self-perception sentence (or motivation or value). The percentages shown are related to "affinity" or a similarity of characteristics suggesting a relationship. For example, an index percentage above 100% implies a determined cluster has an affinity with that sentence (or motivation or value). Likewise, an index below 100% implies that the profile element cluster of respondents does not feel an affinity with the sentence (or motivation or value). For example, in FIG. 5A, the profile element cluster of respondents does not feel an affinity with the sentence "I like to take risks" as only 30% of respondents agreed with that self-perception.

As noted above, a motivation listing 552 is displayed as well as the prevalent descriptors 553, 554, 555, 556 of the motivations. Motivations are the willingness of an audience to expend a certain amount of effort to achieve a particular goal under a particular set of circumstances. Motivations can be intrinsic, in which an audience (or representative member of an audience) is motivated by internal desires that are fulfilling, interesting, and enjoyable, without an expectation of a reward or recognition from others. Similarly, motivations can be extrinsic, in which externalities (e.g., promise of a material advantage) outside the person provide the reasons for acting or behaving in the particular way. Motivations can be thought of as the fuels that power actions. The descriptors 553, 554, 555, 556 help to break down and characterize the audience.

Similarly, a listing of the values of the audience are shown as reference numeral 562, with a prevalent descriptor 563. Values are conceptions of the desirable, that is, the fundamental beliefs of the audience. Values are thought to determine priorities and are a measure of the regard ascribed to a particular trait or item.

In addition to the personality traits, self-perception, motivations, and values, a description 522 of a representative audience member is displayed along with the audience size 532. Audience size 532 is the number of individuals in the audience that match the criteria set for that audience. It roughly represents the potential number (percentage) of people the ad might reach if the user targets that audience personality type.

Figure 5B:
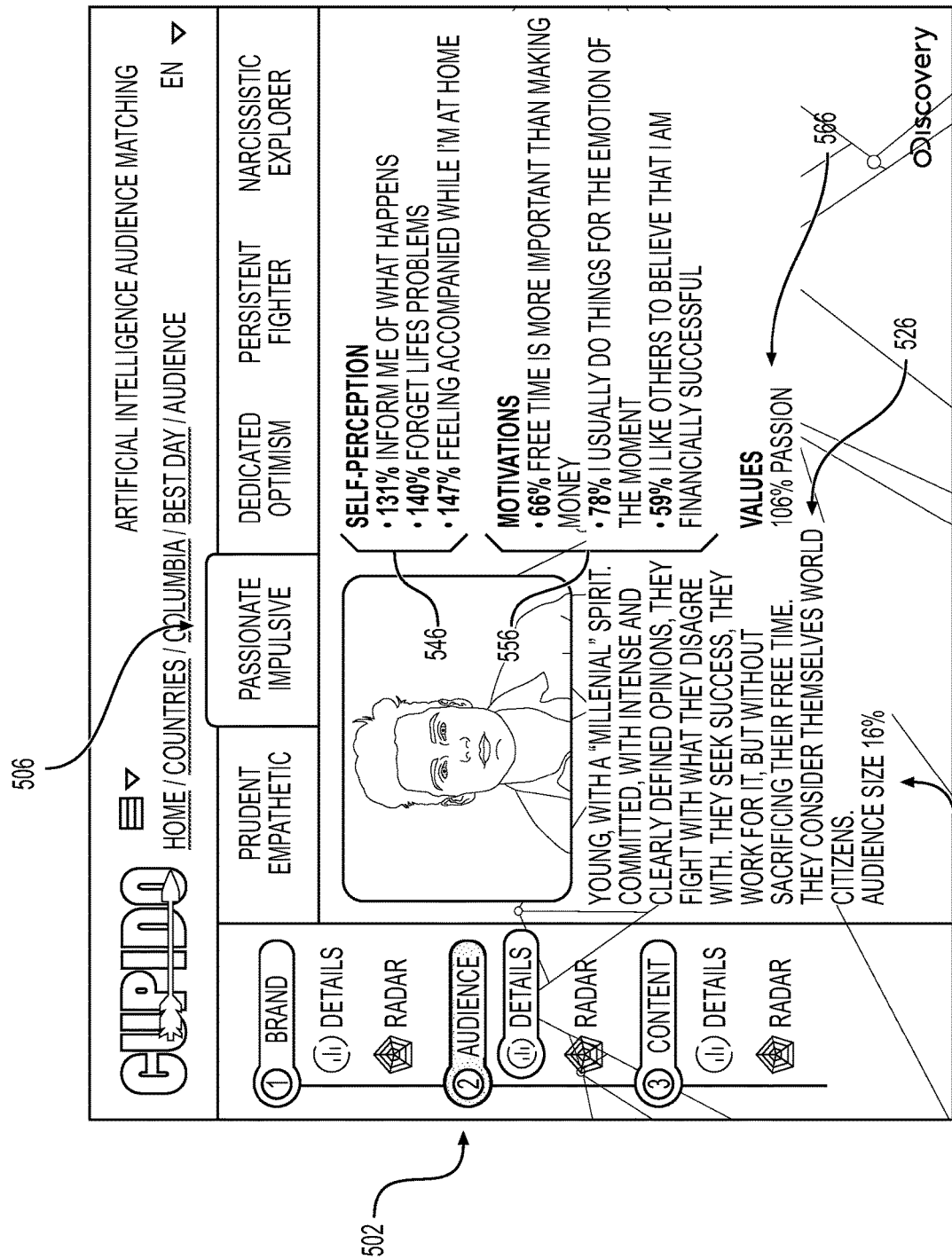

Similarly, as shown in FIG. 5B, when a user selects the audience tab 502 to perform analysis, that user can select passionate impulsive tab 506 rather than the prudent empathetic tab 504 shown in FIG. 5A. Selecting the passionate impulsive tab 506 has the insight generation server 150 access and display a user interface screen providing information regarding the portion of the audience with the passionate impulsive 506 personality trait. As was the case with regard to the prudent empathetic tab 504 above, when the user selects the passionate impulsive tab 506, a description 526 is shown as well as an audience size measure 536. In addition, a self-perception listing is shown, along with motivations and values as well as descriptors of each are displayed as well. The systems and methods of the invention help characterize the audience with the personality trait descriptions 522, 526, the audience size measures 532, 536, and the self-perceptions 542, 546, motivations 552, 556, and values 562, 566. Using these characterizations, users capitalize on visualization techniques to make insights into the audience, and their relationship to the brand and content.

Figure 5C:
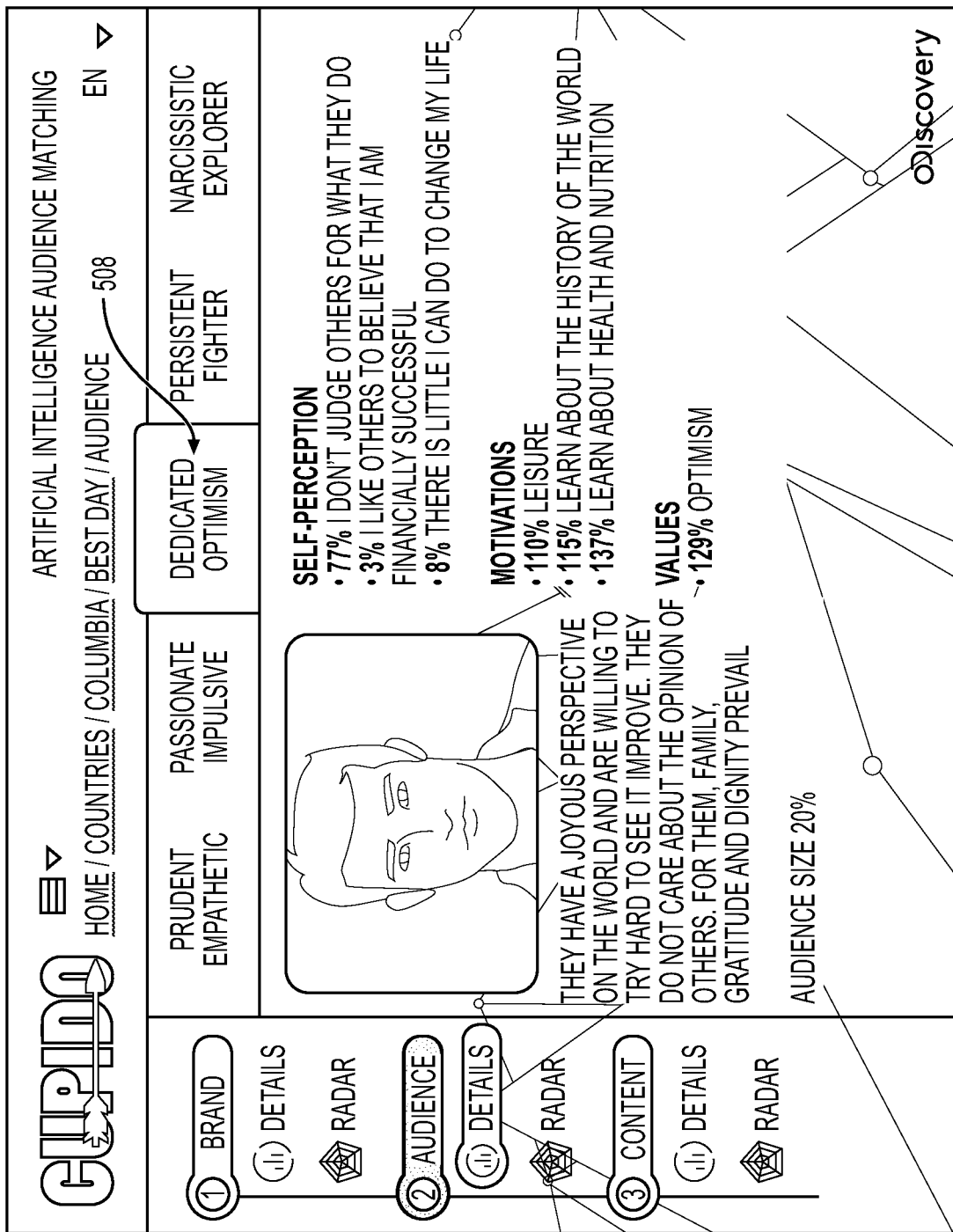
Figure 5D:
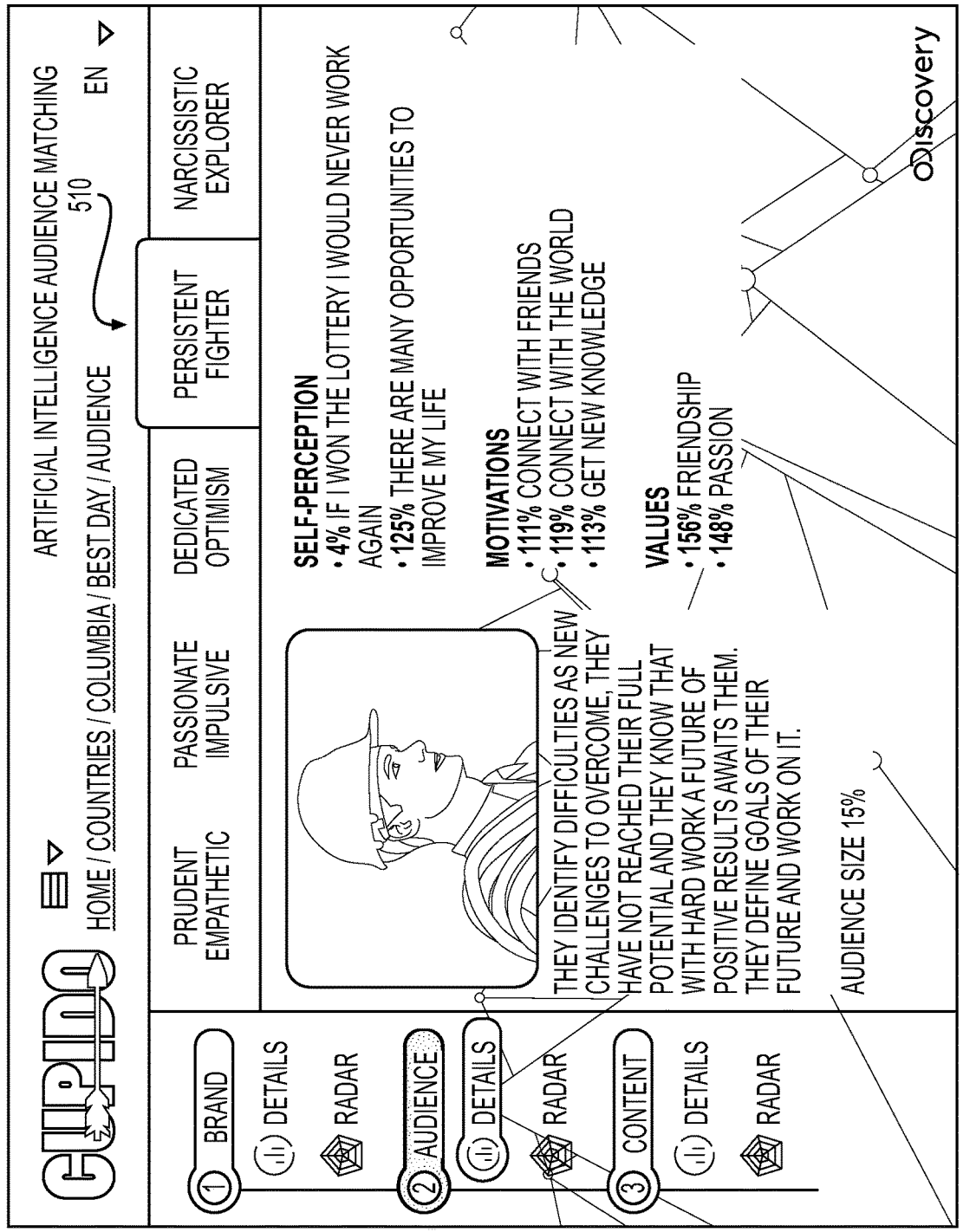
Figure 5E:
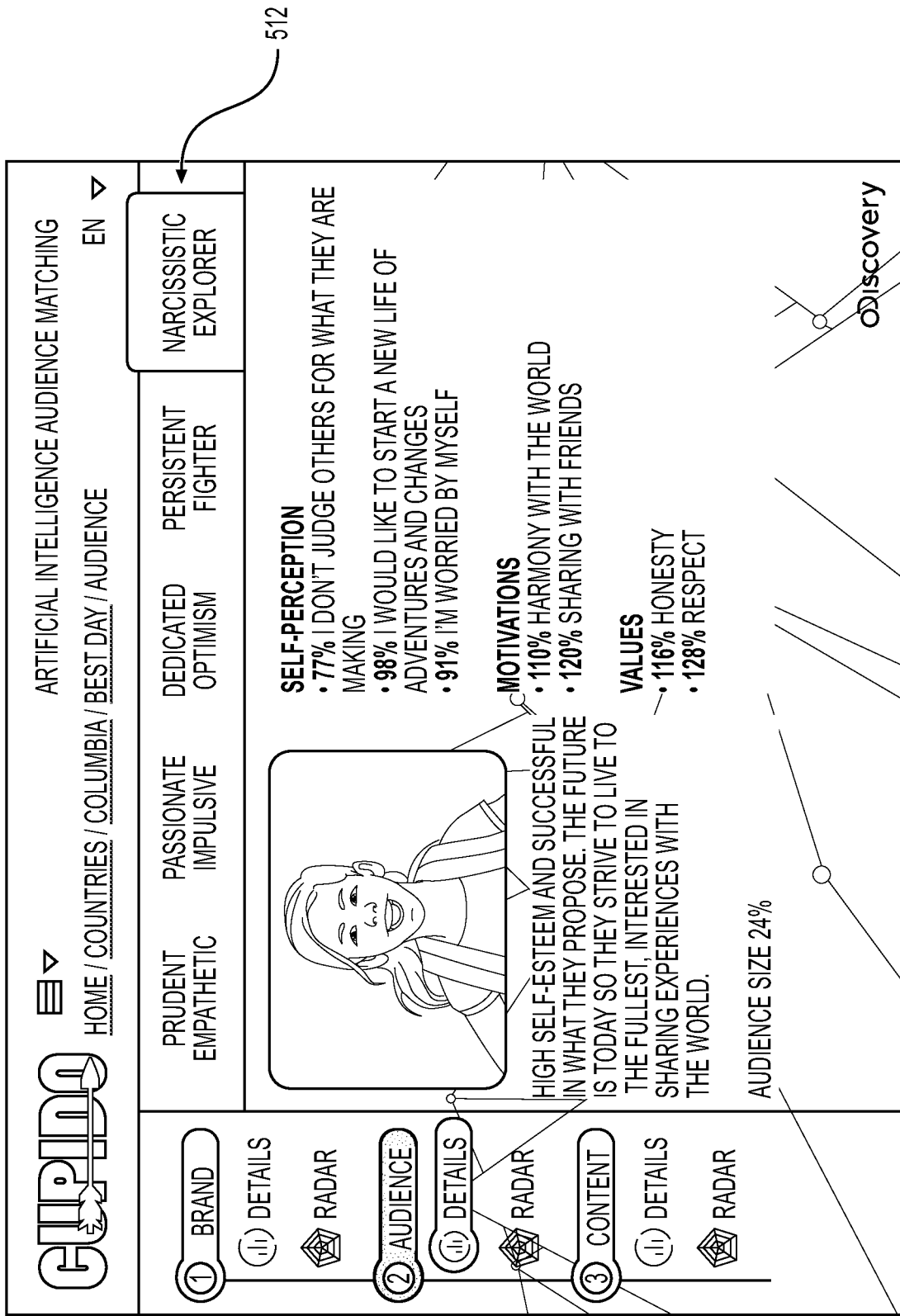

In a similar fashion, users can select dedicated optimism tab 508 as shown in FIG. 5C, persistent fighter tab 510 as shown in FIG. 5D, or narcissistic explorer tab 512 shown in FIG. 5E. The selection of the respective personality trait tabs 508, 510, 512 will display the respective descriptions, audience size measures, self-perceptions, motivations, and values and provide additional insights into the audience and their relationship to the brand and content.

Figure 5F:
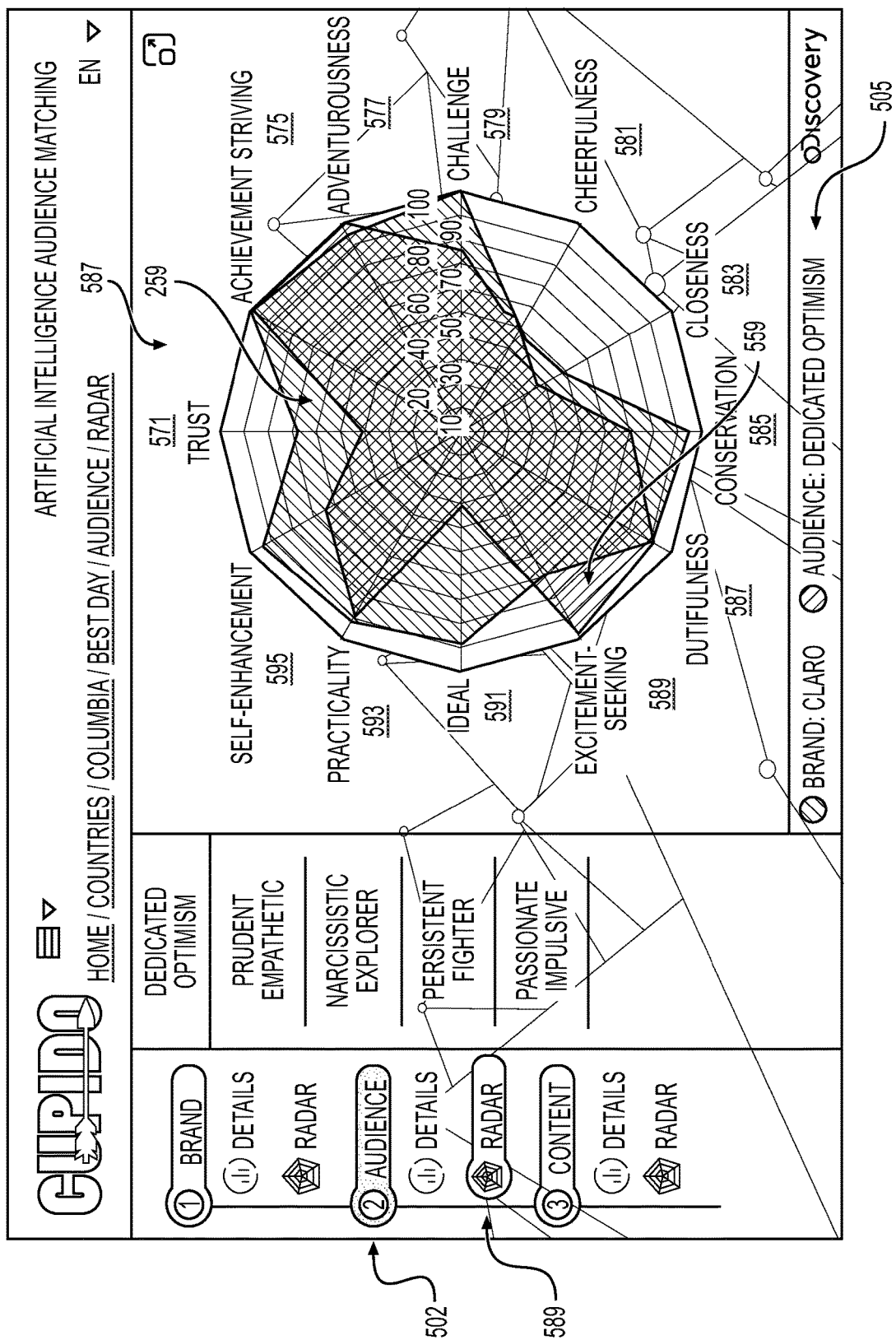

In one example embodiment of the invention in FIG. 5F, when the audience analysis is complete, the user can select the audience personality trait to be processed, displayed, and evaluated, such as dedicated optimism button 591. The user can select the radar button 589 under the audience tab 502 as shown in FIG. 5F. The insight generation server 150 processes the values, needs, and personality traits for the audience using one or more of the algorithms above to identify the profile elements to display and evaluate further. In other example embodiments of the invention, other distance measuring algorithms can be used. Based on the algorithm(s), and the profile elements used for the brand analysis above, the insight generation server 150 displays profile elements 561, 563, 565, 567, 569, 571, 573, 575, 577, 579, 581, and 583 to graph for the audience personality trait dedicated optimism. The insight generation server 150 generates radar graph 587 of the audience to visualize the multivariate audience data as a polygon 559.

In FIG. 5F, the dedicated optimism audience polygon 559 is overlaid on the brand polygon 259 as shown in the radar graph 587. The brand polygon 259 and the dedicated optimism audience polygon 559 are noted in legend 505.

Figure 5G:
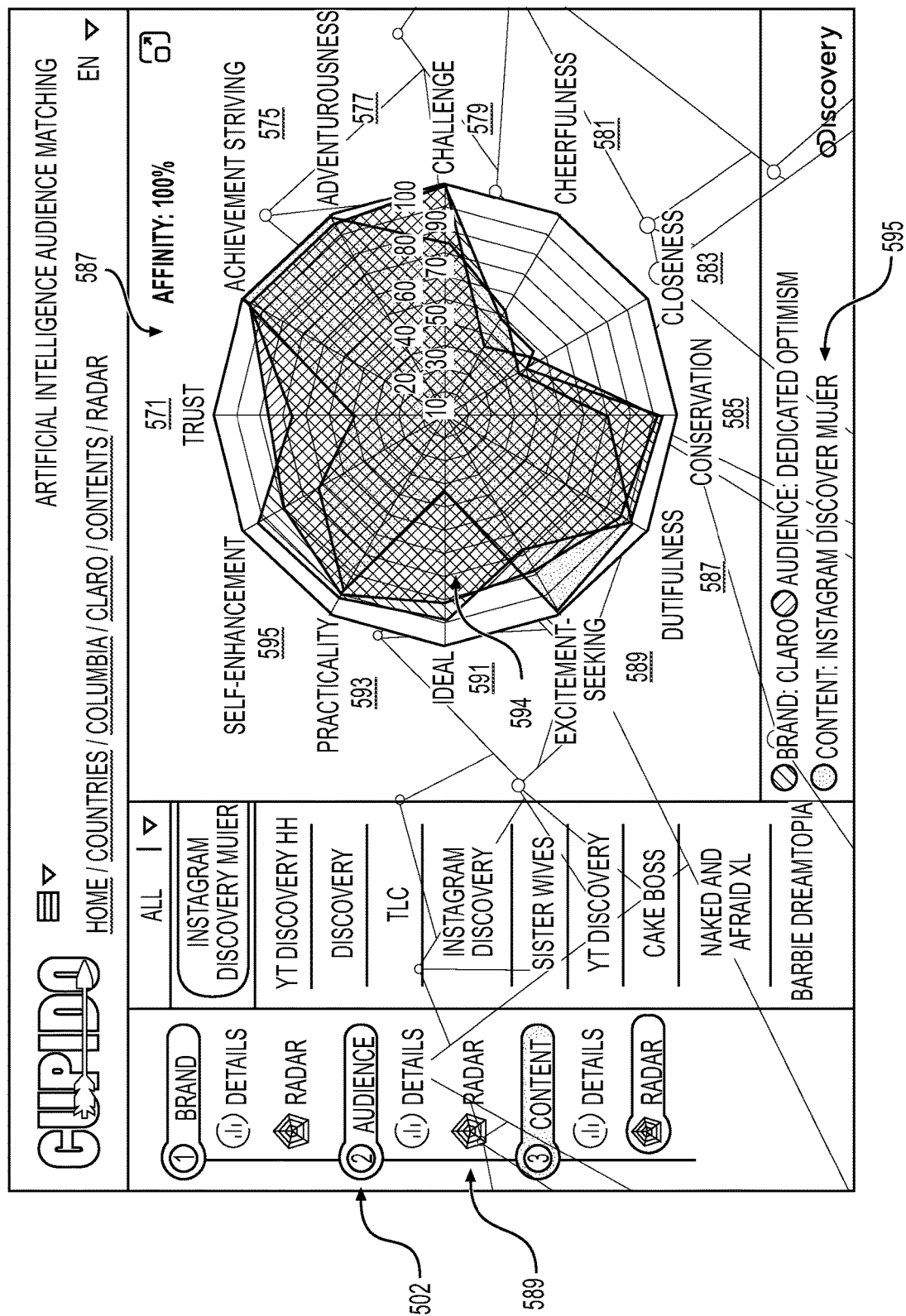

FIG. 5G adds the content item polygon 594 to the radar graph 587 from FIG. 5F. The brand polygon 259 (in blue), the audience polygon 559 (in yellow), and content item polygon 594 (in red) are shown in legend 595 and overlaid in FIG. 5G to show a composite analysis of the profile elements of the brand, the content, and the audience.

The systems and methods for distributing advertisements for selected content based on brand, content, and audience personality of the invention blurs and decomposes and a brand into its most relevant attributes in the same way that a chef breaks down a dish into ingredients. The systems and methods of the invention provide accurate insights of the brand and its personality as related to content items and audiences and their personalities. The invention provides an accurate view of brand personality, content item personalities, and audience personalities and provides insights to advertising campaign initiatives, including strategically reinforcing, covering, and supporting brand personalities in different media, and from its different points of contact with the final consumers, positively exposes the attributes and territories of the brands.

With the insight analysis and visualization systems and methods of the invention, allocation of advertising resources can be determined, brand positioning, and other strategic planning for the brand. For example, with the visualizations provided by the invention, allocation of the advertisements spots in the ad spaces suggested by the invention (e.g., in the channels, genres, social media spaces and/or programs) can be made. Further, sponsorship of genres and/or programs provided by the invention can also be incorporated. Likewise, the results of the analysis and visualization of the invention can be used to build a branded content solution based on the elements of personality visualized using the radar graphs.

What is claimed is:

1. A computer-implemented method comprising:
   receiving, by a first computer server of a computer system, content provider data and content item data from a second computer server of the computer system;
   identifying, by the first computer server, a plurality of profile elements by applying machine learning techniques to the received content provider data and the content item data, wherein the plurality of profile elements are associated with a content provider and a plurality of content items associated with the content provider;
   calculating, by the first computer server, a first plurality of profile element scores for the content provider in each of the plurality of profile elements and a second plurality of profile element scores for the plurality of content items in each of the plurality of profile elements;
   ascertaining, based on the calculating, a strength of the content provider and a weakness of the content provider with respect to the plurality of profile elements;
   ascertaining, based on the calculating, a strength of the at least one content item and a weakness of the at least one content item with respect to the plurality of profile elements;
   determining, by utilizing one or more distance algorithms, profile element vector distances between the first plurality of profile element scores for the content provider and the second plurality of profile element scores for the plurality of content items;
   ranking, by the first computer server, the plurality of content items based on the determined profile element vector distances;
   generating, by the first computer server, an interactive graphical user interface (GUI) displaying a plurality of radar graphs for a subset of the plurality of ranked content items, the plurality of radar graphs plotting a subset of the plurality of profile elements as axes of the plurality of radar graphs;
   causing to be displayed, at a user computing device, the generated interactive GUI;
   constructing, based on each of: information contained within the generated interactive GUI, the strength of the content provider and the weakness of the content provider with respect to the plurality of profile elements, and the strength of the at least one content item and the weakness of the at least one content item with respect to the plurality of profile elements, a branded content solution, wherein the branded content solution comprises an advertising campaign initiative containing one or more suggestions for advertisement allocation across a plurality of disparate types of media.

2. The computer-implemented method of claim 1, further comprising:
   applying, a selection algorithm generated by the first computer server, to the plurality of ranked content items to select the subset of the plurality of ranked profile elements for display in the interactive GUI, the selection algorithm utilizing at least one of a nearest channel, nearest social network, nearest genre, or nearest program.

3. The computer-implemented method of claim 1, wherein the ascertaining the strength of the content provider and the weakness of the content provider with respect to the plurality of profile elements comprises:
   comparing each of the first plurality of profile element scores for the content provider in the plurality of profile elements to a respective predetermined threshold for each of the plurality of profile elements;
   determining that at least one of the plurality of profile elements is a strength for the content provider when a corresponding profile element score of the first plurality of profile element scores exceeds the respective predetermined threshold; and
   determining that at least one of the plurality of profile elements is a weakness for the content provider when a corresponding profile element score of the first plurality of profile element scores is below the respective predetermined threshold.

4. The computer-implemented method of claim 1, wherein the ascertaining the strength of the at least one content item and the weakness of the at least one content item with respect to the plurality of profile elements comprises:
   comparing each of the second plurality of profile element scores for at least one content item of the plurality of content items in the plurality of profile elements to a respective predetermined threshold for each of the plurality of profile elements;

determining that at least one of the plurality of profile elements is a strength for the at least one content item when a corresponding profile element score of the second plurality of profile element scores exceeds the respective predetermined threshold; and determining that at least one of the plurality of profile elements is a weakness for the at least one content item when a corresponding profile element score of the second plurality of profile element scores is below the respective predetermined threshold.

5. The computer-implemented method of claim 1, wherein ranking, by the first computer server, the plurality of content items based on the determined profile element vector distances further comprises:

ranking the plurality of content items based on a shortest vector distance to a farthest vector distance from the content provider to a corresponding content item of the plurality of content items.

6. The computer-implemented method of claim 1, wherein the plurality of profile elements are associated with audience data received from the second computer server of the computer system, and wherein the method further comprises:

calculating, by the first computer server, a third plurality of profile element scores for the audience data in each of the plurality of profile elements, and wherein the plurality of radar graphs includes the audience data.

7. The computer-implemented method of claim 1, further comprising:

generating a one or more dimension tables and corresponding database files characterizing the profile element vector distances determined between the first plurality of profile element scores for the content provider and the second plurality of profile element scores for the plurality of content items; and storing the generated one or more dimension tables and the corresponding database files in a profile element database of the computer system.

8. The computer-implemented method of claim 1, further comprising:

determining a central tendency and dispersion for each of the plurality of profile elements.

9. The computer-implemented method of claim 3, wherein each of the plurality of radar graphs are superimposed with lines representing the determined strength and weakness for the content provider.

10. A computer system comprising:

one or more computer processors; and a non-transitory computer-readable storage medium storing instructions executable by the one or more computer processors, the instructions when executed by the one or more computer processors causing the one or more computer processors to perform operations including:

receiving, by a first computer server of the computer system, content provider data and content item data from a second computer server of the computer system;

identifying, by the first computer server, a plurality of profile elements by applying machine learning techniques to the received content provider data and the content item data, wherein the plurality of profile elements are associated with a content provider and a plurality of content items associated with the content provider;

calculating, by the first computer server, a first plurality of profile element scores for the content provider in each of the plurality of profile elements and a second plurality of profile element scores for the plurality of content items in each of the plurality of profile elements;

ascertaining, based on the calculating, a strength of the content provider and a weakness of the content provider with respect to the plurality of profile elements;

ascertaining, based on the calculating, a strength of the at least one content item and a weakness of the at least one content item with respect to the plurality of profile elements;

determining, by utilizing one or more distance algorithms, profile element vector distances between the first plurality of profile element scores for the content provider and the second plurality of profile element scores for the plurality of content items;

ranking, by the first computer server, the plurality of content items based on the determined profile element vector distances;

generating, by the first computer server, an interactive graphical user interface (GUI) displaying a plurality of radar graphs for a subset of the plurality of ranked content items, the plurality of radar graphs plotting a subset of the plurality of profile elements as axes of the plurality of radar graphs;

causing to be displayed, at a user computing device, the generated interactive GUI; and constructing, based on each of: information contained within the generated interactive GUI, the strength of the content provider and the weakness of the content provider with respect to the plurality of profile elements, and the strength of the at least one content item and the weakness of the at least one content item with respect to the plurality of profile elements, a branded content solution, wherein the branded content solution comprises an advertising campaign initiative containing one or more suggestions for advertisement allocation across a plurality of disparate types of media.

11. The system of claim 10, wherein the instructions cause the one or more computer processors to perform further operations including:

applying, a selection algorithm generated by the first computer server, to the plurality of ranked content items to select the subset of the plurality of ranked profile elements for display in the interactive GUI, the selection algorithm utilizing at least one of a nearest channel, nearest social network, nearest genre, or nearest program.

12. The system of claim 10, wherein the instructions to ascertain the strength of the content provider and the weakness of the content provider with respect to the plurality of profile elements comprise instructions that cause the one or more computer processors to perform further operations including:

comparing each of the first plurality of profile element scores for the content provider in the plurality of profile elements to a respective predetermined threshold for each of the plurality of profile elements;

determining that at least one of the plurality of profile elements is a strength for the content provider when a corresponding profile element score of the first plurality of profile element scores exceeds the respective predetermined threshold; and determining that at least one of the plurality of profile elements is a weakness for the content provider when a corresponding profile element score of the first plurality of profile element scores is below the respective predetermined threshold.

13. The system of claim 10, wherein the instructions to ascertain the strength of the at least one content item and the weakness of the at least one content item with respect to the plurality of profile elements comprise instructions that cause the one or more computer processors to perform further operations including:
   comparing each of the second plurality of profile element scores for at least one content item of the plurality of content items in the plurality of profile elements to a respective predetermined threshold for each of the plurality of profile elements;
   determining that at least one of the plurality of profile elements is a strength for the at least one content item when a corresponding profile element score of the second plurality of profile element scores exceeds the respective predetermined threshold; and
   determining that at least one of the plurality of profile elements is a weakness for the at least one content item when a corresponding profile element score of the second plurality of profile element scores is below the respective predetermined threshold.

14. The system of claim 10, wherein ranking, by the first computer server, the plurality of content items based on the determined profile element vector distances further comprises:
   ranking the plurality of content items based on a shortest vector distance to a farthest vector distance from the content provider to a corresponding content item of the plurality of content items.

15. The system of claim 10, wherein the plurality of profile elements are associated with audience data received from the second computer server of the computer system, and wherein the instructions cause the one or more computer processors to perform further operations including:
   calculating, by the first computer server, a third plurality of profile element scores for the audience data in each of the plurality of profile elements, and
   wherein the plurality of radar graphs includes the audience data.

16. A non-transitory computer-readable medium storing instructions executable by one or more computer processors of a computer system, the instructions when executed by the one or more computer processors cause the one or more computer processors to perform operations comprising:
   receiving, by a first computer server of the computer system, content provider data and content item data from a second computer server of the computer system;
   identifying, by the first computer server, a plurality of profile elements by applying machine learning techniques to the received content provider data and the content item data, wherein the plurality of profile elements are associated with a content provider and a plurality of content items associated with the content provider;
   calculating, by the first computer server, a first plurality of profile element scores for the content provider in each of the plurality of profile elements and a second plurality of profile element scores for the plurality of content items in each of the plurality of profile elements;
   ascertaining, based on the calculating, a strength of the content provider and a weakness of the content provider with respect to the plurality of profile elements;
   ascertaining, based on the calculating, a strength of the at least one content item and a weakness of the at least one content item with respect to the plurality of profile elements;
   determining, by utilizing one or more distance algorithms, profile element vector distances between the first plurality of profile element scores for the content provider and the second plurality of profile element scores for the plurality of content items;
   ranking, by the first computer server, the plurality of content items based on the determined profile element vector distances;
   generating, by the first computer server, an interactive graphical user interface (GUI) displaying a plurality of radar graphs for a subset of the plurality of ranked content items, the plurality of radar graphs plotting a subset of the plurality of profile elements as axes of the plurality of radar graphs;
   causing to be displayed, at a user computing device, the generated interactive GUI; and
   constructing, based on each of: information contained within the generated interactive GUI, the strength of the content provider and the weakness of the content provider with respect to the plurality of profile elements, and the strength of the at least one content item and the weakness of the at least one content item with respect to the plurality of profile elements, a branded content solution, wherein the branded content solution comprises an advertising campaign initiative containing one or more suggestions for advertisement allocation across a plurality of disparate types of media.

17. The non-transitory computer-readable medium of claim 16, wherein the instructions cause the one or more computer processors to perform further operations including:
   applying, a selection algorithm generated by the first computer server, to the plurality of ranked content items to select the subset of the plurality of ranked profile elements for display in the interactive GUI, the selection algorithm utilizing at least one of a nearest channel, nearest social network, nearest genre, or nearest program.

18. The non-transitory computer-readable medium of claim 16, wherein the instructions to ascertain the strength of the content provider and the weakness of the content provider with respect to the plurality of profile elements comprise instructions that cause the one or more computer processors to perform further operations including:
   comparing each of the first plurality of profile element scores for the content provider in the plurality of profile elements to a respective predetermined threshold for each of the plurality of profile elements;
   determining that at least one of the plurality of profile elements is a strength for the content provider when a corresponding profile element score of the first plurality of profile element scores exceeds the respective predetermined threshold; and
   determining that at least one of the plurality of profile elements is a weakness for the content provider when a corresponding profile element score of the first plurality of profile element scores is below the respective predetermined threshold.

19. The non-transitory computer-readable medium of claim 16, wherein ranking, by the first computer server, the plurality of content items based on the determined profile element vector distances further comprises:

ranking the plurality of content items based on a shortest vector distance to a farthest vector distance from the content provider to a corresponding content item of the plurality of content items.

20. The non-transitory computer-readable medium of claim 16, wherein the plurality of profile elements are associated with audience data received from the second computer server of the computer system, and wherein the instructions cause the one or more computer processors to perform further operations including:
   calculating, by the first computer server, a third plurality of profile element scores for the audience data in each of the plurality of profile elements, and
   wherein the plurality of radar graphs includes the audience data.

* * * * *